United States Patent

Hiraoka et al.

[11] Patent Number: 5,858,541
[45] Date of Patent: Jan. 12, 1999

[54] GLASS COMPOSITE MATERIAL, PRECURSOR THEREOF, NITROGEN-CONTAINING COMPOSITE MATERIAL AND OPTICAL DEVICE

[75] Inventors: Toshiro Hiraoka; Yutaka Majima; Kenji Todori; Julian R. Koe, all of Yokohama; Yoshihiko Nakano, Tokyo; Shinji Murai, Ichikawa; Shuzi Hayase, Yokohama, all of Japan

[73] Assignee: Kabushiki Kaisha Toshiba, Kawasaki, Japan

[21] Appl. No.: 943,792

[22] Filed: Oct. 3, 1997

Related U.S. Application Data

[62] Division of Ser. No. 530,409, Sep. 19, 1995, Pat. No. 5,717,051.

[30] Foreign Application Priority Data

| Sep. 19, 1994 | [JP] | Japan | ................................. 6-222845 |
| Mar. 1, 1995 | [JP] | Japan | ................................. 7-042187 |
| Mar. 10, 1995 | [JP] | Japan | ................................. 7-050978 |

[51] Int. Cl.$^6$ .................................................... B32B 9/00
[52] U.S. Cl. ................. 428/429; 528/9; 528/34; 528/41; 528/43; 525/420; 525/437
[58] Field of Search ................. 428/429; 528/9, 528/34, 41, 43; 525/420, 437

[56] References Cited

U.S. PATENT DOCUMENTS

| 4,774,159 | 9/1988 | Stoika et al. . |
| 4,917,980 | 4/1990 | Badeshs et al. . |
| 5,130,397 | 7/1992 | Zeigler . |
| 5,362,559 | 11/1994 | Hayase et al. ............................ 528/43 |
| 5,717,051 | 2/1998 | Hiraoka et al. ............................ 528/9 |

FOREIGN PATENT DOCUMENTS

| 1-183420 | 7/1989 | Japan . |
| 5-105766 | 4/1993 | Japan . |

OTHER PUBLICATIONS

J.R. Dahn et al., Structure of Siloxene and Layered Polysilane ($Si_6H_6$); Physical Review B. vol. 48, No. 24, pp. 17872–17877, Dec. 15, 1993.

*Primary Examiner*—Melvyn I. Marquis
*Attorney, Agent, or Firm*—Oblon, Spivak, McClelland, Maier & Neustadt, P.C.

[57] ABSTRACT

A glass composite material comprising a polymer chain selected from the group consisting of polysilane, polygermane, polystannane and a copolymer thereof, and a network structure of a metal oxide consisting of a metal atom bonded to the other metal atom through an oxygen atom, wherein the polymer chain is chemically crosslinked with a glass matrix of the network structure of the metal oxide directly or indirectly, and a volume resistivity measured by setting a ratio of a voltage to a film thickness at $10^6$ V/cm according to a disc plate electrode method is not more than $3 \times 10^6$ $\Omega$cm.

6 Claims, 4 Drawing Sheets

GLASS COMPOSITE MATERIAL, PRECURSOR THEREOF, NITROGEN-CONTAINING COMPOSITE MATERIAL AND OPTICAL DEVICE

This is a Division, of application Ser. No. 08/530,409 filed on Sep. 19, 1995, U.S. Pat. No. 5,717,051.

BACKGROUND OF THE INVENTION

1. Field of the Invention

The present invention relates to a composite material which contains a polymer chain represented by polysilane and exhibits various optical and electric characteristics, a precursor of the composite material and an optical device using the composite material.

2. Description of the Related Art

Polymers such as polysilane, polygermane and polystannane have various particular optical or electric characteristics due to a σ-conjugate effect of a main chain and attract attention as materials for photoelectric devices. However, bonds of the polymer main chain, such as Si—Si, Ge—Ge and Sn—Sn are liable to be chemically denaturalize and oxidized by the irradiation of ultraviolet light with comparative ease and, therefore, they are inferior in durability. Also, they are often inferior in mechanical strength, which causes a serious problem when using as a device material.

In order to improve such an inferior durability, for example, a process for forming a three-dimensional network by reacting polar groups introduced into the polymer side chains of polysilane with each other to crosslink them is disclosed in Japanese Laid-Open Patent Publication No. 4-363327. When the three-dimensional network is formed by crosslinking as described above, the mechanical strength is increased and, at the same time, the polymer main chain is fixed in the three-dimensional network. Therefore, it becomes difficult to cause cleavage of the main chain and the chemical, thermal or optical durability is improved. However, since the crosslinking density of the conventional crosslinked material is not sufficiently high, the polymer main chain is not sufficiently fixed in the three-dimensional network and, therefore, the durability is not improved satisfactorily.

In order to improve the durability of polysilane, it is effective to form a dense three-dimensional network by enhancing the crosslinking density of the crosslinked material. As the substance for forming the three-dimensional network, for example, glass is well known. If polymers such as polysilane can be fixed in the three-dimensional network of glass through a chemical bond, a drastic improvement of the durability of the polymer is expected. In this case, it is important for improving these characteristics to mix the polymer in the glass matrix sufficiently, thereby causing no phase separation.

For example, in Japanese Laid-Open Patent Publication No. 1-183420, there has hitherto been disclosed a case wherein polysilane or polygermane is formulated in glass. This glass material was prepared by mixing a glass sol solution with nonpolar polysilane or polygermane powder or a block copolymer of a nonpolar polysilane or polygermane and a polar polysiloxane. However, when the power is mixed as described in the former case, phase separation arises as a matter of course. Even if the block copolymer is used as described in the latter case, phase separation arises, because the glass matrix is polar while the polysilane part of the copolymer is nonpolar. Therefore, the fixing effect in the three-dimensional network is inferior.

In U.S. Pat. No. 5,130,397 and Japanese Laid-Open Patent Publication No. 5-105766, there are disclosed copolymers of polymers such as polysilane and silicate glass. However, regarding these copolymers, the polymer is merely bonded to the glass matrix only at both ends of the polymer main chain. Furthermore, since the polymer itself is nonpolar, the fixing effect of the polymer to the glass matrix is inferior and the improvement of the characteristics is not sufficient.

Furthermore, it is said that a siloxene compound has a structure wherein silicon chains are mutually crosslinked with a siloxane bond. However, since the siloxene compound can not dissolve in a solution, it can not be applied for devices by forming into a thin film. There can be found a case that the siloxene compound is made into a tablet by subjecting to press molding. However, since such a tablet is substantially obtained only by tightening the powder together, it is heterogeneous and brittle and, therefore, it is not applied for practical use.

As described above, polymers such as polysilane, polygermane and polystannane are inferior in chemical and optical durability. Furthermore, the material wherein these polymers are dispersed in glass causes phase separation because the polymer is nonpolar, and the durability was not sufficiently improved.

SUMMARY OF THE INVENTION

An object of the present invention is to provide a glass composite material and a nitrogen-containing composite material comprising a glass component and a polymer such as polysilane, polygermane and polystannane, the polymer being fixed to the glass component in a state of forming a dense three-dimensional network having a high crosslinking density, which has a high durability and can sufficiently exhibit optical and electric characteristics that the polymer essentially furnishes with, and which can be easily made into a formed product such as a uniform thin film. Another object of the present invention is to provide an electroluminescent device, an photosensitive element for electrophotography, a non-linear optical device and a laser device, which respectively contain the composite material as a constituent element. Furthermore, still another object of the present invention is to provide a precursor which can easily produce the above-described glass composite material.

A glass composite material of the present invention comprises a polymer chain selected from the group consisting of polysilane, polygermane, polystannane and a copolymer thereof, and a network structure of a metal oxide consisting of a metal atom bonded to another metal atom through an oxygen atom, wherein the polymer chain is chemically crosslinked with a glass matrix of the network structure of the metal oxide directly or indirectly, and a volume resistivity measured by setting a ratio of a voltage to a film thickness at $10^6$ V/cm according a disc plate electrode process (JIS C2151) is not more than $3 \times 10^6$ Ωcm.

Another glass composite material of the present invention comprises a polymer chain selected from the group consisting of polysilane, polygermane, polystannane and a copolymer thereof, and a network structure of a metal oxide consisting of a metal atom bonded to another metal atom through an oxygen atom, wherein the polymer chain is chemically crosslinked with a glass matrix of the network structure of the metal oxide at three or more positions directly or indirectly, resulting in a cured state, and constitutes a formed product which maintains a coherence to light having a wavelength within a range of 300 to 800 nm.

Still another glass composite material of the present invention comprises a polymer chain selected from the group consisting of polysilane, polygermane, polystannane and a copolymer thereof, and a network structure of a metal oxide consisting of a metal atom bonded to another metal atom through an oxygen atom, wherein the polymer chain is chemically crosslinked with a glass matrix of the network structure of the metal oxide at three or more positions directly or indirectly, resulting in a cured state, and an area of signals due to a silicon, germanium or stannum crystal observed within a range of 20 to 60 degrees of 2 θ is not more than 1% of the total area of the all signals according to a X-ray diffraction using a Cu tubular bulb as a X-ray source.

As to these glass composite materials, the surface hardness to be measured by a pencil scratching test (JIS K5401) is preferably 3B or more. In these glass composite materials, it is preferred that an atomic ratio of M atoms (where M is at least one element selected from Si, Ge and Sn) of which all four valences form a M—M bond is less than 10% of all M atoms. Further, it is preferred that the glass composite material contains 0.1% by atomic ratio or more of C atom.

In the glass composite material of the present invention, the polymer chain selected from the group consisting of polysilane, polygermane, polystannane and a copolymer thereof is chemically crosslinked with a glass matrix of the network structure of the metal oxide, on a mono- or di-substituted Si, Ge or Sn atom which constitutes the polymer chain. The Si, Ge or Sn atom which can be a crosslinking point with the glass matrix may be present on the main chain or on the branched chain.

The glass composite material of the present invention may be those having a structure (A) wherein the polymer chain selected from the group consisting of polysilane, polygermane, polystannane and a copolymer thereof is chemically crosslinked with the glass matrix of the metal oxide through a polar group introduced into the polymer side chain, or those having a structure (B) wherein the polymer chains selected from the group consisting of polysilane, polygermane, polystannane and a copolymer thereof are chemically crosslinked with each other through an oxygen atom that is directly bonded to the polymer chains, and a bond between silicon, germanium or stannum atoms through the oxygen atom forms a glass matrix.

A polymer composition of the present invention that is a precursor of the above-described glass composite material comprises a polymer selected from the group consisting of polysilane, polygermane, polystannane and a copolymer thereof in which at least one polar group selected from the group consisting of hydroxyl group, alkoxyl group, amino group, ammonium group, imino group, carbonyl group, carboxyl group, amide group, imido group, urethane group, nitro group, thiol group, thioether group, thioester group, sulfonyl group, sulfoxyl group, fluoro group, chloro group, bromo group and iodo group is introduced into a side chain; and at least one compound selected from the group consisting of metal oxide, metal alkoxide, metal hydroxide, metal chelate compound, metal carboxylate, metal halide and metal hydride.

It is preferred that the polymer used in the above polymer composition is one having a repeating unit represented by the formula (I) or (II):

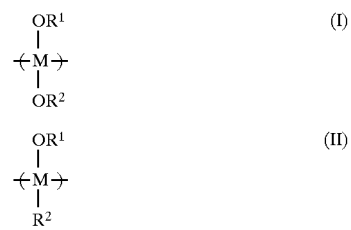

wherein M is at least one element selected from Si, Ge and Sn; $R^1$ and $R^2$ may be the same or different and are selected from the group consisting of substituted or non-substituted alkyl, aryl and aralkyl groups; and the number of carbon atoms of $R^1$ and $R^2$ is 1 to 15, respectively.

A polymer compound of the present invention that is a precursor of the above-described glass composite material has a repeating unit represented by the formula (I) or (II):

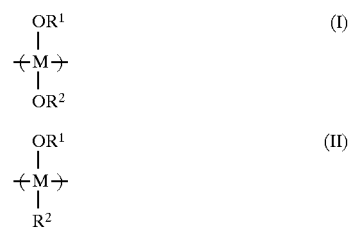

wherein M is at least one element selected from Si, Ge and Sn; $R^1$ and $R^2$ may be the same or different and are selected from the group consisting of substituted or non-substituted alkyl, aryl and aralkyl groups; and the number of carbon atoms of $R^1$ and $R^2$ is 1 to 15, respectively. It should be noted that this polymer compound may be used in combination with the metal oxide, metal alkoxide, metal hydroxide, metal chelate compound, metal carboxylate, metal halide or metal hydride, as in the above composition.

It is particularly preferred that the polymer having the repeating unit represented by the above formula (I) or (II) is that having a repeating unit represented by the formula (III) or (IV):

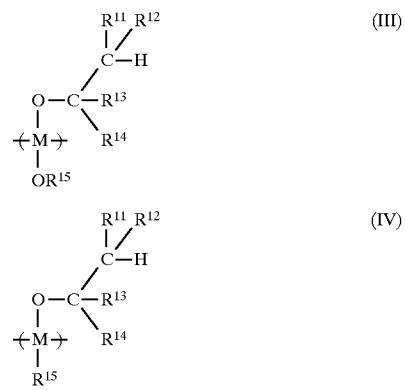

wherein M is at least one element selected from Si, Ge and Sn; $R^{11}$, $R^{12}$, $R^{13}$ and $R^{15}$ may be the same or different and are selected from the group consisting of a hydrogen atom and substituted or non-substituted alkyl, aryl and aralkyl groups; $R^{14}$ is selected from the group consisting of substituted or non-substituted alkyl, aryl and aralkyl groups; and the number of carbon atoms of $R^{11}$ to $R^{15}$ is 1 to 15, respectively.

A nitrogen-containing composite material of the present invention comprises a polymer chain selected from the group consisting of polysilane, polygermane, polystannane and a copolymer thereof, and an inorganic or organic matrix, wherein the polymer chain is chemically crosslinked with the inorganic or organic matrix through a nitrogen atom which is bonded directly to a Si, Ge or Sn atom on the polymer main chain.

The nitrogen-containing composite material of the present invention may have a structure (C) wherein the polymer chain selected from the group consisting of polysilane, polygermane, polystannane and a copolymer thereof and an organic matrix such as aniline resin, polyaniline, polypyrrole or a mixture or copolymer thereof are contained, and a Si, Ge or Sn atom on the polymer main chain and a nitrogen atom in the organic matrix directly form a bond, thereby crosslinking; a structure (D) wherein the polymer chain selected from the group consisting of polysilane, polygermane, polystannane and a copolymer thereof and an inorganic matrix of a network structure having a metal-nitrogen-metal bond are contained, and a Si, Ge or Sn atom on the polymer main chain and a nitrogen atom in the organic matrix directly form a bond, thereby crosslinking; or a structure (E) wherein the polymer chains selected from the group consisting of polysilane, polygermane, polystannane and a copolymer thereof are chemically crosslinked with each other through a nitrogen atom which is bonded directly to a Si, Ge or Sn atom on the polymer chain, thereby forming an inorganic matrix having M—N—M (where M is a Si, Ge or Sn atom).

In the composite material of the present invention, the polymer such as polysilane, polygermane or polystannane is fixed to the matrix in a state of forming a dense three-dimensional network having a high crosslinking density. Therefore, the composite material has a high durability and can sufficiently exhibits optical and electric characteristics that the polymer essentially furnishes with, and can be easily made into a formed product such as uniform thin film. Furthermore, there can also be provided an optical device which contains the composite material as a constituent element and exhibits excellent characteristics.

An optical device of the present invention has an optical functional material as a constitutional element, wherein the optical functional material comprises a polymer chain selected from the group consisting of polysilane, polygermane, polystannane and a copolymer thereof, and a network structure of a metal oxide consisting of a metal atom bonded to another metal atom through an oxygen atom, wherein the polymer chain is chemically crosslinked with a glass matrix of the network structure of the metal oxide at three or more positions directly or indirectly, resulting in a cured state, and an area of signals due to a silicon, germanium or stannum crystal observed within a range of 20 to 60 degrees of $2\theta$ is not more than 1% of the total area of the all signals according to a X-ray diffraction using a Cu tubular bulb as a X-ray source.

As to the optical device of the present invention, it is preferred that an atomic ratio of M atoms (where M is at least one element selected from Si, Ge and Sn) of which all four valences form a M—M bond is less than 10% of all M atoms contained in the optical functional material. Above-described optical functional material is used for as, for example, a luminescent layer or a charge transport layer in an electroluminescent device comprising a pair of electrodes and a luminescent layer interposed therebetween; a charge transport layer in a photosensitive element for electrophotography comprising a charge generation layer and a charge transport layer formed on a conductive substrate; a non-linear optical phenomenon generating part of a non-linear optical device comprising a non-linear optical phenomenon generating part and a light waveguide part; or a laser medium in a laser device comprising a laser medium, an oscillator of a pair of mirrors provided oppositely through the laser medium and an excitation means for exciting the laser medium.

DETAILED DESCRIPTION OF THE PREFERRED EMBODIMENTS

Figure 1:
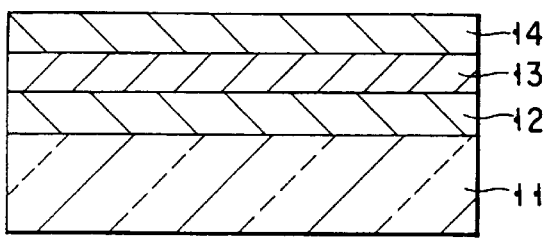
FIG. 1 is a sectional view illustrating one embodiment of an EL device according to the present invention.

Hereinafter, the present invention will be explained in detail. In the following explanation, polysilane, polygermane and polystannane and a copolymer thereof are sometimes referred to as polysilanes for the purpose of simplifying.

In a glass composition material of the present invention, a polymer chain selected from the group consisting of polysilane, polygermane and polystannane and a copolymer thereof is crosslinked with a glass matrix containing a metal-oxygen-metal bond and constituting a network structure. As described above, the glass composite material may be those having a structure (A) wherein the polymer chain selected from the group consisting of polysilane, polygermane and polystannane and a copolymer thereof is chemically crosslinked with the glass matrix of the metal oxide through a polar group introduced into the polymer side chain, or those having a structure (B) wherein the polymer chains selected from the group consisting of polysilane, polygermane and polystannane and a copolymer thereof are chemically crosslinked with each other through an oxygen atom that is directly bonded to the polymer chains, and a bond between silicon, germanium or stannum atoms through the oxygen atom forms a glass matrix.

Firstly, the glass composite material having the above structure (A) will be explained. The glass composite material having this structure is produced by a sol-gel method, for example, by using a precursor composition comprising a polymer selected from the group consisting of polysilane, polygermane and polystannane and a copolymer thereof in which at least one polar group selected from the group consisting of hydroxyl group, alkoxyl group, amino group, ammonium group, imino group, carbonyl group, carboxyl group, amide group, imido group, urethane group, nitro group, thiol group, thioether group, thioester group, sulfonyl group, sulfoxyl group, fluoro group, chloro group, bromo group and iodo group is introduced into a side chain, and a metal oxide sol-forming substance such as metal alkoxide.

The polymer of polysilanes as one component of the raw material may be any one that contains the above polar group at the side chain. Accordingly, it may be a polymer of which main chain comprises a homopolymer of polysilane, polygermane or polystannane, or a copolymer thereof. Furthermore, it may also be a polymer of which main chain comprises a block copolymer consisting of a polymer of polysilanes and a polymer other than polysilanes, such as polysiloxane (silicone), polyamide, polyimido, polyester, etc. Furthermore, the polymer chain may take any form such as one-dimensional chain, branched chain, ladder form, three-dimensional chain, etc. However, the polymer chain should preferably take any form other than three-dimensional chain. This is because the polymer main chain itself is in an entangled state in the form of three-dimensional chain so that a crosslinking is not sufficiently conducted. The degree of polymerization is not specifically limited, but the number (n) of successive atoms such as Si, Ge or Sn in the main chain is preferably 6 to 100000, more preferably 10 to 10000. This reason is as follows. That is, when n is too small, the essential function of polysilanes is prevented. On the other hand, when n is too large, the solubility of the polysilanes to the solvent is deteriorated, thereby making it difficult to prepare a glass composite material.

Furthermore, cyclic polymer having a cyclic structure in the main chain can also be used as polysilanes. Particularly, 5- or 6-membered cyclic polysilanes are stable since the cyclic structure is stable due to bond angles. Such a stable cyclic structure is further reinforced by crosslinking, thereby obtaining polysilanes having an excellent durability which have never been attained, heretofore. Furthermore, when such a comparatively small membered cyclic compound and polysilanes having a parallelepiped cyclic structure such as octasilacubanes are crosslinked with a network structure of a metal oxide, there can be obtained a structure wherein extremely fine zero-dimensional polysilanes in different energy level are dispersed in the metal oxide. Such a structure forms quantum dots and exhibits various specific quantum effects caused by the quantum dots, such as non-linear optical effect and, therefore, it is extremely effective. Note that, when the cyclic or parallelepiped polysilanes is used, the number of successive atoms is not limited to the above range.

Examples of the polar group to be introduced into the side chain of polysilanes include the following.

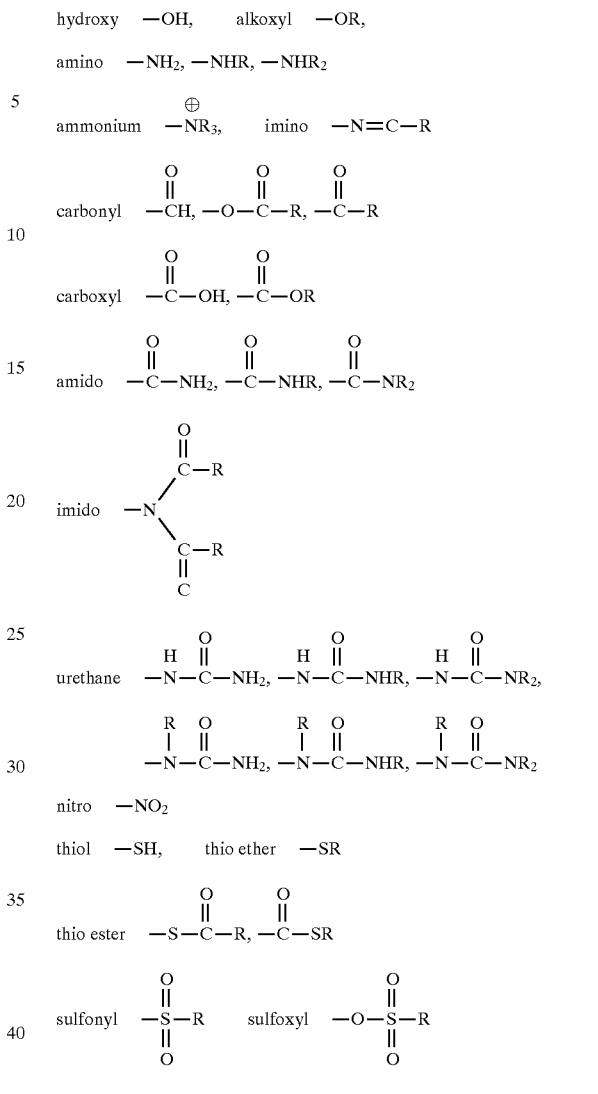

wherein R may be the same or different and is selected from the group consisting of substituted or non-substituted alkyl, aryl, aralkyl and silyl groups.

Furthermore, examples of polysilanes containing these polar groups include the followings.

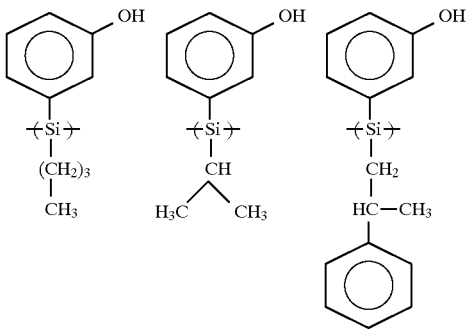

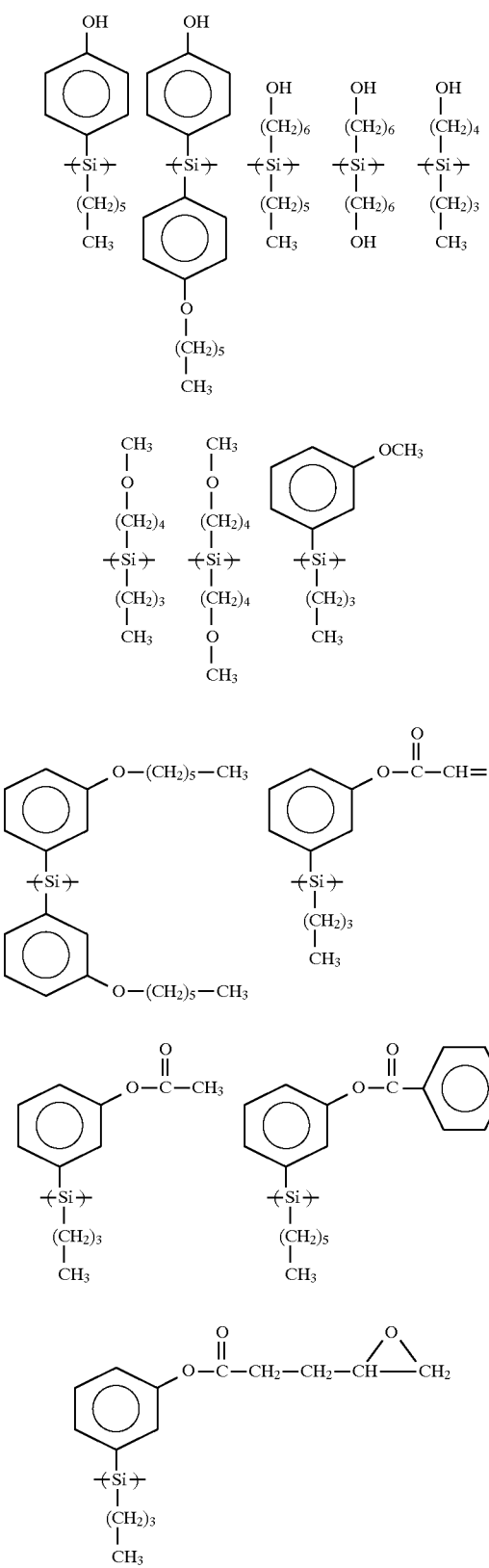
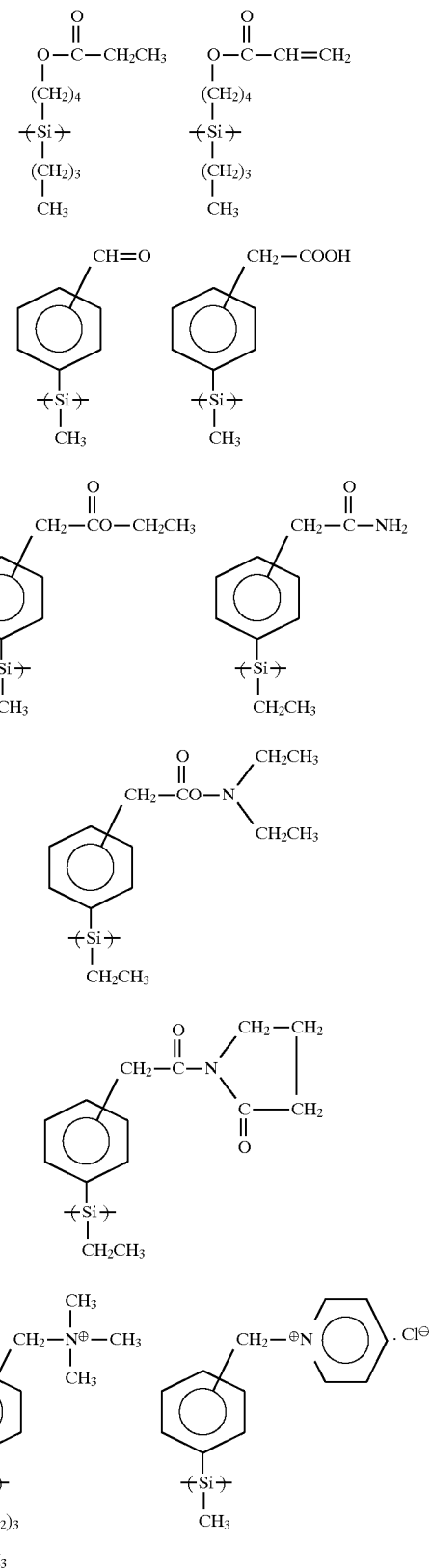

-continued

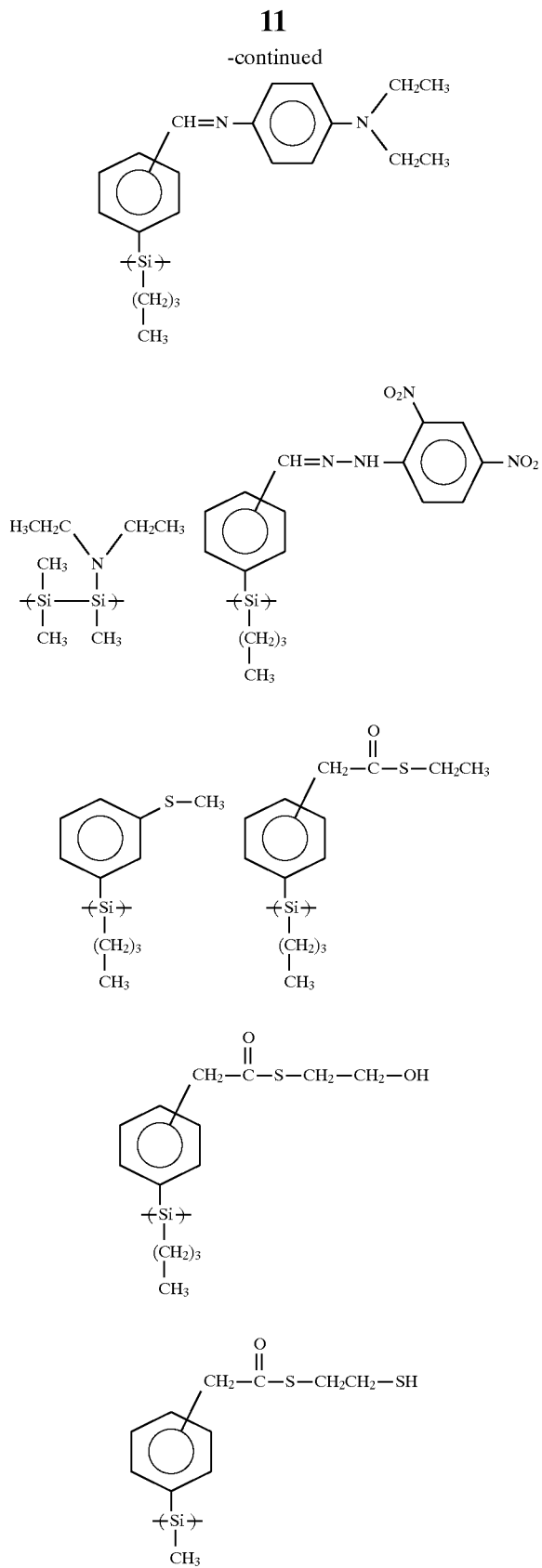

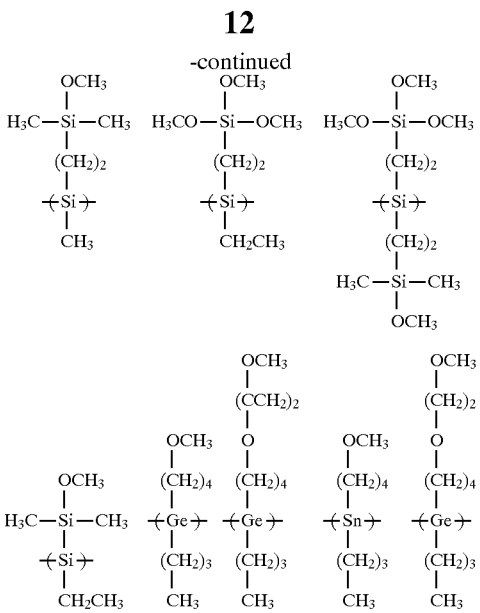

Furthermore, it is preferred to use polysilanes in which a functional group, which contributes to the crosslinking reaction, is directly bonded to the polymer chain, in order to enhance the fixing effect of the polymer chain to the glass matrix. Especially, alkoxyl group, thioether group, amino group, carboxyl group, sulfoxyl group, fluoro group, chloro group, bromo group or amiodo group which is directly bonded to M atom such as Si, Ge and Sn has a high elimination capability. In this case, a covalent bond between the metal oxide matrix and the polysilanes easily generates. Furthermore, alkoxyl group, thioether group or amino group is preferred because no acid is formed as the by-product of the reaction so that the treatment after the reaction becomes simple. Also, even if the functional group is bonded to the polymer chain through a spacer such as alkyl group, it is preferred that a spacer is short and rigid. The ratio of the side chains into which the functional group is introduced to the whole polymer side chains is not specifically limited. In order to obtain a sufficient fixing effect, the ratio of the side chain, into which the functional group is introduced, is not less than 5%, preferably not less than 15%, more preferably not less than 50%, most preferably not less than 90%.

Examples of the metal oxide sol-forming substance as the other component of the raw material include metal oxide, metal alkoxide, metal hydroxide, metal chelate compound, metal carboxylate, metal halide, metal hydride, inorganic salt such as nitride, sulfate, etc., and the like. These may be used alone or in combination.

As the metal alkoxide, there are alkoxides of metals such as Ge, Sn, Pb, Al, Ga, As, Sb, Bi, Ti, Zr, V, Nb, Ta, Na, K, Li, Ca, Mg, Ba, Sr, etc. Examples of the metal alkoxide include $LiOCH_3$, $NaOCH_3$, $Cu(OCH_3)_2$, $Ca(OCH_3)_2$, $Sr(OC_2H_5)_2$, $Ba(OC_2H_5)_2$, $Zn(OC_2H_5)_2$, $B(OCH_3)_3$, $Al(i-OC_3H_7)_3$, $Ga(OC_2H_5)_3$, $Y(OC_4H_9)_3$, $Si(OC_2H_5)_4$, $Ge(OC_2H_5)_4$, $Pb(OC_4H_9)_4$, $P(OCH_3)_3$, $Sb(OC_2H_5)_3$, $VO(OC_2H_5)_3$, $Ta(OC_3H_7)_5$, $W(OC_2H_5)_6$, $La(OC_3H_7)_3$, $Nd(OC_2H_5)_3$, $Si(OCH_3)_4$, $Si(OC_2H_5)_4$, $Si(i-OC_3H_7)_4$, $Si(t-OC_4H_9)_4$, $Ti(OCH_3)_4$, $Ti(OC_2H_5)_4$, $Ti(i-OC_3H_7)_4$, Ti(OC$_4$H$_9$)$_4$, Zr(OCH$_3$)$_4$, Zr(OC$_2$H$_5$)$_4$, Zr(OC$_3$H$_7$)$_4$, Zr(OC$_4$H$_9$)$_4$, Al(OCH$_3$)$_3$, Al(OC$_2$H$_5$)$_3$, Al(i-OC$_3$H$_7$)$_3$, Al(OC$_4$H$_9$)$_3$, La[Al(iso-OC$_3$H$_7$)$_4$]$_3$, Mg[Al(iso-OC$_3$H$_7$)$_4$]$_2$, Mg[Al(sec-OC$_4$H$_9$)$_4$]$_2$, Ni[Al(iso-OC$_3$H$_7$)$_4$]$_2$, (C$_3$H$_7$O)$_2$Zr [Al(OC$_3$H$_7$)$_4$]$_2$, Ba[Zr$_2$(OC$_2$H$_5$)$_9$]$_2$, etc. These are used in combination, if desired. Furthermore, it is preferred to formulate an alkoxide of a divalent or multivalent metal atom in order to chemically crosslink the polymer chain and glass matrix each other.

In addition to the alkoxyl group, an alkoxide containing a substituent such as alkyl group, aryl group, etc. may be used. Examples thereof include diethoxydiethylsilane, diethoxydimethylsilane, dimethoxydimethylsilane, dimethoxydiphenylsilane, ethyltriethoxysilane, methyltriethoxysilane, methyltrimethoxysilane, phenyltriethoxysilane, phenyltrimethoxysilane, tributyltin ethoxide, tributyltin methoxide, diphenyldimethoxysilane, diphenyldiisopropoxysilane, diphenyldiacetoxysilane, triphenylethoxysilane, diphenylvinylethoxysilane, vinylytriethoxysilane, vinyltrimethoxysilane, γ-methacryloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, etc.

Furthermore, as the metal hydroxide, metal halide and metal hydride, there are compounds of the above metals, respectively, and they may be non-substituted compounds or compounds containing a substituent such as alkyl group, aryl group, etc. Furthermore, they may be chlorides and hydrides, simultaneously, such as methyldichlorosilane. Examples thereof include dimethyldihydroxysilane, diethyldihydroxysilane, diphenyldihydroxysilane, trimethylsilanol, triethylsilanol, triphenylsilanol, tetrachlorosilane, methyltrichlorosilane, ethyltrichlorosilane, phenyltrichlorosilane, dimethyldichlorosilane, diphenyldichlorosilane, phenylmethyldichlorosilane, phenyldichlorosilane, methyldichlorosilane, tetrachlorotitanium, trichloroaluminum, calcium hydride, diisobutylaluminum hydride, lithium aluminum hydride, lithium borohydride, lithium tri-tert-butoxyalumino hydride, lithium tri-sec-butyl borohydride, manganese (II) borate, potassium borohydride, sodium bifluoride, sodium borohydride, sodium dihydro-bis (2-methoxyethoxy) aluminate, sodium tetrahydroborate, titanium hydride, tributyltin hydride, zirconium hydride, silane, methylsilane, ethylsilane, isopropylsilane, phenylsilane, dimethylsilane, diethylsilane, diphenylsilane, etc. Here, the metal chlorides are represented as the metal halide, however, the metal bromides and metal iodides can be applied as well.

As the metal chelate compound, there can be used those containing a 1,3-dicarbonyl compound as a ligand such as acetylacetonate of the above metal. Examples thereof include tris(acetylacetonato) aluminum, tris(ethylacetonato) aluminum, tris(salicylaldehidato) aluminum, indium acetylethylacetonate, zinc acetylethylacetonate, copper acetylacetonate, platinum acetylacetonate, etc.

As the metal carboxylate, for example, acetates are used. Examples thereof include barium acetate, copper (II) acetate, lithium acetate, magnesium acetate, lead acetate, barium oxalate, calcium oxalate, copper (II) oxalate, magnesium oxalate, stannum (II) oxalate, yttrium oxalate, yttrium stearate, etc.

As the inorganic metal salt, there are nitrides, oxychlorides, etc. Examples thereof include yttrium nitride, nickel nitride, zirconium oxychloride, aluminum oxychloride, etc.

Also, there can be added glass matrix-forming materials such as borates (e.g. disodium tetraborate, etc.), oxide salts (e.g. phosphate, etc.) and the like; auxiliary film-forming agents such as organic polymers (e.g. epoxy resin, polyimide, melamine resin, polyvinyl pyrrolidone, nylon resin, etc.) and the like, in addition to the metal alkoxides. Furthermore, there can be formed silicon oxide by using polysilazanes such as perhydropolysilazane.

The amount of the polysilanes in the above composition is not specifically limited, but is normally set within a range of about 0.1 to 80% by weight. This reason is as follows. That is, when the amount of the polysilanes to be formulated is too small, it becomes difficult to develop the specific function of the polysilanes itself from the viewpoint of the whole glass composite material. On the other hand, when the amount of the polysilanes to be formulated is too large, a sufficient fixing effect of the polymer can not be obtained because of little glass matrix part and the gas shield effect to an oxygen gas becomes inferior, which results in deterioration of the durability of the polysilanes to be contained. The amount of the polysilanes to be formulated is preferably 5 to 70%, more preferably 30 to 60%. When using the polymer having a repeating unit represented by the formula (I) or (II), a glass matrix is formed by crosslinking this precursor polymer itself through an oxygen atom. Therefore, the amount of the polysilanes may not be set within the above range.

The glass composite material of the structure (A) according to the present invention is mainly produced by a sol-gel method. Normally, a solution is firstly prepared by dissolving polysilanes and a metal alkoxide in a solvent (e.g. alcohol, water-alcohol mixed solution, etc.) and the metal alkoxide is hydrolyzed by heating or an action of a catalyst to form a sol solution. This sol solution is applied or molded on a substrate such as glass plate, followed by gelling and drying, to obtain a desired glass composite material. Here, the sol solution is prepared from a solution of the metal alkoxide, and then polysilanes may be added to gel them according to the same manner as that described above. Further, a thin film of polysilanes is formed on a substrate such as glass plate, followed by dipping the substrate in a sol solution prepared by hydrolyzing the metal alkoxide, and then they may be cured by subjecting to a treatment such as drying with heating. Furthermore, polysilanes are mixed with a metal alkoxide and, after molding the mixture, the molded article may be gelled by subjecting to a treatment such as heating.

Examples of the catalyst include amines such as aqueous ammonia, trialkylamine, ethanolamine, etc.; alkalies such as sodium hydroxide, etc.; inorganic acids such as hydrochloric acid, nitric acid, phosphoric acid, etc.; organic acids represented by carbon acids such as acetic acid, oxalic acid, etc.; photoacid generators; thermal acid generators and the like. In addition to these amines, alkalies and acids, there may be used acid anhydrides such as trimellitic anhydride, etc.; metal carboxylates such as sodium acetate, zinc octylate, etc.; metal perchlorates such as ammonium perchlorate, magnesium perchlorate, etc.; metal chelate compounds such as aluminum acetylacetonate, zirconium acetylacetonate, etc.; organic metal compounds such as tetrabutyl titanate, dibutyltin dilaurate, etc.; chlorides such as aluminum chloride, iron (II) chloride, zinc (II) chloride, etc. Here, alkoxides of aluminum, titanium, zirconium and boron act as a glass matrix-forming material, and besides has a function as a catalyst. Therefore, they are very useful. Furthermore, as the solvent, there may be used organic solvents such as formamide, dimethylformamide, dimethoxyethane, methyl cellosolve, ethyl cellosolve, tetrahydrofuran, dioxane, N-methylpyrrolidone, acetone, methyl ethyl ketone, methyl isobutyl ketone, triethanolamine, etc., in addition to water and alcohol.

In addition, even if the metal hydroxide, metal chelate compound, metal carboxylate, metal chloride, metal inorganic salt, or metal hydride, other than above-described metal alkoxide is used, a metal oxide matrix, which is the same as or similar to the metal alkoxide, can also be formed using a sol-gel method or a pyrolysis. Silicone resins such as poly(ditertiarybutoxysiloxane) may be used as the metal alkoxide. Furthermore, besides the above-described sol-gel method using metal alkoxide etc., the glass composite material of the present invention can be produced by steps of mixing polysilazanes such as perhydropolysilazane and polysilanes, adding an additive such as a catalyst to the mixture, if desired, and heating the mixture mainly in the air atmosphere.

In the glass composite material having the structure of (A) according to the present invention, the polar group introduced into the side chain of polysilanes is chemically boned to the glass matrix of the metal oxide by covalent bond, ionic bond, coordinate bond, hydrogen bond, or hydrophobic interaction and the polymer chain of polysilanes is fixed. Furthermore, it becomes difficult to cause oxidation by the gas barrier effect of the glass matrix and, therefore, decomposition of the polymer chain or thermal denaturation is inhibited, thereby improving heat and light resistances and increasing its mechanical strength.

Then, the glass composite material having the structure (B) is synthesized from a precursor polymer wherein a crosslinkable group (for example, hydroxyl group, alkoxyl group, ester group such as acetoxy group, sulfonate group such as trifluoromethanesulfoxy group) as the side chain is directly bonded to the main chain of polysilanes.

The glass composite material is produced by using, for example, a precursor polymer containing a hydroxyl group or alkoxyl group having a repeating unit represented by the formula (I) or (II):

wherein M is at least one element selected from Si, Ge and Sn; $R^1$ and $R^2$ may be the same or different and are selected from substituted or non-substituted alkyl, aryl and aralkyl groups; and the number of carbon atoms of $R^1$ and $R^2$ is 1 to 15, respectively, and subjecting hydroxyl groups or alkoxyl groups of the side chain to desolvation condensation. A homopolymer or a copolymer of organosilane, organogermane or organostannane represented by the formula (I) or (II) contains a hydroxyl group or a substituted or non-substituted alkoxyl group wherein an oxygen atom is directly bonded to a silicon, germanium or stannum atom, and has a repeating unit wherein the number ratio of the silicon, germanium or stannum atom to the hydroxyl or alkoxyl group is 1:2 and 1:1 in the formulas (I) and (II), respectively. Examples thereof include the followings.

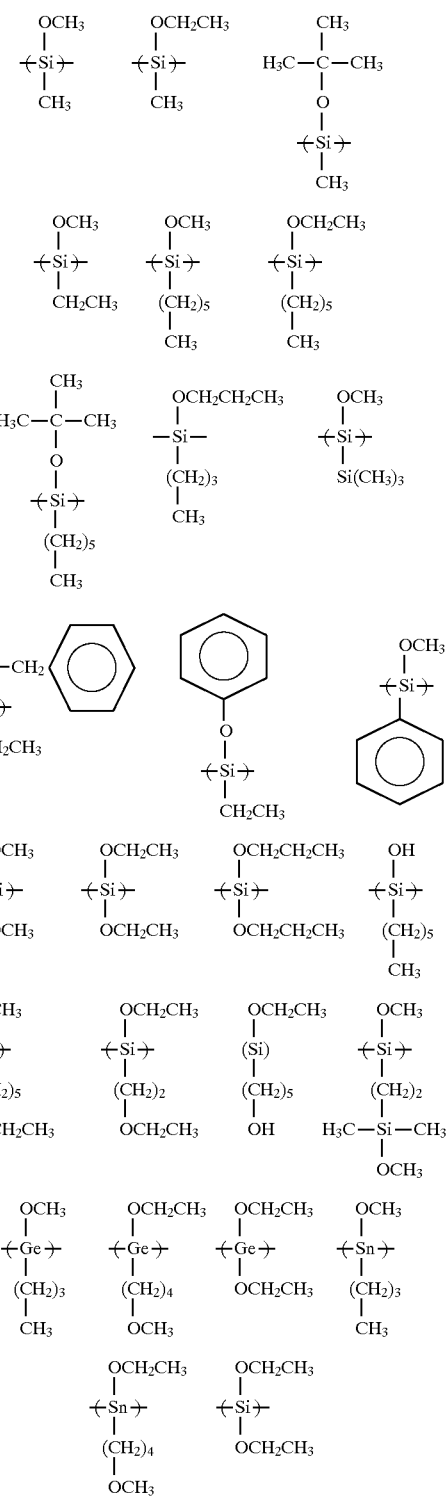

The precursor polymer having a repeating unit represented by the formula (I) or (II) can be produced, for example, according to the following method. Hereinafter, the process for producing a polysilane precursor polymer as the representative of the precursor polymer will be explained.

(a) For example, it can be synthesized by reacting dichlorosilane represented by the following formula (S1) or (S2) with metallic sodium or metallic lithium in a solvent such as toluene or ether and subjecting dichlorosilane to condensation.

(b) It can also be synthesized by reacting poly(diarylsilane) represented by the following formulas (PS1) to (PS5) with an acid such as trifluoromethanesulfonic acid in a solvent such as methylene chloride, as is reported in K. Matyjazewski et al., J. Organomet. Chem., 340, 1988, 7. Here, polysilanes containing an ester group can be synthesized by reacting carboxylic acid or carboxylate in place of alcohol.

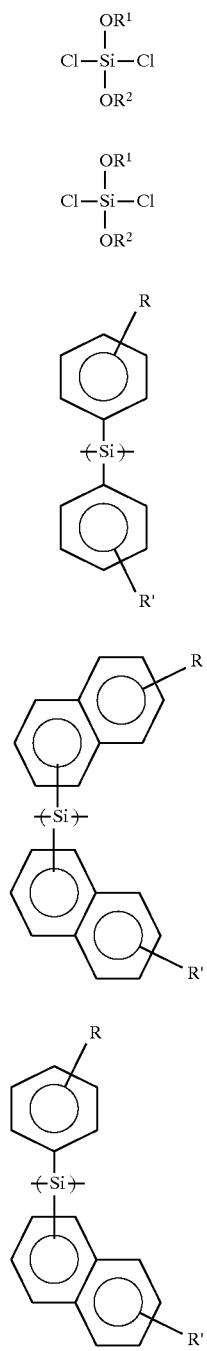

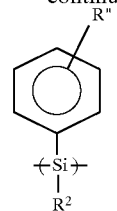

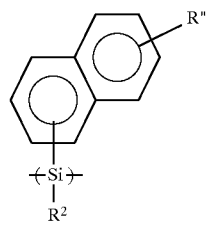

Furthermore, polysilane containing an alkoxyl group at the side chain can also be synthesized by a method (c) of subjecting a four-membered ring of Si, Ge or Sn substituted with the alkoxyl group to ring-opening polymerization as reported in K. Matyjazewski, Macromol. Chem., Macromol, Symp., 42/43, 269–280, 1991; a method (d) of conducting electrolysis polymerization using a halide of the above metal M atom substituted with the alkoxyl group; a method (e) of polymerizing an alkoxide of the metal M by disproportionation using a catalyst such as base, as reported in Kabeta et al., Chem. Lett., 835, 1994; a method (f) of reacting a resin containing a M—H bond, such as poly(phenylhydrosilylene) with a carbonyl compound such as aldehyde or ketone in the presence of AIBN (azobisisobutyronitrile) and the like, in addition to the above method.

It should be noted that among polysilanes as the raw material of the glass composite material having the above structure (A), when using those wherein the hydroxyl group (—OH) and/or alkoxyl group (—OR) are introduced in the state that the oxygen atom is bonded directly to a part of the side chain, the glass composite material having the above structure(B) can be produced.

Polysilanes represented by the formula (I) or (II) may be those wherein the main chain is composed of the above polymers and polymers other than these polymers, e.g. polysiloxane (silicone), polyamide, polyimide, polyester, etc. In addition, the form of the polymer chain may be take any form such as one-dimensional chain, branched chain, ladder form, two-dimensional sheet-like chain, three-dimensional chain or cyclic chain such as five-membered ring, six-membered ring, or parallelepiped octasilacubane. The degree of polymerization is not specifically limited, but the number (n) of successive atoms of Si, Ge or Sn is preferably 6 to 100000, more preferably 10 to 10000, most preferably 20 to 5000.

Polysilanes represented by the formula (I) or (II) can be crosslinked between molecules or in the molecule by the condensation reaction between the hydroxyl group and alkoxyl group of the polymer side chain to form a glass component of a metal oxide having a bond of the silicon atom, germanium atom or stannum atom with the oxygen atom. Therefore, it is not necessary to use a glass matrix-forming material such as metal alkoxide used for the glass composite material having the structure (A). That is, the glass composite material having the structure (B) according to the present invention can be produced by forming polysilanes represented by the formula (I) or (II) into a thin film and subjecting alkoxyl groups of the side chain to desolvation condensation with heating or an action of an acidic or basic catalyst, which results in vitrification. Here, as the catalyst, there can be used the same catalyst as that used when the glass composite material having the structure (A) is produced by a sol-gel method.

In this case, the glass composite material having the structure (B) according to the present invention can be synthesized, more preferably, by using polysilanes represented by the formula (III) or (IV) among polysilanes represented by the formula (I) or (II), as the precursor. This reason will be explained below. That is, polysilanes containing an alkoxyl group such as methoxy group or ethoxy group among polysilanes represented by the formula (I) or (II) often have a comparatively high reactivity of hydrolysis because of small steric hindrance and, therefore, they can cause the crosslinking reaction, easily. On the other hand, these polysilanes are inferior in storage stability and the handling thereof is difficult. To the contrary, polysilanes represented by the formula (III) or (IV) have a structure of tertiary butyl or isopropyl or derivatives thereof and cause a large steric hindrance and they are not hydrolyzed easily so that they are extremely superior in storage stability. And besides, when these polysilanes are reacted with an acidic catalyst, an oxygen-carbon bond is easily cleaved and a residue of tertiary butyl or isopropyl or derivatives thereof is eliminated to form a hydroxyl group. Then, this hydroxyl group and the other hydroxyl group are subjected to dehydration condensation, which results in vitrification. Therefore, these polysilanes have such a function as a latent precursor polymer that they are superior in storage stability and, at the same time, they are easily vitrificated when they are once activated. Therefore, they are extremely useful. These polysilanes can also be synthesized by the above-described method. Examples of polysilanes represented by the formula (III) or (IV) will be described below.

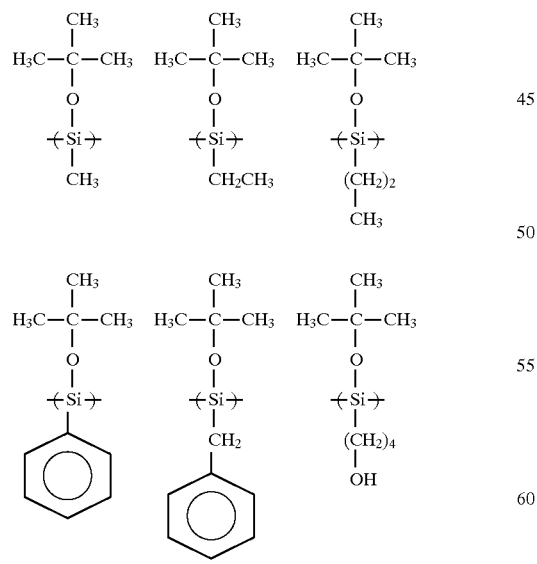

-continued

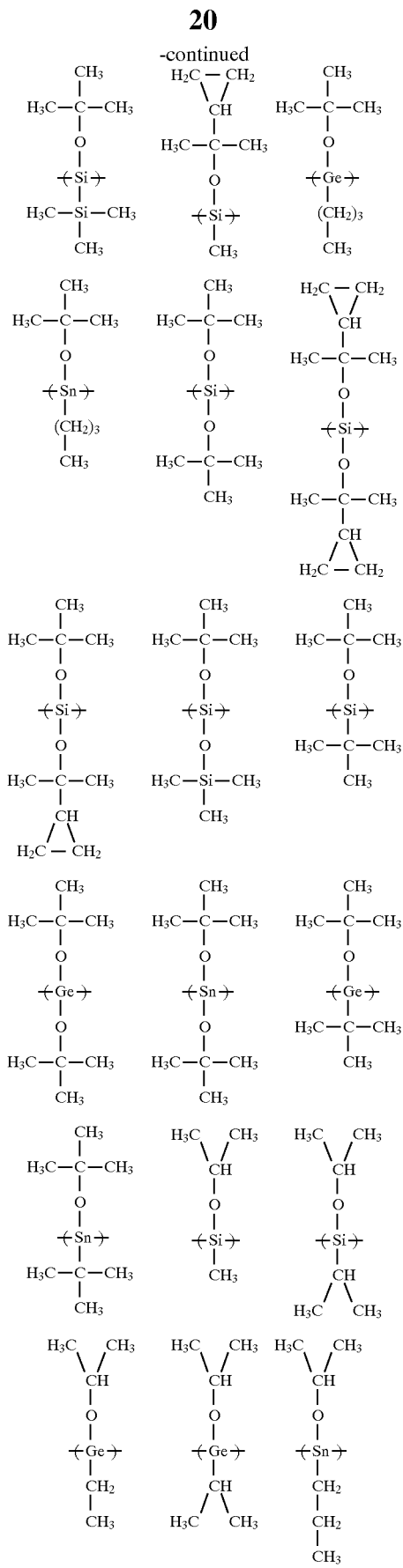

-continued

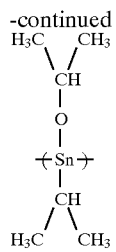

In the glass composite material having the structure (B) according to the present invention, the main chain of polysilanes is bonded directly to the oxygen constituting the glass component as a spacer in extremely high density. Therefore, a large improvement in durability can be expected. Furthermore, since this glass composite material can be produced using only a precursor polymer, the formability is good and the amount of the main chain of polysilanes to be contained is high. Therefore, it is advantageous in view of the development of the function.

Furthermore, the glass composite material having the structure (B) can also be synthesized by a CVD method. That is, a substrate such as silicon or quartz glass is provided in a CVD chamber, diluted silane-based gas is supplied to the chamber, and then a film of polysilane is formed on the substrate by decomposing the gas. During or after the formation of polysilane film, an oxygen-containing gas is supplied to the chamber, thereby substituting an active hydrogen atom in the polysilane film with a hydroxyl group. The polysilane film is heated and the polymer main chains of polysilane film are crosslinked with each other, thereby synthesizing the glass composite material having the structure (B).

In this method, example of silane-based gas is silane, dichlorosilane, trichlorosilane, tetrachlorosilane, disilane, trisilane or tetrasilane or a mixed gas thereof. Examples of gas for use in diluting the silane-based gas include hydrogen, argon, helium and nitrogen. Examples of oxygen-containing gas include $H_2O$, inert gas such as nitrogen, argon and helium, and hydrogen that contains oxygen; and air and a mixed gas thereof. It is preferred that the oxygen content of the oxygen-containing gas is 30% or less. The temperature upon crosslinking is set to over a temperature that Si—O—Si bond can be formed by a dehydration reaction from two hydroxyl groups, for example, 60° C. or more, and below a temperature that the polymer chain of polysilane is decomposed.

Such a process of synthesizing a glass composite material (oxygen-crosslinked polysilane) by a CVD method can be incorporated into a process for producing a semiconductor. Therefore, a photoelectric integrated circuit can be formed by integrating optical device utilizing luminescent function of the oxygen-crosslinked polysilane with a semiconductor device. In addition, the composite material can be mass-produced in comparison with the case of liquid phase synthesis and, therefore, the cost can be reduced. Furthermore, the CVD method is excellent process in view of lower contamination by impurity.

The effect of the glass composite material having the structure (A) or (B) described above will be explained below. In the glass composite material of the present invention, the crosslinked portion of the polymer chain is firmly supported with the glass matrix around it so that a part of the polymer chain can be bonded again even if it is cleaved by an energy such as light. Since the fixing effect of the polymer chain of polysilanes is enhanced, photodegradation resistance, thermal decomposition resistance and chemical decomposition resistance are superior. When main chains of polysilanes are crosslinked each other by forming a M—O—M bond, the conjugation of the main chain of polysilanes extends over the crosslinked product by bridging effect of the oxygen atom. Therefore, from the electrical viewpoint, the mobility of carriers is improved, which results in good electric conductivity. Also, from the optical viewpoint, the intensity of photoluminesence (PL) and electroluminescence (EL) is enhanced. In addition, an effect such as luminous wavelength shifts can be obtained according to the chain number of Si, Ge or Sn in the polymer main chain or crosslinking degree. Furthermore, in the glass composite material of the present invention, even if the amount of polysilanes is large, the fixing effect of the polymer main chain of polysilanes is high. Therefore, it is advantageous for the development of the above electric and optical characteristics. On the other hand, in the polysilane-glass composite material obtained by mixing polysilanes with silicate glass, which has hitherto been known, the proportion of silicate glass as an insulating material is extremely large and the crosslinking degree of the polysilane main chain is not sufficient and, therefore, the same effect as that of the glass composite material of the present invention can not be obtained.

In the glass composite material of the present invention, it is preferred that the polymer chain is chemically crosslinked with a glass matrix of the network structure of the metal oxide at three or more positions in order to obtain the above effect. As described above, when the number of the crosslinked point on the precursor polymer chain is not less than 3, a phase separation between the polymer chain of polysilanes and glass matrix can be prevented. The number of the crosslinked point is preferably not less than 5, more preferably not less than 10 in order to enhance the fixing effect of the polymer chain. However, the crosslinking degree can be selected from a wide range according to the use, e.g. from a state that it is easily dissolved in a solvent because of low crosslinking degree to a state that it has a solubility to the solvent but has a high hardness and a sufficient mechanical strength because of extremely high crosslinking degree and it can be used as a formed article. Such a crosslinked product can be made in a formed product insoluble to a solvent and having an excellent solvent resistance, by enhancing crosslinking after it is formed. The number of the crosslinked point on such a polymer chain can be easily analyzed by calculating the reaction rate of the functional group in the precursor polymer.

Next, the physical properties to be satisfied by the glass composite material according to the present invention so as to develop excellent optical and electric characteristics with enhancing the durability will be explained while comparing with a siloxene material which has hitherto been known, considering an application to various devices.

It is considered that the siloxene compound which has hitherto been known has a structure wherein the chain of silicon is crosslinked with the oxygen atom. However, there has only been proposed a case wherein a powder of the siloxene compound is subjected to a press molding to make into a pellet because it is insoluble to a solvent. Such a pellet is substantially one wherein the powder becomes solid and it contains a lot of grain boundaries. When a lot of grain boundaries are present, the electric conductivity is considerably deteriorated. In addition, the pellet of the siloxene compound contains grain boundaries having a size which can not be optically neglected. Therefore, light passing through this material is liable to be scattered and coherence can not be maintained to light having a specific wavelength. Furthermore, in the siloxene compound containing silicon crystallite, since the polymer chain of crosslinked polysilanes and the silicon crystallite differ in excitation energy, an energy level due to the silicon crystallite is formed. As a result, when using it as a PL material such as a laser medium, a non-luminescence level is formed and a fluorescence having a wavelength different from a desired wavelength is emitted, which results in cause of deterioration of the PL efficiency. Similarly, when using it as an EL material, a non-luminescence level is formed and carriers are trapped to deteriorate the transport efficiency of carriers, which results in cause of deterioration of the EL efficiency. Further, a high crystalline Si atom of which all four valences form a Si—Si bond acts as a non-luminescence center to hole-electron pair luminescence, which results in cause of deterioration of the EL efficiency. Furthermore, when using it as a non-linear optical material, a silicon crystallite is liable to absorb excited light to deteriorate the light wavelength conversion efficiency.

To the contrary, in the glass composite material of the present invention is superior in such a respect that a substance which can be the factor of inhibiting the development of the electric and optical characteristics, for example, silicon crystallite contained in the siloxene compound, is scarcely present. Hereinafter, the physical properties such as volume resistivity, coherence, content of silicon, germanium or stannum crystallite, content of an M atom of which all four valences form a M—M bond will be explained in detail in relation to above inhibition factors.

(Volume resistivity)

The glass composite material of the present invention has a high electric conductivity because the conjugation of the polymer chain of polysilanes is extended and a grain boundary is scarcely present, which is shown by the fact that the volume resistivity measured according to a disc plate electrode method described in JIS C2151 is low. The film thickness of the sample to be used for the measurement according to the disc plate electrode method is preferably 0.02 to 0.1 $\mu$m, more preferably 0.05 to 0.1 $\mu$m. The applied voltage is adjusted to not less than 1 V, preferably not less than 2 V, more preferably not less than 5 V, most preferably not less than 10 V, according to the film thickness of the sample, to set a ratio of voltage to film thickness, i.e. electric field strength at $10^6$ V/cm. The size of the electrode is fundamentally selected according to the description of JIS C2151, but is sometimes changed according to the shape and size of the sample. Regarding the material of the electrode, ITO is used as the positive electrode and gold, copper or aluminum is uses as the negative electrode. That is, it is preferred to use the combination wherein a work function of the negative electrode is smaller than that of the positive electrode. It is most preferred to use ITO as the positive electrode and aluminum as the negative electrode. The glass composite material of the present invention has a volume resistivity of not less than $3\times10^6$ $\Omega$cm, which is measured under these conditions. The volume resistivity is not more than $1.5\times10^6$ $\Omega$cm, preferably not more than $8\times10^5$ $\Omega$cm, more preferably not more than $6\times10^5$ $\Omega$cm, most preferably not more than $4\times10^5$ $\Omega$cm.

(Coherence)

The glass composite material of the present invention contains no particle having a particle size larger than the light wavelength and grain boundary which can be the factor of scattering and it is optically uniform. Therefore, a coherence is maintained to light having a wavelength within a range of 300 to 800 nm. Upon taking optical characteristics such as absorption and luminescence of polysilanes into consideration, the wavelength to maintain the coherence is within a range of 280 to 900 nm, more preferably 220 to 1200 nm. This condition is important over optical applications.

The coherence is maintained by the fact that the haze rate is not more than 20%. This value is preferably not more than 10%, more preferably not more than 5%, most preferably not more than 3%. When using a thin film as the sample, the haze rate is evaluated by the value obtained upon entering light perpendicular to the surface of the sample. When using a formed article other than it, the haze rate is evaluated by the value obtained upon entering light which is parallel to an optical axis wherein light comes out from or enters into the formed article in a device, like emitting light by EL emission.

(Content of silicon crystallite)

As described above, the siloxene compound contains a silicon crystallite and, therefore, signals due to the silicon crystallite are observed at about 28.4°, 47.3° and 56.1° of 2 $\theta$ according to a X-ray diffraction using a Cu tubular bulb as a X-ray source. Likewise, regarding a germanium or stannum crystallite, signal are observed at about 27.3°, 45.3° and 53.7° of 2 $\theta$ and about 23.7°, 34.2° and 46.4° of 2 $\theta$, respectively, according to a X-ray diffraction using a Cu tubular bulb as a X-ray source, although the signal varies depending upon the crystal form thereof. To the contrary, the glass composite material of the present invention scarcely contain the silicon, germanium and stannum crystallite, and the area of the signals due to the silicon, germanium and stannum crystallites observed within a range of 20° to 60° of 2 $\theta$ according to a X-ray diffraction using a Cu tubular bulb as a X-ray source is not more than 1% of the total area of the all signals, preferably not more than 0.1%, more preferably not more than 0.01%. Provided that the area of the all signals is not a total area of signals within a range of 20° to 60° (2 $\theta$) but a total area of all signals within a whole range of 2 $\theta$. This condition is particularly important in application to the non-linear optical device and laser device to improve the light wavelength conversion efficiency and PL efficiency.

In the glass composite material of the present invention, it is preferred that the content of the silicon crystallite, germanium crystallite and stannum crystallite is controlled and, at the same time, the content by atomic ratio of M atoms of which all four valences form an M—M bond is set at less than 10%. The amount of such M atoms can be determined by measuring XPS or solid NMR. This condition is particularly important in application to the EL device to improve the EL efficiency.

Furthermore, when the glass composite material of the present invention is applied to various devices, it is necessary to incorporate it into devices as a cured product or a formed product having a predetermined shape, such as a thin film. For this purpose, it is preferred that it has a sufficient hardness and a practical solvent-solubility at the time of film-forming. The surface hardness and content of C atoms will be explained as to these properties.

(Surface hardness)

When using the glass composite material of the present invention as the cured product, the surface hardness measured by a pencil scratching test (JIS K5401) is preferably not less than 3B. The surface hardness is B or more, preferably 1H or more, more preferably 2H or more, still more preferably 4H or more, most preferably 6H or more. In order to satisfy these conditions, it is required that 20% or more sites of the crosslinkable functional groups in the polymer side chain are crosslinked. The crosslinked sites are 30% or more, preferably 50% or more, more preferably 80% or more, most preferably 90% or more of the functional groups. In the present invention, a glass composite material having an extremely excellent durability can be obtained by enhancing the reaction rate of the functional groups in the polymer side chain to increase the crosslinking density.

It is possible to determine the reaction rate of is the functional groups quantitatively by secondary ion mass spectrometry, NMR, IR, or XPS. Furthermore, a decrease in weight is caused by the elimination of water or alcohol at the time of crosslinking reaction so that the reaction rate of the functional groups can also be calculated by a thermogravimetric analysis (TG).

(Content of C atoms)

It is preferred that the glass composite material of the present invention contains C atoms of not less than 0.1% by atomic ratio in order to improve the film-forming properties and flexibility of the formed product. Upon taking only film-forming properties into consideration, the glass composite material is dissolved in the solvent more easily as the content of the C atoms becomes large. Therefore, the content of the C atoms is preferably not less than 1%, more preferably not less than 10%.

Next, nitrogen-containing composite material of the present invention will be described. This nitrogen-containing composite material comprises a polymer chain selected from the group consisting of polysilane, polygermane and polystannane and a copolymer thereof, and an inorganic or organic matrix, wherein the polymer chain is chemically crosslinked with the inorganic or organic matrix through an nitrogen atom which is bonded directly to a Si, Ge or Sn atom on the polymer main chain.

More specifically, the nitrogen-containing composite material may have a structure (C) wherein a polymer chain selected from the group consisting of polysilane, polygermane and polystannane and a copolymer thereof and an organic matrix such as aniline resin, polyaniline or polypyrrole or a mixture or copolymer thereof are contained, and a Si, Ge or Sn atom on the polymer main chain and a nitrogen atom in the organic matrix are directly formed a bond, thereby crosslinking; a structure (D) wherein a polymer chain selected from the group consisting of polysilane, polygermane and polystannane and a copolymer thereof and an inorganic matrix of a network structure having a metal-nitrogen-metal bond are contained, and a Si, Ge or Sn atom on the polymer main chain and a nitrogen atom in the organic matrix are directly formed a bond, thereby crosslinking; or a structure (E) wherein a polymer chains selected from the group consisting of polysilane, polygermane and polystannane and a copolymer thereof are crosslinked through a nitrogen atom which is bonded directly to a Si, Ge or Sn atom on the polymer chain, and a bond between silicon, germanium or stannum atoms through the nitrogen atom forms an inorganic matrix.

Then, the nitrogen-containing composite material having the above structure (C) will be explained. The polysilanes for use in producing the nitrogen-containing composite material having this structure are similar to those described in relation to the glass composite material having above structure (B). That is, a polymer selected from the group consisting of polysilane, polygermane and polystannane and a copolymer thereof wherein at least one polar group which is subjected to an elimination reaction such as hydroxyl group and alkoxyl group, and further amino group is introduced in the side chain of the polymer.

Here, the polysilanes containing an amino group may be synthesized, for example, by reacting polysilanes having aromatic substituents with an acid such as hydrochloric acid or trifluoromethanesulfonic acid in a solvent such as methylene chloride, followed by reacting with ammonia or amines. Also, they may be synthesized using a process via masked disilene proposed by Yoshida et al. [Yoshida, Sakamoto and Sakurai; Japanese Chemical Society, Preprints of 65th Spring Meeting, 3F322 (1993)].

As to the chemical structure and the form of the polymer main chain, the same discussion as described above can be adopted. The degree of polymerization is not specifically limited, but the number (n) of successive atoms of Si, Ge or Sn is preferably 4 to 100000, more preferably 10 to 10000, most preferably 30 to 1000. When n is too large, the solubility of the polysilanes to the solvent is deteriorated, as well as the compatibility thereof with polyaniline or polypyrrole is lowered, thereby making it difficult to prepare a crosslinked product.

An aniline resin, polyaniline and polypyrrole used as another component of the raw material of the nitrogen-containing composite material having the structure (C) may be those wherein at least a part of nitrogen atom among nitrogen atoms in the main chain has an active hydrogen. Accordingly, they may be those of which main chain comprises a homopolymer of aniline resin, polyaniline or polypyrrole or a copolymer thereof. Further, they may be those of which main chain comprises a block copolymer of these polymers and polymers other than these polymers, such as polysiloxane (silicone), polyamide, polyimide, polyester, polyether, vinyl resin, acrylic resin, or polythiophene. The polymer chain may take any form such as one-dimensional chain, branched chain, two-dimensional chain, three-dimensional chain, or cyclic form. Preferably, they may take any form other than three-dimensional chain. This is because the polymer main chain of polyaniline or polypyrrole is in an entangled state in the form of three-dimensional chain so that a crosslinking is not sufficiently conducted. The degree of polymerization is not specifically limited, but the number (n) of successive repeating units such as aniline or pyrrole is preferably 4 to 100000, preferably 20 to 1000, more preferably 300 to 1000. This reason is as follows. That is, when n is too small, the essential function of polyaniline or polypyrrole is prevented and, at the same time, the effect of organic matrix to fix the polysilanes is lowered. On the other hand, when n is too large, the solubility of the polymer such as polyaniline or polypyrrole to the solvent is deteriorated, as well as the compatibility thereof with the polysilanes is deteriorated, thereby making it difficult to prepare a crosslinked product.

When the polysilanes containing a functional group are mixed with polyaniline or polypyrrole as they are or in the state of a solution, N atoms on polyaniline or polypyrrole make a nucleophilic attack upon a Si, Ge or Sn atom (M atom) of polysilanes to eliminate the functional group, thereby forming a M—M bond. On the other hand, even if all functional groups of polysilanes are not reacted with N atoms, excess functional groups such as alkoxyl groups are hydrolyzed and crosslinked each other to form a M—O—M bond. Thus, polysilanes are chemically bonded to polypyrrole or polysilane, or polysilanes are chemically bonded each other to form a network crosslinked structure.

The amount of organic matrix material to be mixed with polysilanes having a functional group at the side chain is not specifically limited, but is normally 5 to 5000% by weight, preferably 50 to 2000% by weight, more preferably 100 to 500% by weight. When the amount of organic matrix material is too small, the effect of fixing the main chain of polysilanes is not sufficient. On the other hand, when the amount is too large, the development of the function of polysilanes becomes small in the whole composite material.

In the nitrogen-crosslinked polysilanes having the structure of (C), the decomposition of polysilanes is hard to occur, thereby improving the light resistance. In addition, since polysilanes and organic matrix of polyaniline etc. are charge transport polymers, simultaneously, the charge transport properties are improved by an interaction between these polymers. In addition, the electronic state is changed by bonding the N atom directly to the main chain of polysilanes to develop PL and EL characteristics.

In order to improve above functions, various electron donor substances and electron acceptor substances may be doped. Examples thereof include iodine, iron (II) chloride, hydrochloric acid, nitric acid, sulfuric acid, phosphoric acid, oxalic acid, p-toluenesulfonic acid, methanesulfonic acid, and trifluoromethanesulfonic acid. They are used alone or in combination.

It should be noted that the nitrogen-containing composite material containing an organic matrix can be produced by reacting polysilanes having amino groups with a resin, described hereinafter, in which a functional groups capable of reacting with the amino group is introduced at least a part thereof. Examples of above resin include phenolic resin, furan resin, xylene-formaldehyde resin, urea resin, melamine resin, alkyd resin, unsaturated polyester resin, epoxy resin, triallylcyanurate resin, acrolein resin, maleimide resin, triazine-based resin, polyethylene, polypropylene, polystyrene, polyparaxylene, polyvinyl acetate, polyacrylate, methacrylic resin, polyvinyl chloride, polyvinylidene chloride, fluororesin, polyacrylonitrile, polyviny ether, polyvinyl ketone, polyether, polycarbonate, polyamide, polydiene, polyurethane, polyphenylene, polyphenylene oxide, polysulfone, silicone resin, rubber, cellulose, protein, polyacetylene, poly(paraphenylene sulfide), and polythiophene. They may be used alone or in combination. Besides above-described resin, a low molecular-weight amine compound may be used. Examples of amine compounds are xylylenediamine and 2,6-diaminonaphthalene etc.

Then, the nitrogen-containing composite material having the structure (D) will be explained. The nitrogen-containing composite material having this structure can be synthesized by reacting polysilanes similar to those described in relation to the glass composite material having the structure (B) with a compound to be an inorganic matrix having a metal-nitrogen-metal bond, for example, polysilazane sol. Note that the inorganic matrix forming a network structure may contain not only the metal-nitrogen-metal bond, but also a metal-oxygen-metal bond.

The polysilazane sol can be prepared, for example, by subjecting halides, alkoxides or carboxylates of a metal to ammonia decomposition or amine decomposition, followed by polymerizing the resultant product, as described in a process of W. S. Cobalenz et al. [Materials Science Research, Vol. 17, ed. by R. F. Davis, H. Palmour and R. L. Porter, Pinums Press, New York (1984), pp. 271–285].

The amount of inorganic matrix material to be mixed with polysilanes having a functional group at the side chain is not specifically limited, but is normally 5 to 5000% by weight, preferably 50 to 2000% by weight, more preferably 100 to 500% by weight. When the amount of inorganic matrix material is too small, the effect of fixing the main chain of polysilanes is not sufficient. On the other hand, when the amount is too large, the development of the function of polysilanes becomes small in the whole composite material.

In the nitrogen-crosslinked polysilanes having the structure (D) thus obtained, it becomes difficult to cause decomposition of polysilanes, thereby improving the light resistance. In addition, the electron state is changed by bonding the N atom directly to the main chain of polysilanes, thereby developing PL and EL characteristics, and also improving non-linear optical characteristics.

It should be noted that the nitrogen-containing composite material having the structure (D) may be synthesized by using a metal nitride for the material of the inorganic matrix. As the metal nitride, for example, there can be used nitrides of metals, such as Si, Al, Ti, B, Zr, V, W, Hf, Ta, U, Th, Be, Nb, Cr, Mo, and La. Further, metal oxides may be used with the metal nitrides. Examples of the metal oxide to be used in combination include oxides of metals, such as Si, Ge, Sn, Pb, Al, Ga, As, Sb, Bi, Ti, Zr, V, Nb, Ta, Na, K, Li, Ca, Mg, Ba, and Sr.

The nitrogen-containing composite material having an inorganic matrix can be synthesized by reacting polysilanes in which amino groups are introduced with inorganic polymer or metal oxide gel. Examples of metal oxide gel include silica gel, alumina, titanium oxide, zirconium oxide, indium oxide, tin oxide. At the same time, fine particles of various ceramics or clay may be dispersed in the nitrogen-containing composite material. Examples of ceramics include silicon carbide, silicon nitride, titanium nitride, calcium silicide, and siloxene. Examples of clay include montmorillonite, saponite, and mica.

Furthermore, a nitrogen-containing composite material having the structures (C) and (D) together can be synthesized by using organic and inorganic matrix materials and polysilanes are crosslinked with both matrix materials.

Then, the nitrogen-containing composite material having the structure (E) will be explained. The nitrogen-containing composite material having this structure can be synthesized by decomposing the functional groups at the side chain of polysilanes by using ammonia or an organic amine such as methylamine, ethylamine, z-aminoethanol and aniline, and then heating or reacting with a catalyst, preferably under an anhydrous condition, to cure. In this structure, the main chains of polysilanes are crosslinked each other through a nitrogen atom, and the resultant M—N—M bonds (wherein M is Si, Ge or Sn atom) constitute the inorganic matrix.

In the nitrogen-containing composite material of this structure (E), the main chain of polysilanes is bonded directly through a nitrogen atom as the crosslinked structure in extremely high density and, therefore, a large improvement in durability is expected. In addition, since this nitrogen-containing composite material can be synthesized by using a precursor polymer only, it has a high content of the main chain of polysilanes and, therefore, it becomes advantageous in view of the development of the function.

As described above, the nitrogen-containing composite material having a structure that the main chain of polysilanes is crosslinked through a nitrogen atom can exhibit the same effect as the above-described glass composite material. Also, in the nitrogen-containing composite material having a structure (C) or (E), the electric conjugation of polysilane main chain is extended to the other polysilane main chain through a nitrogen atom to exhibit carrier transport, luminance and non-linear optical characteristics. In this case, it is expected that the enhanced conjugation effect can be obtained because the spread of electrons is broader in the nitrogen atom than in the oxygen atom. Especially, in the case where nitrogen atoms bonded directly to the main chain of polysilanes are bonded to form an azo bond, it is expected that the conjugation effect can be more enhanced and, therefore, it is extremely useful. Furthermore, in nitrogen-containing polysilanes having the structure (E), a more rigid network structure can be constructed by effectively utilizing three valences of the nitrogen atom, compared with the oxygen-crosslinked polysilanes in which crosslinking is conducted through oxygen atom having two valences. The preferable physical properties to be satisfied by the nitrogen-containing composite material according to the present invention are similar to those for above-described glass composite material.

Then, as the application example using the composite material, i.e., the glass composite material and the nitrogen-containing composite material, of the present invention, the patterning for the emergence of different functions in one formed product and application for photoelectric devices such as electroluminescent device, photosensitive element for electrophotography, non-linear optical device and laser device will be explained. In the explanations below, examples of devices in which the glass composite material (oxygen-crosslinked polysilanes) is used. however, the glass composite material is described as a representative of the composite material of the present invention. Of course, the nitrogen-containing composite material is applicable similar to the glass composite material.

(Patterning)

Regarding polysilanes to be used for the precursor of the glass composite material according to the present invention, various electric and optical characteristics described above can be developed by converting into a composite material in which the polymer chain of polysilanes is crosslinked with the glass matrix according to the suitable reaction. On the other hand, when polysilanes of the precursor are oxidized, the polymer chain is cleaved to generate a large amount of portions of a metal oxide so that such a material has characteristics which are different from those of the above glass composite material. Accordingly, there can be formed regions having two different characteristics when the above two reactions are carried out in one formed product.

A product having a desired pattern can be obtained, for example, by a method comprising steps of preparing a solution of polysilanes as a precursor, applying the solution on a suitable substrate to form a film, selectively exposing a part of the film to light, having a wavelength absorbed by polysilanes or having a shorter wavelength, through a predetermined mask, followed by heating. That is, the polymer chain is cleaved by photo-oxidation at the exposed area to generate a large amount of a metal oxide, and a glass article containing little or no polysilanes is formed by the following heating. On the other hand, the crosslinking reaction proceeds by heating to form a glass composite material at the non-exposed area.

Upon paying attention to the optical characteristics, the non-exposed area exhibits functions such as ultraviolet absorption ability (ultraviolet shielding ability), and fluorescence emission, while the exposed area does not develop these functions. Accordingly, it can be applied for ultraviolet-resistant hard coating by making use of the ultraviolet shielding ability, and it can applied for transparent bar code, angle of visibility selective coating, and hollow window film, by making use of the fluorescent properties. In addition, since the non-exposed area and exposed area differ in refractive index, it can also be applied for light waveguide path, and optical memory portion of hologram). Regarding the light waveguide path, the non-exposed area of the glass composite material may be a core or a clad, and the shape is not specifically limited. Upon paying attention to the electric characteristics, the non-exposed area has a low resistance and the exposed area has a high resistance so that the thin film of polysilanes can be used for electrically connecting a printed board in which an electrode having a predetermined pattern is formed with an electric part to be mounted thereon.

(Electroluminescent device)

There have recently been developed intensively electroluminescent (EL) devices in that high luminance can be obtained at a low voltage using an organic compound. However, there is a problem that these devices are considerably inferior in durability and it is necessary to use a vacuum deposition process in all layers so as to obtain a good luminance, thereby increasing the cost. In Japanese Laid-Open Patent Publication No. 3-126787, there is disclosed an EL device using polysilane, however, polysilane which have hitherto been used have various problems as described above. In Phys. Rev. B49 (1994), 14731, there is disclosed that a visible EL emission can be obtained by using a porous polysilane obtained by subjecting a crystalline silicon to an anodizing process. However, since the porous polysilane is prepared by etching a silicon substrate, no film can be formed by a laminating method or a coating method. In Phys. Rev. Lett. 69 (1992), 2531, there is disclosed that siloxene generates fluorescence or phosphorescence. However, since siloxene is insoluble to the solvent as described above, no film can be formed by a laminating method or a coating method. Furthermore, the above porous polysilane and siloxene has a problem that they form a non-luminescent level to deteriorate the EL efficiency because they contain a Si crystal, respectively.

On the contrary, the glass composite material of the present invention can form a film having a high mechanical strength and is superior in light resistance and furthermore, it can reduce the amount of silicon, germanium or stannum crystallite and make the best use of characteristics of polysilanes per se. Therefore, it can be used as a constituent element of the EL device.

The electroluminescent device of the present invention has a luminescent layer between a pair of electrodes, the luminescent layer being mainly composed of a glass composite material comprising a polymer chain selected from the group consisting of polysilane, polygermane and polystannane and a copolymer thereof, and a network structure of a metal oxide consisting of a metal atom bonded to the other metal atom through an oxygen atom, wherein the polymer chain is chemically crosslinked with a glass matrix of the network structure of the metal oxide at three or more positions, and the atomic ratio of M atoms (provided that M is at least one element selected from Si, Ge and Sn) of which all four valences form a M—M bond is less than 10%.

Another electroluminescent device of the present invention has a luminescent layer and a charge transport layer between a pair of electrodes, the charge transport layer being mainly composed of a glass composite material comprising a polymer chain selected from the group consisting of polysilane, polygermane and polystannane and a copolymer thereof, and a network structure of a metal oxide consisting of a metal atom bonded to the other metal atom through an oxygen atom, wherein the polymer chain is chemically crosslinked with a glass matrix of the network structure of the metal oxide at three or more positions.

Figure 2:
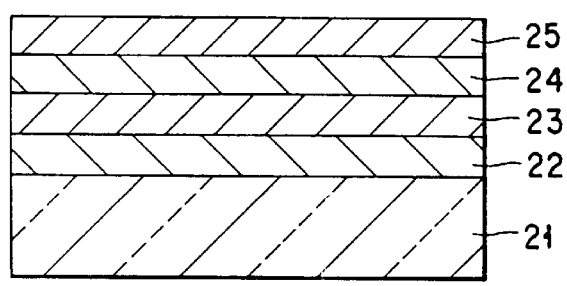
FIG. 2 is a sectional view illustrating another embodiment of an EL device according to the present invention.

Examples of the EL device according to the present invention will be explained with reference to FIGS. 1 and 2. The EL device of FIG. 1 is that obtained by forming in order a hole injection electrode 12, a luminescent layer 13 of the glass composite material of the present invention and an electron injection electrode 14 on a substrate 11. This luminescent layer 13 also acts as a charge transport layer (hole transport layer and electron transport layer). The EL device of FIG. 2 is that obtained by forming in order a hole injection electrode 22, a hole transport layer 23 of the glass composite material of the present invention, a luminescent layer 24 and an electron injection electrode 25 on a substrate 21. Note that, the structure of the EL device is not limited to that shown in FIG. 1 or 2, and it may be a two-layer structure of the luminescent layer and electron transport layer, a three-layer structure of the hole transport layer, luminescent layer and electron transport layer or a multi-layer structure.

In the EL device of the present invention, various organic compounds can be used as the material constituting the layer other than the luminescent layer of the glass composite material and/or charge transport layer. Examples of the organic compound to be used for the hole transport layer include triazole derivative, oxadiazole derivative, imidazole derivative, polyaryl alkane derivative, pyrazoline derivative, pyrazolone derivative, phenylenediamine derivative, arylamine derivative, amino-substituted chalcone derivative, oxazole derivative, styrylanthracene derivative, fluorenone derivative, hydrazone derivative, and stilbene derivative. Examples of the organic compound to be used for the luminescent layer include $Alq_3$, etc. Examples of the organic compound to be used for the electron transport layer include fluorene, anthraquinone, perylene, and anthrone. These organic compounds may be laminated with the luminescent layer of the glass composite material and/or charge transport layer, or may be mixed with the glass composite material to from a layer having a predetermined function. Any layer may be preferably formed in the thickness of 1 to 300 nm, preferably 5 to 150 nm.

The layer of the glass composite material can be formed by applying a precursor thereof by any coating method to form a film and gelling the film. Since the gelled glass composite material becomes insoluble to the solvent, any solvent can be used when other layer is formed thereon by a coating method.

As the substrate, there can be used those of various materials such glass, ceramics, and hard plastic. It is preferred to use a transparent substrate. As the material for the hole injection electrode, there can be used metal oxides such as ITO, $SnO_2$, and $In_2O_3$. As the material for the electron injection electrode, there can be used metals such as Au, Ag, Cu, Al, In, Ni, Mg, Ca, Sn, Pb, and Mn, and alloys containing these metals. It is preferred that any one of these electrodes is transparent or translucent. The EL device of the present invention can be normally driven by applying a dc voltage of about 3 to 50 V and a current of about 0.1 to 5000 $mA/cm^2$ flows, thereby obtaining a luminance of about 1 to 10000 $cd/m^2$. Furthermore, when using the glass composite material as the luminescent layer, the luminous energy varies depending upon the number of successive atoms of Si, Ge or Sn in the polymer main chain or crosslinking degree so that the emission wavelength can be adjusted to some extent. In order to vary the number of successive atoms of Si, Ge or Sn in the polymer main chain or crosslinking degree, there can be used a method of exposing a film of a precursor to light, followed by crosslinking. In this case, the multi-color EL device can be realized by patterning, as described above.

(Photosensitive element for electrophotography)

As the photosensitive element for electrophotography, those comprising a charge generation layer and a charge transport material have recently been proposed. As the charge transport layer, there have been known those obtained by dispersing a charge transport substance of an organic low-molecular weight compound in a binder polymer. However, the charge transport ability is deteriorated by the binder polymer and the stability is also inferior. In Japanese Laid-Open Patent Publication No. 3-293361, there is disclosed a photosensitive element for electrophotography using a polysilane block copolymer. However, such a conventional polysilane also has a problem in durability, as described above. The photosensitive element for electrophotography of the present invention has a charge generation layer and a charge transport layer on a conductive substrate, the charge transport layer being mainly composed of a glass composite material comprising a polymer chain selected from the group consisting of polysilane, polygermane and polystannane and a copolymer thereof, and a network structure of a metal oxide consisting of a metal atom bonded to the other metal atom through an oxygen atom, wherein the polymer chain is chemically crosslinked with a glass matrix of the network structure of the metal oxide at three or more positions. It is superior in durability and can develop a charge transport ability with which is polysilanes are essentially furnished.

Figure 3:
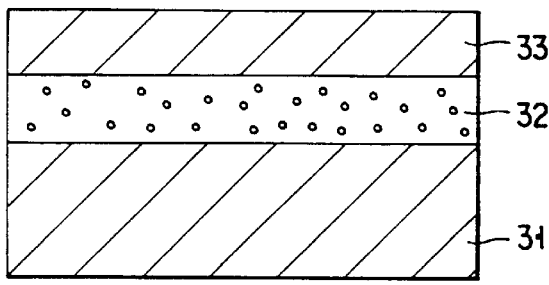
FIG. 3 is a sectional view illustrating one embodiment of a photosensitive element for an electrophotography according to the present invention.
Figure 4:
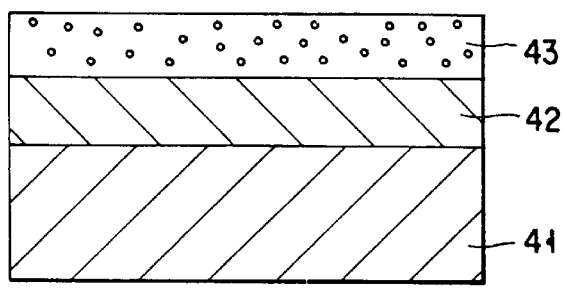
FIG. 4 is a sectional view illustrating another embodiment of a photosensitive element for an electrophotography according to the present invention.

Examples of the photosensitive element for electrophotography according to the present invention will be explained with reference to FIGS. 3 and 4. The photosensitive element for electrophotography of FIG. 3 is that obtained by forming in order a charge generation layer 32 and a charge transport layer 33 of the glass composite material of the present invention on a conductive substrate 31. The photosensitive element for electrophotography of FIG. 4 is that obtained by forming in order a charge transport layer 42 of the glass composite material of the present invention and a charge generation layer 43 on a conductive substrate 41.

As the charge generation substance to be contained in the charge generation layer, there can be used inorganic charge generation substances such as Se, SeTe, and SeAS; organic charge generation substances such as pyrylium, thiopyrylium dyes, phthalocyanine pigments, anthanthrone pigments, dibenzpyrenequinone pigments, pyranthrone pigments, trisazo pigments, indigo pigments, quinacridone pigments, and quinocyanine pigments. A film is normally formed at the state where these are dispersed in the binder polymer.

As the material for conductive substrate, there can be used aluminum, aluminum alloy, copper, zinc, stainless steel, titanium, nickel, indium, gold, and platinum. There can also be used resins coated by these metals using vacuum deposition.

(Non-linear optical device)

The non-linear optical device of the present invention has a non-linear optical phenomenon generating part and a light waveguide part, at least non-linear optical phenomenon generating part being mainly composed of a glass composite material comprising a polymer chain selected from the group consisting of polysilane, polygermane and polystannane and a copolymer thereof, and a network structure of a metal oxide consisting of a metal atom bonded to the other metal atom through an oxygen atom, wherein the polymer chain is chemically crosslinked with a glass matrix of the network structure of the metal oxide at three or more positions, and an area of signals due to silicon, germanium and stannum crystal observed within a range of 20° to 60° of 2 θ according to a X-ray diffraction using a Cu tubular bulb as a X-ray source is not more than 1% of the total area of all signals.

Examples of the non-linear optical device according to the present invention will be explained with reference to FIGS. 5 and 6. The non-linear optical device of FIG. 5 comprises a glass composite material formed in an etched pattern, as depicted, on a substrate 51. The center part is a third non-linear optical phenomenon generating part 52 and the pattern has a shape that two-branched waveguide paths 53, 54 are formed at the incident side of laser beam and three-branched waveguide paths 55, 56, 57 are formed at the outgoing side with respect to this center part. When signal light enters alone from a waveguide path 53, it travels in a straight line to come out from a waveguide path 55. When control light enters alone from a waveguide path 54, it travels in a straight line to come out from a waveguide path 56. However, when signal light enters from a waveguide path 53 and, at the same time, control light enters from a waveguide path 54, diffraction occurs at the third non-linear optical phenomenon generating part 52 to emit diffracted light from a waveguide path 57.

Figure 6:
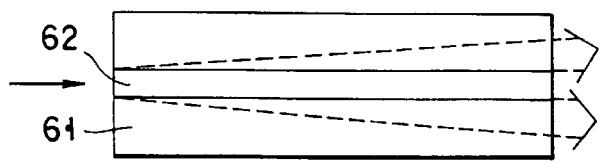
FIG. 6 is a sectional view illustrating another embodiment of a non-linear optical device according to the present invention.

The non-linear optical device of FIG. 6 comprises a second non-linear optical phenomenon generating part 62 of a glass composite material formed in a linear pattern on a substrate 61. A second harmonic is generated in the direction shown by the arrow by passing light through this second non-linear optical phenomenon generating part 62.

(Laser device)

As the portable laser, there have recently been developed semiconductor lasers, intensively. However, 450 nm is the limit of the oscillation wavelength and the oscillation at the wavelength of less than 450 nm have never been realized.

To the contrary, the luminous wavelength of polysilane, polygermane and polystannane is 300 to 400 nm, 350 to 450 nm and 400 to 500 nm, respectively. Therefore, they can be an excellent laser medium in view of wavelength. Since the glass composite material of the present invention can make the best use of the wavelength of these polysilanes, its application as the laser device can be expected.

The laser device of the present invention comprises a laser medium, an oscillator of a pair of mirrors which are deposited oppositely through this laser medium and an excitation means for exciting the laser medium, the laser medium being mainly composed of a glass composite material comprising a polymer chain selected from the group consisting of polysilane, polygermane and polystannane and a copolymer thereof, and a network structure of a metal oxide consisting of a metal atom bonded to the other metal atom through an oxygen atom, wherein the polymer chain is chemically crosslinked with a glass matrix of the network structure of the metal oxide at three or more positions, and an area of signals due to silicon, germanium and stannum crystal observed within a range of 20° to 60° of 2 θ according to a X-ray diffraction using a Cu tubular bulb as a X-ray source is not more than 1% of the total area of all signals.

Figure 7:
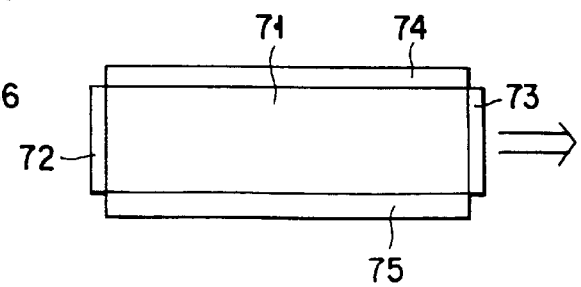
FIG. 7 is a sectional view illustrating one embodiment of a laser device according to the present invention.

An example of the laser device of the present invention will be explained with reference to FIG. 7. In the laser device of FIG. 7, a pair of oscillator mirrors 72, 73 are provided on both ends of a laser medium 71 of a glass composite material, and a pair of excitation electrodes 74, 75 as an excitation means are provided on both surfaces of the laser medium 71. When this laser medium 71 is excited, a laser beam is generated at the direction of the arrow.

Upon applying the composite material of the present invention to above-mentioned devices, if the composite material is used for a functional film formed on an electrode, it is preferred that the electrode surface is chemically bonded to the polymer main chain constituting the functional film through an oxygen atom which is bonded directly to the polymer main chain.

Generally, a conductor or a semiconductor is used as an electrode material of various devices. Examples thereof include metal electrodes such as copper, aluminum, tin, iron, gold, and platinum; carbon electrodes such as graphite, and glassy carbon; electrodes of transparent metal oxides such as $SnO_2$, $Sb_2O_2$—$SnO_2$, and $In_2O_3$—$SnO_2$ (ITO); superconducting electrodes such as Bi—Pb—Sr—Ca—Cu—O, and $YBa_2Cu_3O_{7-x}$; piezoelectric electrodes such as $Li_2B_4O_7$, and $LiNbO_3$; photoelectric-chemical effect electrodes such as $TiO_2$, etc.

Therefore, the electrode can form a bond with polysilanes, by introducing at least one functional group selected from the group consisting of hydroxyl group, thiol group, alkoxyl group, thioether group, amino group, amide group, ester group, thioester group and sulfoxide group on at least a part of the surface of the electrode.

When using iron or graphite as the electrode, a functional group such as hydroxyl group is present in a natural oxide film to be formed on the surface and, therefore, it is not necessary to conduct an operation of introducing a functional group into the electrode surface. When forming a metal oxide electrode using a sol-gel method or a process of calcinating a metal salt, a large amount of hydroxyl groups are present during gelation or calcination. Therefore, if the electrode surface is reacted with the polymer at this point, followed by complete gelation or calcination, it is not necessary to conduct an operation of introducing a functional group into the electrode surface. However, when a sufficient amount of the functional groups are not present on the surface of the electrode, the functional group may be introduced into the electrode surface using the following process. The shape of the electrode is not specifically limited.

As the process for introducing a functional group into the electrode surface, there can be used a process (a) of modifying the surface of an electrode to introduce a functional group, or a process (b) of adhering a substance containing a functional group on the surface of the electrode. Examples of the process (a) of modifying the surface of an electrode to introduce a functional group include a process of oxidizing the surface of copper, or iron by an operation such as heating to introduce a functional group such as hydroxyl group; a process of treating the surface of a meal oxide electrode such as ITO electrode with an acid or an alkali to hydrolyze a part thereof, thereby introducing a hydroxyl group. An example of the process (b) of adhering a substance containing a functional group on the surface of an electrode include a process of coating a coupling agent such as silane coupling agent on the surface of the electrode.

In the present invention, the electrode surface and the polymer main chain constituting the functional film are chemically bonded through an oxygen atom directly bonded to the polymer main chain. To make chemically bond the electrode surface and the polymer main chain constituting the functional film, a surface treatment of the electrode by the compound having a repeating unit represented by above-described formula (I) or (II) is conducted.

As the surface treatment, there can be used a process comprising steps of applying precursor polysilanes used for synthesizing above-described glass composite material of the present invention having the structure (B), in particular, a compound of the formula (I) or (II) or a mixture thereof on an electrode to form a film, and heating or reacting an acid or basic catalyst to cause a desolvation condensation reaction between a functional group of the electrode surface and a hydroxyl or alkoxyl group of the polymer side chain. A monomolecular film of the compound of the formula (I) or (II) may be formed on the electrode, however, the thickness thereof is not specifically limited. Although it is not necessary to react polymers each other, alkoxyl groups of the polymer side chain are reacted each other upon reaction and, therefore, a crosslinked cured functional film having a three-dimensional network is formed. In this case, additives such as metal alkoxides, metal oxide sols such as $SiO_2$ sol and alumina sol, and organic polymers such as epoxy resin, polyimide resin, melamine resin, polyvinylpyrrolidone and nylon resin may be formulated. The above additives may also be impregnated after polysilanes are formed and cured. It can be detected by an analytical process such as IR, and XPS that the electrode surface is chemically bonded to the polymer main chain constituting the functional film through an oxygen atom which is bonded directly to the polymer main chain.

In such devices, the polymer main chain of polysilanes constituting the functional film is chemically bonded to the electrode surface so that the functional film formed is not easily peeled off from the electrode, thereby exhibiting a high thermal or mechanical durability. The reaction sites on the polymer constituting the functional film is a hydroxyl or alkoxyl group which is bonded directly to the polymer main chain. A large amount of these functional groups are present in a one-dimensional polymer prior to the crosslinking reaction, and they are often present even after the crosslinking reaction. Accordingly, a chemical bond between the electrode surface and polymer main chain can be easily formed by applying a one-dimensional polymer or adhering a crosslinked three-dimensional polymer on the electrode surface and subjecting to a treatment such as heating. In a lot of electric devices, electric characteristics of the interface between different kinds of materials have a significant influence on performances of the whole device. In the device of the present invention, interfaces between the electrode surface and functional film are chemically bonded and this bond is formed through an oxygen atom which is bonded directly to the polymer main chain. Therefore, the main chain of polysilanes having a function for transporting carriers is fixed on the electrode surface, extremely closely, which results in a great improvement of injection characteristics of carriers, e.g. holes between the electrode and functional film. Accordingly, performances of the device can be extremely increased by the improvement of electric characteristics.

It is needless to say that the device of the present invention may have a functional film other than that composed of the above polymer, and a material for functional film constituting other functional film is not specifically limited if at least one of functional films to be formed adjacent to the electrode is composed of the above polymer main chain. Also, it is not necessary that the whole functional film to be formed adjacent to the electrode is composed of the above polymer main chain. When a compound having a repeating unit represented by the formula (I) or (II) is applied on the electrode and, after irradiating ultraviolet light on a part thereof, the electrode is subjected to a treatment such as heating, the polymer main chain of the ultraviolet irradiated part is photo-oxide and, therefore, a pattern can be formed in which a part of the functional film is made of the above polymer main chain. And besides, when the compound having a repeating unit represented by the formula (I) or (II) is converted into a three-dimensional polymer by subjecting to a sufficient heat treatment to crosslink hydroxyl groups or alkoxyl groups of the side chain each other, the conductivity is improved, for example, the volume resistivity becomes about $4 \times 10^5$ $\Omega$cm or less, which results in semiconductor or conductive material. Accordingly, the three-dimensional polymer can also be used as a wiring material or a junction material between the electrode and wiring. Also, in this case, when the functional group is introduced into the surface of the electrode and these are chemically bonded through an oxygen atom which is bonded directly to the polymer main chain, the electric resistance of the junction part using the three-dimensional polymer is reduced and the adhesive strength is improved, thereby forming a good junction.

Concretely, on a circuit board equipped with an electrode containing a functional group such as hydroxyl group on the surface, a compound having a repeating unit represented by the formula (I) or (II), preferably polysilane, is applied and, after the region where a bump is formed is covered with a mask, ultraviolet light is irradiated to photo-degradate and oxidize the polymer main chain at the region other than the bump-forming part, thereby imparting insulating properties to the polymer main chain. Then, an electronic part such as LSI is mounted on the circuit board so that an electrode containing a functional group on the surface is brought into contact with the bump-forming part. Thereafter, when the polymer is crosslinked by subjecting to a heat treatment, a three-dimensional polymer having a good conductivity can be obtained and, at the same time, a chemical bond is formed between the electrode and polymer main chain, thereby forming a bump having a low resistance and excellent adhesive strength.

EXAMPLES

The present invention will be further described in detail according to following Examples.

Example 1

Polysilane (E1, 70 mg) (molecular weight: 420000) having a repeating unit represented by the following chemical formula and tetraethoxysilane (TEOS, 70 mg) are dissolved in 2.5 ml of ethanol. To this solution, a mixed solution of 28% aqueous ammonia (0.5 ml) and ethanol (5 ml) is added while the solution is stirred at room temperature, followed by stirring at room temperature for 12 hours. Then, the resulting solution is concentrated by removing the solvent so that the total amount of the solution becomes about 1 ml to prepare a coating solution. Thereafter, this coating solution is spin-coated on a quartz substrate. The coating solution on the substrate is air-dried at room temperature for about one hour, and then gelled by drying at 40° C. for 5 hours to obtain a transparent film (Example 1).

The visible-ultraviolet absorption spectrum of the resulting film is measured. As a result, the absorption due to a silicon chain of polysilane (E1) is observed at about 315 nm. Therefore, it has been found that polysilane (E1) is not decomposed even under the gelation reaction condition. The infrared absorption spectrum of this film is measured using a KBr method. As a result, the absorption due to a Si—O—Si bond is observed at about 1100 $cm^{-1}$. Therefore, it has been confirmed that a silicate glass structure is formed. As is apparent from these results, the resulting film is a glass composite film in which polysilane (E1) is contained in silicate glass.

Furthermore, the hardness of this glass composite film is evaluated by a pencil scratching test (according to JIS-K5400). As a result, it has been found that this glass composite film shows a hardness B and has a sufficient mechanical strength.

Other measurement results are as follows. The volume resistivity (according to JIS-C2151) exceeds $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated form NMR, IR and TG, the number of the crosslinking point on the polymer chain is not less than 3.

On the other hand, an ethanol solution of polysilane (E1) is prepared for comparison. Then, according to the same manner as that described above, the solution is spin-coated on a quartz substrate, followed by drying to form a film. This spin-coated film is so soft that a fingerprint is left by pressing it with the tip of a finger, and the mechanical strength is insufficient.

Example 2

Polysilane (E1, 6.7 mg), polyvinyl pyrrolidone (PVP, 70 mg) and tetraethoxysilane (TEOS, 70 mg) are dissolved in 2.5 ml of ethanol. To this solution a a mixed solution of 28% aqueous ammonia (0.5 ml) and ethanol (5 ml) is added while the solution is stirred at room temperature, followed by stirring at room temperature for 12 hours. Then, the resulting solution is concentrated by removing the solvent so that the total amount of the solution becomes about 1 ml to prepare a coating solution. Thereafter, this coating solution is spin-coated on a quartz substrate. The coating solution on the substrate is air-dried at room temperature for about one hour, and then gelled by drying at 40° C. for 5 hours to obtain a transparent film (Example 2).

The visible-ultraviolet absorption spectrum of this film is measured according to the same manner as that described in Example 1. As a result, it has been found that this film is a glass composite film in which polysilane (E1) is contained in a medium of PVP and silicate glass.

Other measurement results are as follows. The volume resistivity (according to JIS-C2151) exceeds $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 3

Polysilane (E2, 70 mg) (molecular weight: 7000) having a repeating unit represented by the following chemical formula and tetraethoxysilane (TEOS, 70 mg) are dissolved in 2.5 ml of ethanol. To this solution, a mixed solution of 28% aqueous ammonia (0.5 ml) and ethanol (5 ml) is added while the solution is stirred at room temperature, followed by stirring at room temperature for 12 hours. Then, the resulting solution is concentrated by removing the solvent so that the total amount of the solution becomes about 1 ml to prepare a coating solution. Thereafter, this coating solution is spin-coated on a quartz substrate. The coating solution on the substrate is air-dried at room temperature for about one hour, and then gelled by drying at 40° C. for 5 hours to obtain a transparent film having a thickness of 0.2 μm (Example 3).

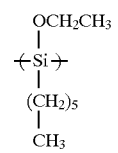
(E2)

The visible-ultraviolet absorption spectrum of the resulting film is measured. As a result, the absorption due to a silicon chain of polysilane (E2) is observed at about 305 nm. The infrared absorption spectrum of this film is measured using a KBr method. As is apparent from the results, the resulting film is a glass composite film in which polysilane (E2) is contained in silicate glass.

Other measurement results are as follows. The volume resistivity (according to JIS-C2151) exceeds $3 \times 10^6$ Ωcm. The haze rate at 300 to 800 nm is not more than 5%. The peak due to Si, Ge or Sn crystallite is not observed by a X-ray diffraction. As is apparent from the reaction rate of the functional group of the precursor polymer calculated from NMR, IR and TG, the number of the crosslinking point on the polymer chain is not less than 3.

The light resistance of the resulting glass composite film is evaluated as follows. That is, in order to deteriorate the glass composite film, ultraviolet light (wavelength: 254 nm) is irradiated from a low-pressure mercury lamp at 7 mW/cm² for a predetermined time. Then, the light resistance is evaluated by making a comparison between visible-ultraviolet absorption spectrums before and after the irradiation of ultraviolet light. As a result, regarding the film of Example 3, the absorption peak strength at about 305 nm after the irradiation of ultraviolet light for 10 minutes is 72% of that before the irradiation of ultraviolet light. Therefore, it has been confirmed that the polysilane chain is not sufficiently photodegradated. On the other hand, an ethanol solution of polysilane (E2) is prepared for comparison. Then, according to the same manner as that described above, the solution is spin-coated on a quartz substrate, followed by drying to form a film (Comparative Example 3). The light resistance of this film when ultraviolet ray is irradiated is evaluated under the same condition as that described above. The thickness of the spin-coated film of Comparative Example 3 is adjusted to 0.16 μm so that the absorption of ultraviolet light having a wavelength of 254 nm may be the same as that of the glass composite film having a thickness of 0.2 μm. As a result, regarding the spin-coated film of Comparative Example 3, the absorption at about 310 nm due to the silicon chain nearly disappeared by the irradiation of ultraviolet light. As described above, it has been found that the glass composite film of Example 3 has an extremely excellent durability to light irradiation in comparison with the spin-coated film of non-treated polysilane (E2) of Comparative Example 3.

Example 4

A THF solution of polysilane (E2) is prepared and this solution is spin-coated on a quartz substrate. The coating solution on the substrate is air-dried at room temperature for about one hour, and then dried at 150° C. for one hour to obtain a transparent film.

The visible-ultraviolet absorption spectrum of the resulting film is measured. As a result, the absorption due to a silicon chain of polysilane (E2) is observed at about 302 nm. The infrared absorption spectrum of this film is measured using a KBr method. As a result, the absorption at about 1020 cm⁻¹ increases in comparison with polysilane (E2).

Therefore, it has been confirmed that a Si—O—Si bond is formed, additionally. The film becomes slight insoluble to THF and the film is hardened. These results suggest the formation of a glass composite film comprising a part having a structure similar to silicate glass, which is formed by crosslinking adjacent polysilane chains each other through an oxygen atom derived from an ethoxy group of the side chain, and a polysilane chain. As described above, the glass composite film containing the polysilane chain can be formed by using only polysilane (E2) as the raw material. The hardness of this glass composite film is evaluated by a pencil scratching test (according to JIS-K5400). As a result, it shows a hardness B.

Other measurement results are as follows. The volume resistivity (according to JIS-C2151) is not more than $3 \times 10^6$ $\Omega$cm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Furthermore, the light resistance of the resulting glass composite film is evaluated by irradiating ultraviolet light under the same condition as that of Example 3 for a predetermined time and making a comparison between the visible-ultraviolet absorption spectrum before and after the irradiation of ultraviolet light. As a result, regarding the film of Example 4, the absorption peak strength at about 302 nm after the irradiation of ultraviolet light for 30 minutes is not less than 70% of that before the irradiation of ultraviolet light. Therefore, it has been confirmed that the polysilane chain is not sufficiently photodegradated. On the other hand, an ethanol solution of polysilane (E2) is spin-coated on a quartz substrate, followed by drying to form a film (Comparative Example 4) for comparison. Then, according to the same manner as that described above, the light resistance is evaluated. As a result, regarding the spin-coated film of Comparative Example 4, the absorption at about 302 nm due to the silicon chain nearly disappeared only by irradiating ultraviolet light for 5 minutes. As described above, it has been found that the glass composite film of Example 4 has an extremely improved light resistance in comparison with the spin-coated film of non-treated polysilane (E2) of Comparative Example 4.

According to the same manner as that described in Comparative Example 4, poly(phenylmethylsilylene) (weight-average molecular weight: 4000) and poly(dibutysilylene) (weight-average molecular weight: 4000) are used, respectively, to form a spin-coated film (Comparative Examples 4' and 4"). Then, the light resistance is evaluated under almost the same condition as that described above. As a result, regarding the spin-coated films of Comparative Examples 4' and 4", the absorption at about 302 nm due to the silicon chain nearly disappeared only by irradiating ultraviolet light for 5 minutes. As described above, it has been found that the glass composite film of Example 4 has an extremely improved light resistance in comparison with the spin-coated film of polysilane which has hitherto been known.

Then, a mixed solution of tetraethoxysilane (1 g), ethanol (1.5 g), water (2 g) and hydrochloric acid (0.1 g) is stirred at room temperature for 1.5 hours, and water (3 g) and acetonitrile (0.5 g) are added to the mixed solution, followed by stirring. A substrate on which the above glass composite film is formed is dipped in this mixed solution for 10 minutes. Thereafter, the substrate is taken out, and the surface of the glass composite material is slightly washed with water and dried with heating at 100° C. for 40 minutes. The hardness of the film after subjecting to this dipping treatment is evaluated by a pencil scratching test. As a result, it shows a hardness 3H. As is apparent from the fact that the hardness of the film before subjecting to this dipping treatment is B, the hardness of the film increased by the dipping treatment. The reason is considered that a $SiO_2$ sol penetrates into the film by the dipping treatment and is crosslinked with polysilane, thereby reinforcing the silicate glass structure in the film.

Example 5

A THF solution of polysilane (E3) (molecular weight: 8000) having a repeating unit represented by the following chemical formula is prepared and this solution is spin-coated on a quartz substrate. The coating solution on the substrate is air-dried at room temperature for about one hour, dried with heating at 160° C. for 5 minutes and then cured by standing at room temperature overnight to obtain a transparent film (Example 5). The visible-ultraviolet absorption spectrum of the cured film is measured. As a result, the absorption due to a silicon chain of polysilane (E2) is observed within a range of 280 to 310 nm. Furthermore, it has been found by the measurement of the infrared spectrum that a structure similar to silicate glass is formed.

The hardness of the resulting glass composite film is evaluated by a pencil scratching test (according to JIS-K5400). As a result, it showed a hardness 2H. Therefore, it has been found that it has an excellent mechanical strength. Furthermore, the light resistance to the irradiation of ultraviolet light is examined as to the resulting glass composite film according to the same manner as that described in Example 3. As a result, regarding the glass composite film of Example 5, the absorption peak strength within a rage of 280 to 310 nm after the irradiation of ultraviolet light for 30 minutes is not less than 80% of that before the irradiation of ultraviolet light. Therefore, it has been confirmed that the polysilane chain is not sufficiently photodegradated. On the other hand, the light resistance of the spin-coated film of polysilane (E3), which is not subjected to a curing treatment due to heating, is evaluated according the same manner as that described above. As a result, the absorption due to the silicon chain nearly disappears by the irradiation of ultraviolet light for 5 minutes. As described above, it has been found that the glass composite film obtained by the curing treatment has an excellent light resistance.

Other measurement results are as follows. The volume resistivity (according to JIS-C2151) is not more than $3 \times 10^6$ $\Omega$cm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Furthermore, a glass composite material is formed by making use of polysilane (E3') having the same repeating unit as polysilane (E3) and having a weight-average molecular weight of 42,000 in place of polysilane (E3). The glass composite material shows a hardness of 3H. In addition, it has been found that the glass composite material has an improved light resistance in comparison with uncured polysilane (E3').

Then, 0.5% by weight of oxalic acid as an acid catalyst is added to polysilane (E3) and the mixture is dissolved in THF and the solution is spin-coated on a quartz substrate. The coating solution on the substrate is air-dried at room temperature for about one hour, dried with heating at 120° C. for 10 minutes and then allowed to stand at room temperature overnight to obtain a transparent film (Example 5'). The hardness of the cured film of Example 5' is evaluated by a pencil scratching test (according to JIS-K5400). As a result, it shows a hardness 3H. As described above, when polysilane is cured with an acid catalyst, the curing condition is mild in comparison with the case that only polysilane is cured. Also, a more rigid cured film can be formed. The visible-ultraviolet absorption spectrum of the cured film of Example 5' is measured. As a result, the absorption due to a silicon chain does not become inferior. Therefore, it has also been found that the decomposition of the polysilane main chain to be arisen as the side reaction at the time of the curing reaction is inhibited. The reason is considered that oxalic acid as the acid catalyst has an action of accelerating the elimination of an alkoxyl or hydroxyl group of the polysilane side chain to improve the degree of crosslinking, thereby preventing the cleavage of the polysilane chain as the side reaction.

Then, 20% by weight of an aluminum triisopropoxide is added to polysilane (E3) and the mixture is dissolved in THF, and the resulting solution is spin-coated on a quartz substrate. The coating solution on the substrate is air-dried at room temperature for about one hour, dried with heating at 120° C. for 30 minutes, and then allowed to stand at room temperature overnight to obtain a transparent film (Example 5"). The hardness of the cured film of Example 5" is evaluated by a pencil scratching test (according to JIS-K5400). As a result, it shows a hardness 5H. As described above, when polysilane is cured with an aluminum alkoxide, the curing condition is mild in comparison with the case that only polysilane is cured. Also, a more rigid cured film can be formed. The reason why the surface hardness of the film is improved is considered that the aluminum alkoxide itself acts as the crosslinking agent to improve the degree of crosslinking and forms the same skeleton as that of alumina. The visible-ultraviolet absorption spectrum of the cured film of Example 5" is measured. As a result, the absorption due to a silicon chain does not become inferior. Therefore, it has also been found that the decomposition of the polysilane main chain to be arisen as the side reaction at the time of the curing reaction is inhibited. The reason is considered that the aluminum alkoxide is a Lewis acid and has an action of accelerating the elimination of an alkoxyl or hydroxyl group of the polysilane side chain to improve the crosslinking degree, thereby preventing the cleavage of the polysilane chain as the side reaction, similar to the acid catalyst such as oxalic acid.

When titanium tetraethoxide or stannum tetrabutoxide is used in place of the aluminum alkoxide, the same results as those obtained when using the aluminum alkoxide are obtained.

Further, polisilane (E3) is mixed with 200 wt % of perhydropolysilazane, and the mixture is dissolved in toluene, and then the solution is spin-coated on a quartz substrate. The solution or the substrate is heated at 120° C. for 10 minutes in air to obtain a transparent cured film of polysilane-silica composite. The volume resistivity (according to JIS-C2151) is not more than $3\times10^6$ Ωcm. The haze rate at 300 to 800 nm is not more than 5%. As is apparent from the reaction rate of the functional group of the precursor polymer calculated from NMR, IR and TG, the number of the crosslinking point on the polymer chain is not less than 3.

Example 6

Metallic sodium (25.2 g), toluene (160 ml) and heptane (35 ml) are charged in a 1 liter three neck flask, which is equipped with a reflux tube and a dropping funnel and then maintained at 60° C. in an argon atmosphere. To this mixture, 30 ml of a toluene solution of ditertiarybutoxydichlorosilane (11.7 g) is added dropwise over one hour, followed by stirring at 60° C. for 3 hours. Then, 5 ml of trimethylsilyl chloride is added dropwise, followed by stirring for additional 30 minutes. Further, 2 liter of toluene is added, followed by stirring. Thereafter, the mixture is filtered under pressure using a glass filter. The solvent is removed from the resulting filtrate to give about 100 ml of a solution. This solution is poured into 2 liter of methanol with stirring to reprecipitate a polymer. Then, the precipitate is filtered and dried under vacuum to give polysilane (E4) having a repeating unit represented by the following chemical formula (yield: 1.1 g, average molecular weight: 2700).

The results of IR and NMR spectrum of the resulting polysilane are shown below.

IR (KBr, cm$^{-1}$): 815 (m), 1022 (m), 1045 (s), 1100 (m), 1185 (s), 1363 (m), 2975 (m);

$^1$H-NMR (270 MHz, C$_6$D$_6$): δ1.27 (s)

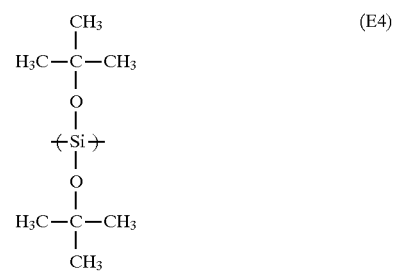

(E4)

A toluene solution of this polysilane (E4) is spin-coated on a quartz substrate to form a film. This film is enclosed in a desiccator, together with a 6N aqueous hydrochloric acid solution charged in an open container, and exposed to hydrochloric acid vapor by standing at room temperature for 2 days. Further, the film is heated under a hydrochloric acid vapor atmosphere at 150° C. for 4 hours.

The infrared absorption spectrum of the film (Example 6) is measured. As a result, an increase in absorption at about 1020 cm$^{-1}$ is observed, similar to Example 4. Therefore, it has been confirmed that a Si—O—Si bond is formed, additionally. On the other hand, the absorption due to a t-butyl group disappeared. At this point, the reaction rate of the alkoxyl group of the precursor polymer calculated from NMR, IR and TG is about 40%. The hardness is evaluated by a pencil scratching test (according to JIS K5400). As a result, it showed a hardness 6H. Therefore, it is admitted that the film is hardened. As is apparent from these results, it is considered that the t-butyl group of polysilane (E4) is decomposed by heating in the presence of the acid catalyst and the resulting silanol groups are condensed each other to form the same structure like silicate glass as that of Example 4.

Other measurement results are as follows. The volume resistivity (according to JIS-C2151) is not more than $3\times10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Furthermore, the light resistance to the irradiation of ultraviolet light of the resulting film is evaluated according to the same manner as that described in Example 3. As a result, regarding the film of Example 6, the absorption peak strength at about 315 nm after the irradiation of ultraviolet light for 30 minutes is 85% of that before the irradiation of ultraviolet light. Therefore, it has been confirmed that the polysilane chain is not sufficiently photodegraded. On the other hand, a toluene solution of polysilane (E4) is prepared for comparison. Then, according to the same manner as that described above, the solution is spin-coated on a quartz substrate, followed by drying to form a film (Comparative Example 6). According to the same manner as that described above, the light resistance to the irradiation of ultraviolet light of this film is evaluated. As a result, regarding the film of Comparative Example 6, the absorption due to the silicon chain nearly disappeared by the irradiation of ultraviolet light. As described above, it has been found that the film of Example 6 obtained by the condensation reaction of polysilane (E4) has an extremely improved light resistance in comparison with the film of non-treated polysilane (E4) of Comparative Example 6.

Example 7

Metallic sodium (25.2 g), toluene (160 ml) and heptane (35 ml) are charged in a 1 liter three neck flask, which is equipped with a reflux tube and a dropping funnel and then maintained at 60° C. in an argon atmosphere. To this mixture, 30 ml of a toluene solution of tertiarybutoxydichlorosilane (80 g) is added dropwise over one hour, followed by stirring at 60° C. for 3 days. Then, 5 ml of trimethylsilyl chloride is added dropwise, followed by stirring for additional 30 minutes. Furthermore, 2 liter of toluene is added, followed by stirring. Thereafter, the mixture is filtered under pressure using a glass filter. The solvent is distilled off from the resulting filtrate to give about 100 ml of a solution. This solution is poured into 2 liter of methanol with stirring to reprecipitate a polymer. Then, the precipitate is filtered and dried under vacuum to give polysilane (E5) having a repeating unit represented by the following chemical formula (yield: 5.2 g, average molecular weight: 3000).

The results of IR and NMR spectrum of the resulting polysilane are shown below.

IR (KBr, cm$^{-1}$): 810 (m), 1010 (m), 1030 (s), 1185 (m), 1234 (s), 1360 (s), 2965 (s);

$^1$H-NMR (270 MHz, C$_6$D$_6$): δ0.5–0.8, 0.8–1.5

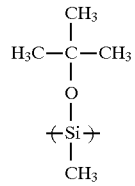

(E5)

According to the same manner as that described in Example 6, the resulting polysilane (E5) is used to form a film, which is subjected to a curing treatment to obtain a transparent cured film. It has been found that this cured film is a glass composite material. The hardness is evaluated by a pencil scratching test (according to JIS K5400). As a result, it shows a hardness 4H. Therefore, it is admitted that the film has a sufficient hardness.

Other measurement results are as follows. The volume resistivity (according to JIS-C2151) is not more than 3×10$^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Furthermore, the light resistance to ultraviolet light is tested. As a result, regarding this film, the absorption peak strength due to a silicon chain of polysilane (E5) after the irradiation of ultraviolet light for 30 minutes is 73% of that before the irradiation of ultraviolet light. On the other hand, the light resistance to the irradiation of ultraviolet light of the spin-coated film of non-treated polysilane (E5) is evaluated according to the same manner as that described above. As a result, the absorption due to the silicon chain nearly disappears by the irradiation of ultraviolet light. As described above, the cured film obtained by the condensation reaction of polysilane (E5) is superior in light resistance.

Example 8

A methylene chloride solution (10 ml) of poly (phenylmethylsilylene) (0.71 g) is charged in a 200 ml Kjeldahl flask in an argon gas atmosphere. Then, 0.47 ml of trifluoromethanesulfonic acid is added while stirring the solution, followed by stirring at room temperature for 2.5 hours. To this solution, a mixed solution of tertiarybutyl alcohol (3.5 ml) and triethylamine (2 ml) is added and, after stirring at room temperature for 1.5 hours, the solvent is distilled off. The residue obtained after the solvent is distilled off is extracted with ether. The extracted solution is washed with water and anhydrous sodium sulfate is added, and the mixture is dried. Then, the solvent is distilled off and dried under vacuum to give polysilane (E6) having a repeating unit represented by the following chemical formula (yield: 0.58 g, weight-average molecular weight: 2400, introduction rate of tertiarybutoxy group: 79%).

The results of IR and NMR spectrum of the resulting polysilane are shown below.

IR (KBr, cm$^{-1}$): 630 (w), 690 (m), 750 (s), 1010 (s), 1030 (s), 1180 (s), 1240 (s), 1360 (m), 1380 (s), 2960 (s);

$^1$H-NMR (270 MHz, C$_6$D$_6$): δ0.5–0.8, 0.8–1.4, 7.0–7.7

Furthermore, according to the same manner as that described above except for using 1.5 ml of methyl alcohol in place of tertiarybutyl alcohol, polysilane (E7) having a repeating unit represented by the following chemical formula (yield: 0.41 g, weight-average molecular weight: 2800, introduction rate of methoxy group: 80%).

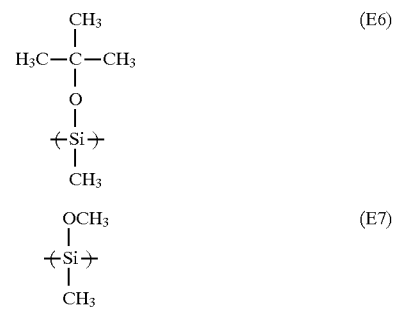

Regarding these polysilanes, a change in structure under the following condition is evaluated by the observation of the infrared absorption spectrum. Polysilane (E7) is changed from the oil form into the rubber form at room temperature in one day. This phenomenon is caused by vitrification due to the crosslinking condensation reaction. To the contrary, regarding polysilane (E6), vitrification does not proceed after standing at room temperature for one month.

Furthermore, 10% by weight of oxalic acid is added to polysilane (E6) and the mixture is heated at 120° C. for 3 hours. As a result, vitrification proceeded to form a glass composite film. As is apparent from these results, polysilane (E6) containing a tertiarybutoxy group is superior to polysilane (E7) containing a methoxy group in stability (long pot life), and once the acid catalyst acts on the polysilane (E6), it is rapidly cured.

Example 9

According to the same manner as that described in Example 8 except for using a copolymer of poly (diphenylsilylene) and poly(phenylmethylsilylene) (1:1) as polysilane as the starting material, polysilane (E8) having having two repeating units into which a tertiarybutoxy group is introduced as shown in the following chemical formula (yield: 0.43 g, weight-average molecular weight: 2200, introduction rate of tertiarybutoxy group: 83%) is obtained.

The results of IR and NMR spectrum of the resulting polysilane are shown below.

IR (KBr, cm$^{-1}$): 635 (w), 690 (m), 745 (s), 1010 (s), 1030 (s), 1180 (s), 1240 (s), 1355 (m), 1380 (w), 2960 (s);

$^1$H-NMR (270 MHz, C$_6$D$_6$): δ0.5–0.8, 0.8–1.4, 7.0–7.7

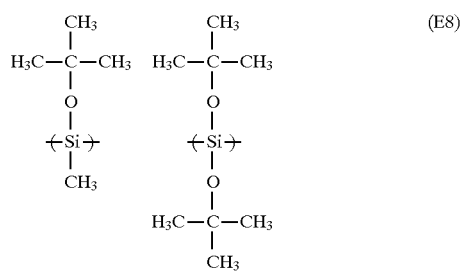

According to the same manner as that described in Example 6, the resulting polysilane (E8) is used to form a film on a quartz substrate, which is subjected to a curing treatment to obtain a transparent cured film. The hardness is evaluated by a pencil scratching test. As a result, it shows a hardness 3H.

Other measurement results are as follows. The volume resistivity (according to JIS-C2151) is not more than 3×10$^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

The light resistance is examined under the same condition as that described in Example 6. As a result, the absorption peak strength due to a silicon chain of polysilane (E8) after the irradiation of ultraviolet light for 30 minutes is 87% of that before the irradiation of ultraviolet light.

Example 10

According to the same manner as that described in Example 4 except for using polygermane (E9) (molecular weight: 2100) having a repeating unit represented by the following formula in place of polysilane, the curing reaction due to heating is conducted to form a glass composite film containing a polygermane chain. This film becomes insoluble to THF used as the solvent to cure. The surface hardness is evaluated by a pencil scratching test. As a result, it showed a hardness 1H and is superior to conventional polygermane.

Other measurement results are as follows. The volume resistivity (according to JIS-C2151) is not more than 3×10$^6$ Ωcm. The haze rate at 300 to 800 nm is not more than 5%. The peak due to Ge crystallite is not observed by a X-ray diffraction. As is apparent from the reaction rate of the functional group of the precursor polymer calculated from NMR, IR and TG, the number of the crosslinking point on the polymer chain is not less than 3.

The light resistance is examined according the same manner as that described in Example 6. As a result, regarding the glass composite film obtained by curing of polygermane (E9), the time required to cause photodegradation in the same degree is about two times as much as that of non-treated polygermane (E9), and it is superior in light resistance.

Example 11

According to the same manner as that described in Example 4 except for using polystannane (E10) (molecular weight: 2000) having a repeating unit represented by the following formula in place of polysilane, the curing reaction due to heating is conducted to form a glass composite film containing a polystannane chain. This film becomes insoluble to THF used as the solvent to cure. The appearance is transparent and uniform. The surface hardness is evaluated by a pencil scratching test. As a result, it shows a hardness 1H and is superior to a conventional polystannane.

Other measurement results are as follows. The volume resistivity (according to JIS-C2151) is not more than 3×10$^6$ Ωcm. The haze rate at 300 to 800 nm is not more than 5%. The peak due to Sn crystallite is not observed by a X-ray diffraction. As is apparent from the reaction rate of the functional group of the precursor polymer calculated from NMR, IR and TG, the number of the crosslinking point on the polymer chain is not less than 3.

Example 12

According to the same manner as that described in Example 8 except for using a copolymer of phenylmethyldichlorosilane and dibutyldichlorogermane (1:1) synthesized by a Wurtz process in place of poly (phenylmethylsilylene), a poly(silane-germane) copolymer (E11) having two repeating units into which a tertiarybutoxy group is introduced as shown in the following chemical formula (weight-average molecular weight: 2000, introduction rate of tertiarybutoxy group: 62%) is obtained.

The results of IR and NMR spectrum of the resulting poly(silane-germane) copolymer are shown below.

IR (KBr, cm.$^{-1}$): 680 (m), 700 (m), 734 (w), 840 (w), 1000 (s), 1080 (s), 1180 (m), 1245 (m), 1355 (w), 1460 (m), 2850 (s), 2920 (s), 2950 (m);

$^1$H-NMR (270 MHz, C$_6$D$_6$): δ0.5–0.8, 0.5–1.0, 1.0–1.6, 7.0–7.7

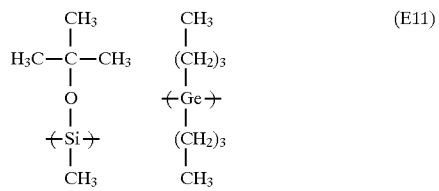

(E11)

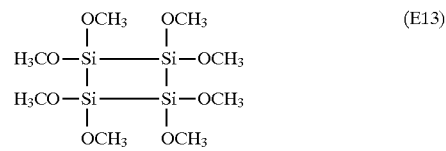

(E13)

According to the same manner as that described in Example 8, 10% by weight of oxalic acid is added to polysilane (E6) and the mixture is heated at 120° C. for 3 hours. As a result, vitrification proceeded to form a glass composite film which is transparent and uniform.

Other measurement results are as follows. The volume resistivity (according to JIS-C2151) is not more than $3 \times 10^6$ Ωcm. The haze rate at 300 to 800 nm is not more than 5%. The peak due to Si and Ge crystallite is not observed by a X-ray diffraction. As is apparent from the reaction rate of the functional group of the precursor polymer calculated from NMR, IR and TG, the number of the crosslinking point on the polymer chain is not less than 3.

Example 13

A tetrahydrofuran solution of cyclic polysilane represented by the formula (E12) is coated on a glass substrate, followed by drying at room temperature. Thereafter, the substrate is heated at 160° C. for 10 minutes to obtain a transparent cyclic polysilane crosslinked film. The surface hardness of this film shows a pencil hardness 1H.

Other measurement results are as follows. The volume resistivity (according to JIS-C2151) exceeded $3 \times 10^6$ Ωcm. The haze rate at 300 to 800 nm is not more than 5%. The peak due to Si, Ge or Sn crystallite is not observed by a X-ray diffraction. As is apparent from the reaction rate of the functional group of the precursor polymer calculated from NMR, IR and TG, the number of the crosslinking point on the polymer chain is not less than 3.

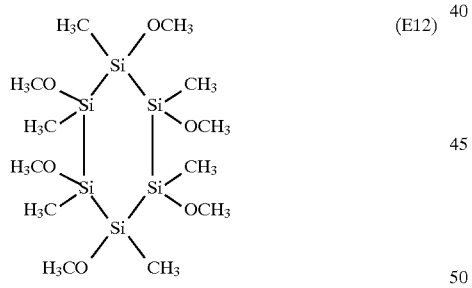

(E12)

Example 14

A tetrahydrofuran solution of cyclic polysilane represented by the formula (E13) is coated on a glass substrate, followed by drying at room temperature. Thereafter, the substrate is heated at 160° C. for 10 minutes to obtain a transparent cyclic polysilane crosslinked film. The surface hardness of this film shows a pencil hardness 5H.

Other measurement results are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 15

Metallic lithium (8 g) and diethyl ether (150 ml) are charged in a 1 liter three neck flask, which is equipped with a reflux tube and a dropping funnel and then maintained at 30° C. in an argon atmosphere. To this mixture, 30 ml of a diethyl ether solution of ditertiarybutoxydichlorosilane (110 g) is added dropwise over one hour, followed by stirring at 30° C. Thereafter, the mixture is filtered under pressure using a glass filter. The solvent is distilled off from the resulting filtrate. The residue obtained after the solvent is distilled off is purified by subjecting to liquid column chromatography to give cyclic polysilane (E14) having a repeating unit represented by the following chemical formula (yield: 0.5 g).

The results of IR and NMR spectrum of the resulting polysilane are shown below.

IR (KBr, cm$^{-1}$): 700 (m), 800 (s), 1040 (s), 1185 (m), 1240 (w), 1255 (s), 1360 (s), 1385 (w), 1460 (m), 2850 (m), 2925 (s), 2975 (s);

$^1$H-NMR (270 MHz, acetone): δ=1.14

$^{13}$C-NMR (270 MHz, CDCl$_3$): δ=32

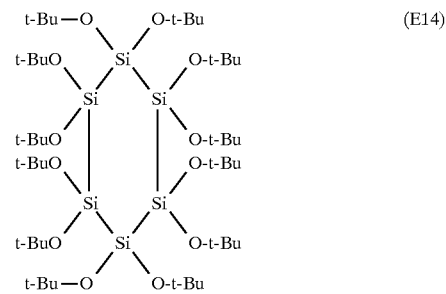

(E14)

wherein t-Bu represents tert-butyl

A toluene solution obtained by dissolving this polysilane (E14) and 0.1% by weight of p-toluenesulfonic acid is coated on a glass substrate, followed by drying at 120° C. for 30 minutes to give a transparent cyclic polysilane crosslinked film. The surface hardness of this film shows a pencil hardness 2H.

Other measurement results are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 16

A toluene solution obtained by dissolving 50 parts by weight of cyclic polysilane (E14) used in Example 15, 50 parts by weight of di(tertiarybutoxysiloxane) (weight-average molecular weight: 12000) represented by the following formula and 0.001 parts by weight of p-toluenesulfonic acid is coated on a glass substrate, which is subjected to a heating treatment according to the same manner as that described in Example 15 to give a transparent polysilane crosslinked film. The surface hardness of this film shows a pencil hardness 3H.

Other measurement results are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

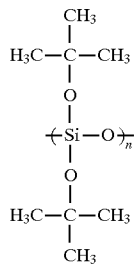

Example 17

A THF solution of polysilane (E7, weight-average molecular weight: 4000) containing a methoxy group and a methyl group as a substituent, shown in Example 8, is spin-coated on a quartz substrate, which is dried at room temperature under vacuum to form a film having a thickness of 0.8 μm. A mask having a predetermined pattern is disposed over this film and ultraviolet light is irradiated from a low-pressure mercury lamp at 0.24 J/cm² through this mask to conduct exposure. Thus, polysilane at the exposed area is subjected to photo-oxidation to form a metal oxide. Thereafter, this film is subjected to hot-air drying at 160° C. for 30 minutes to conduct the crosslinking reaction, thereby forming a patterned film (Example 17). The refractive index of the resulting patterned film is measured. As a result, it is 1.41 at the exposed area and 1.58 at the non-exposed area. As described above, there can be formed portions in different refractive index in one film.

Various measurement results as to the non-exposed area are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

On the other hand, a toluene solution of poly (phenylhexylsilylene) having a weight-average molecular weight of 200000 is spin-coated on a quartz substrate, which is heated at 80° C. and dried under vacuum to form a film having a thickness of 0.8 μm, for comparison. According to the same manner as that described above, the film is exposed to light to form a patterned film (Comparative Example 17).

Then, the light resistance of the patterned films of Example 17 and Comparative Example 17 is evaluated as follows. The patterned films and a fluorescent plate on which a fluorescent substance is applied are laminated each other, and a low-pressure mercury lamp (10 W) as an ultraviolet light source is disposed at the position which is 10 cm away from the patterned film. Ultraviolet light is irradiated on the patterned film from the low-pressure mercury lamp and visible light emission from the fluorescent plate is observed. In this case, ultraviolet light is absorbed at the non-exposed area of the patterned film if polysilane is remained, while ultraviolet light penetrates at the exposed area. Accordingly, the emission pattern from the fluorescent plate, which corresponds to the pattern of the patterned film, can be visually confirmed. However, when polysilane at the non-exposed area is damaged by the irradiation of ultraviolet light and does not absorb ultraviolet sufficiently, the emission pattern from the fluorescent plate can not be observed.

As a result of this test, the emission pattern can be confirmed, even five hours after the irradiation as to the patterned film of Example 17. As to the patterned film of Comparative Example 17, it becomes impossible to confirm the emission pattern four minutes after the irradiation. As is apparent from these results, the patterned film of Example 17 has an extremely excellent light resistance in comparison with that of Comparative Example 17.

The surface hardness is 2H in Example 17 and 2B in Comparative Example 17, respectively. Therefore, the patterned film of Example 17 is also superior in hardness.

Example 18

According to the same manner as that described in Example 17 except that the heating treatment after exposure is conducted at 80° C. for 10 minutes, a patterned film of polysilane (E7) is formed. Furthermore, hydrochloric acid (0.1 ml) is added to tetraethoxysilane (30 g), ethanol (60 g) and an aqueous solution (12 ml), and the mixture is stirred at room temperature for 3 hours to prepare a $SiO_2$ sol. The above patterned film is dipped in this $SiO_2$ sol at room temperature for 10 minutes. Thereafter, the patterned film is taken out and slightly washed with high purity water, followed by hot-air drying at 120° C. for 20 minutes. According to the same manner as that described in Example 17, the emission pattern from a fluorescent plate laminated on this patterned film is observed. As a result, the emission pattern can be confirmed, even 5 hours after the irradiation. The surface hardness of this patterned film is measured. As a result, the pencil hardness is 6H and is improved in comparison with that of Example 17 in which the $SiO_2$ sol is not impregnated.

Various measurement results as to the non-exposed area are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 19

According to the same manner as that described in Example 17, a THF solution of polysilane (E7) is spin-coated on a quartz substrate, which is dried at room temperature under vacuum to form a film having a thickness of 1.5 μm. A mask having a predetermined pattern of a light waveguide is disposed over this film and ultraviolet light is irradiated from a low-pressure mercury lamp at 0.24 J/cm² through this mask to conduct exposure. Thereafter, this film is subjected to hot-air drying at 160° C. for 30 minutes to conduct the crosslinking reaction at the non-exposed area, thereby forming a patterned film. The refractive index of the resulting patterned film is measured. As a result, it is 1.41 at the exposed area and 1.58 at the non-exposed area. This patterned film is subjected to a performance test as the light waveguide, using dye laser beam (wavelength: 560 nm) excited with a second harmonic of a $Nd^{3+}$:YAG laser as a light source. As a result, it operated satisfactorily.

Various measurement results as to the non-exposed area are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 20

According to the same manner as that described in Example 1, polysilane (E1, 70 mg) having a molecular weight of 420000 and tetraethoxysilane (TEOS, 70 mg) are dissolved in 2.5 ml of ethanol. To this solution, a mixed solution of 28% aqueous ammonia (0.5 ml) and ethanol (5 ml) is added while this solution is stirred at room temperature, followed by stirring at room temperature for 12 hours. Then, the resulting solution is concentrated by removing the solvent so that the total amount of the solution becomes about 1 ml to prepare a coating solution. Thereafter, this coating solution is spin-coated on a quartz substrate. The coating solution on the substrate is air-dried at room temperature for about one hour to form a film, followed by patterning. According to the same manner as that described in Example 17, the emission pattern from a fluorescent plate laminated on this patterned film is observed. As a result, an emission pattern is confirmed, even 5 hours after irradiation.

Various measurement results as to the non-exposed area are as follows. The volume resistivity (according to JIS-C2151) exceeds $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 21

Figure 8:
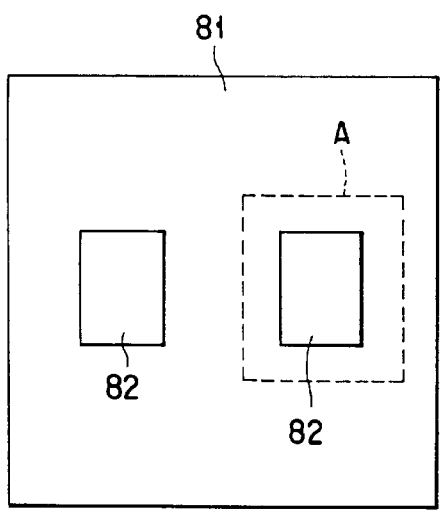
FIG. 8 is a plan view illustrating electrodes formed through the patterned glass composite material in Example 21 of the present invention.

As shown in FIG. 8, a gold electrode 81 is formed on the whole surface of a glass substrate. Then, a THF solution of polysilane (E7) containing a methoxy group and a methyl group as a substituent is prepared, and this solution is coated on the gold electrode 81 to form a film (not shown). Then, ultraviolet light is irradiated on the region A of FIG. 8 from a low-pressure mercury lamp at 5 J/cm² to expose the film of this region. Furthermore, the film is gelled by heating at 120° C. for 700 seconds. Thereafter, the exposed area (region A) and non-exposed area are subjected to vacuum deposition to form gold electrodes 82, 83, respectively. The resistivity of this sample is measured by applying a voltage of 20 V between the upper gold electrode 82 and lower gold electrode 81. As a result, it is $1 \times 10^5$ Ωcm at the exposed area and $1 \times 10^{10}$ Ωcm at the non-exposed area.

Various measurement results as to the non-exposed area are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 22

Figure 9:
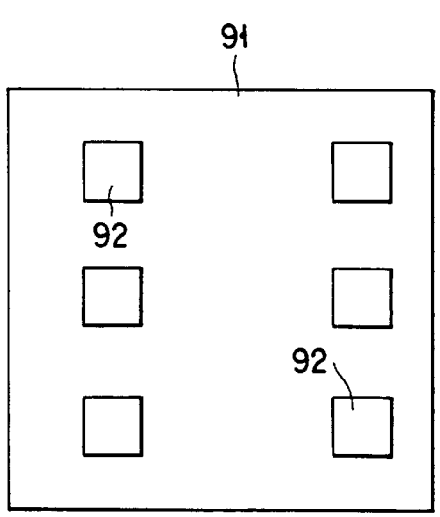
FIG. 9 is a plan view illustrating a printed board in Example 22 of the present invention.
Figure 10A:
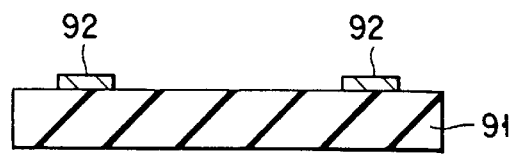
FIGS. 10A to 10D are sectional views illustrating a process for mounting an electronic part on the printed circuit board in Example 22 of the present invention.
Figure 10B:
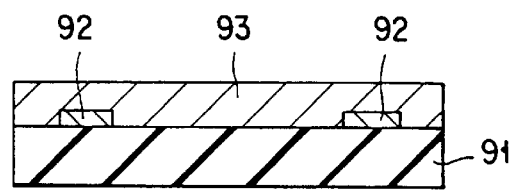
Figure 10C:
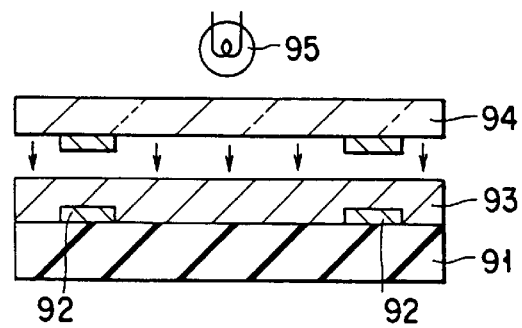
Figure 10D:
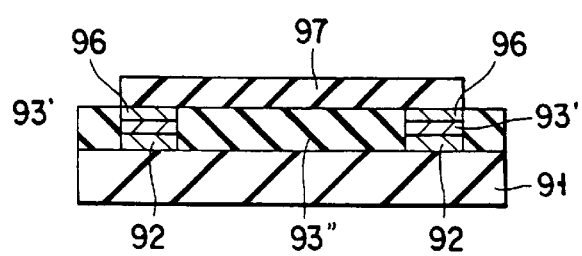

An example in which a glass composite material is used for wiring a printed board will be explained with reference to FIGS. 9 and 10A to 10D. Firstly a copper electrode 92 is formed on a printed board 91 (FIG. 9 and FIG. 10A). Then, a THF solution of polysilane (E7) is prepared, and this solution is coated on the printed board 91 to form a film 93 (FIG. 10B). Then, a mask 94 having a predetermined pattern is deposited over the film 93 and ultraviolet light is irradiated on the region other than that of the copper electrode 92 through the mask 94 from a light source for exposure (FIG. 10C). Furthermore, an electronic part 97 in which a lead 96 is formed on the film 93 is registered to the copper electrode 92 to subject them to contact bonding. Thereafter, the film 93 is gelled by heating at 120° C. for 700 seconds. As a result, the non-exposed area becomes a low-resistance film 93' and the exposed area becomes a high-resistance film 93". On the other hand, the lead 96 and copper electrode 92 are connected each other through the and low-resistance film 93', and the electric part 97 of the other region and printed board 91 are connected each other through the and high-resistance film 93".

Regarding the resulting printed circuit board, the resistance of the low-resistance film 93' (electric junction area: 4 mm²) between the lead 96 and copper electrode 92 are measured. As a result, it is 3 Ω. Furthermore, the electric part 97 is peeled of from the printed board. As a result, the adhesive force is 1 kgf/cm².

Various measurement results as to the non-exposed area are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 23 (EL device)

In this Example, polysilane (E7, recited again) having a methoxy group and a methyl group, polysilane (E15) represented by the following formula or poly (phenylmethylsilylene) (X, Comparative Example) is used as polysilane to make a fluorescent device shown in FIG. 1.

(Mw = 2800)

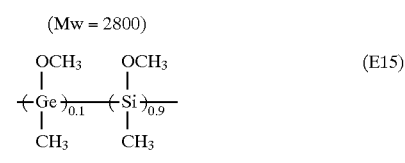

(MW = 2500)

-continued

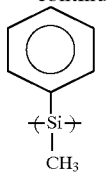

(Mw = 4000)

(Example 23-1)

An ITO elect rode as a hole injection electrode 12 is formed on a glass substrate 11, which is charged in boiling isopropyl alcohol and subjected to ultrasonic cleaning for one minute. Then, a THF solution of polysilane (E7) is coated on this glass substrate/ITO electrode in the thickness of 100 nm and polysilane (E7) is gelled by heating at 120° C. for 500 seconds under a nitrogen atmosphere to form a glass composite film. This glass composite film acts as a luminescent layer 13 and also acts as a hole transport layer and an electron transport layer. A Mg—Al alloy having an atomic ratio of Mg:Al (10:1) is vacuum-deposited on this glass composite film in the thickness of 700 nm to form an electron injection electrode 14. As described above, an electroluminescent device (EL device) is made.

The infrared absorption spectrum of the glass composite film constituting the fluorescent layer 13 is measured. As a result, the absorption due to a Si—O—Si bond is observed at 1000 to 1100 $cm^{-1}$. As is apparent from the reaction rate of the alkoxyl group of the precursor polymer calculated from NMR, IR and TG, the number of the crosslinking point on the polymer chain is not less than 3. The composition ratio of this glass composite film is measured using a secondary ion mass spectrometry. As a result, it has been confirmed that 5% by atomic ratio of C atoms is contained. The amount of Si atoms of which four valences form a Si—Si bond is determined by XPS. As a result, it has been found that the atomic ratio of such Si atoms is not more than 0.1%.

(Examples 23-2 to 23-5)

According to the same manner as that described in Example 23-1 except for changing the forming process of the luminescent layer as follows, an EL device is made. That is, upon forming of the luminescent layer, polysilane (E7) is gelled by subjecting to a heat treatment at 120° C. for 500 seconds to form a glass composite film. Then, ultraviolet light is irradiated from a low-pressure mercury lamp at a dose of 10, 50, 250 or 2500 $mJ/cm^2$.

(Example 23-6)

According to the same manner as that described in Example 23-1 except for using polysilane (E15) in place of polysilane (E7), an EL device is made.

(Examples 23-7 to 23-9)

According to the same manner as that described in Example 23-6 except for changing the forming process of the luminescent layer as follows, an EL device is made. That is, the heating temperature upon forming of the luminescent layer is set at 160° C. and the heating time is set at 30, 300 or 300 seconds to gel polysilane (E7) to form a glass composite film.

(Comparative Example 23)

According to the same manner as that described in Example 23-1 except for using poly-(phenylmethylsilylene) (X) in place of polysilane (E7), an EL device is made.

A dc voltage is applied to the respective EL devices thus obtained so that the ITO electrode becomes +10 V to evaluate their EL characteristics. Concretely, the luminescence peak energy (corresponding to the luminous wavelength) and initial luminance and luminance on 100 hours after are measured. The treatment conditions and EL characteristics of the respective Examples are shown in Table 1, below.

The results of Table 1 will be examined. Firstly, upon paying attention to Examples 23-1 to 23-5, it has been found that there is the following relation between the dose of ultraviolet light and luminescence peak energy. That is, the luminescence peak energy decreases (Examples 23-2 and 23-3) as the dose increases, and then increases (Example 23-4). Further, no EL emission is observed (Example 23-5). This phenomenon is interpreted as follows. That is, when the dose is not more than 50 $mJ/cm^2$, the conjugate effect between the polysilane chain and oxygen atom is extended as the crosslinking degree becomes high, which results in decrease in luminescence peak energy. On the other hand, when the dose further increases, the contrary influence arises as the decomposition of the polysilane proceeds. As is apparent from a comparison between Example 23-6 and Examples 23-1, the luminescence peak energy is lowered in a copolymer of polysilane and polygermane. Furthermore, as is apparent from a comparison between Examples 23-7 to Examples 23-9, the luminescence peak energy is increased when the heating time upon crosslinking at 160° C. becomes long. This is because the decomposition of the polysilane chain proceeds as the heating time at 160° C. becomes larger.

TABLE 1

|  | Polymer | Temperature °C. | Time minute | UV does $mJ/cm^2$ | Luminescent peak energy eV | Luminance $cd/m^2$ Initial | 100 hrs |
|---|---|---|---|---|---|---|---|
| Example 32-1 | E7 | 120 | 500 | 0 | 3.0 | 50 | 45 |
| Example 32-2 | E7 | 120 | 500 | 10 | 2.4 | 50 | 45 |
| Example 32-3 | E7 | 120 | 500 | 50 | 1.65 | 49 | 44 |
| Example 32-4 | E7 | 120 | 500 | 250 | 2.0 | 30 | 25 |
| Example 32-5 | E7 | 120 | 500 | 2500 | No luminescent | — | — |
| Example 32-6 | E15 | 120 | 500 | 0 | 2.5 | 40 | 32 |
| Example 32-7 | E7 | 160 | 30 | 0 | 1.65 | 43 | 37 |
| Example 32-8 | E7 | 160 | 300 | 0 | 2.5 | 39 | 33 |
| Example 32-9 | E7 | 160 | 3000 | 0 | 2.8 | 35 | 30 |
| Comparative Example 23 | x | 120 | 500 | 0 | No luminescent | — | — |

Example 24 (EL device)

Figure 11A:
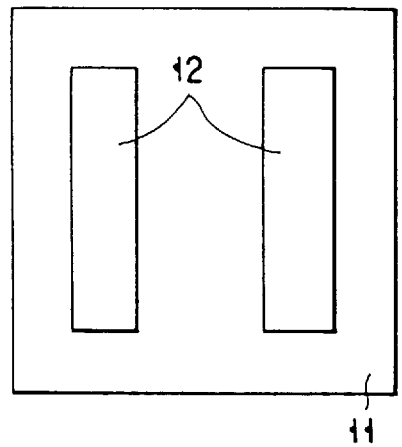
FIGS. 11A to 11C are plan views illustrating the EL device in Example 24 of the present invention.
Figure 11B:
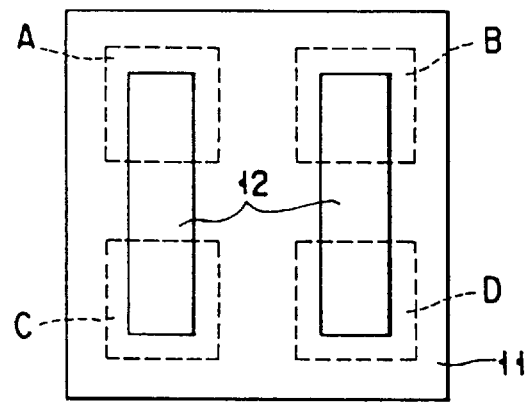
Figure 11C:
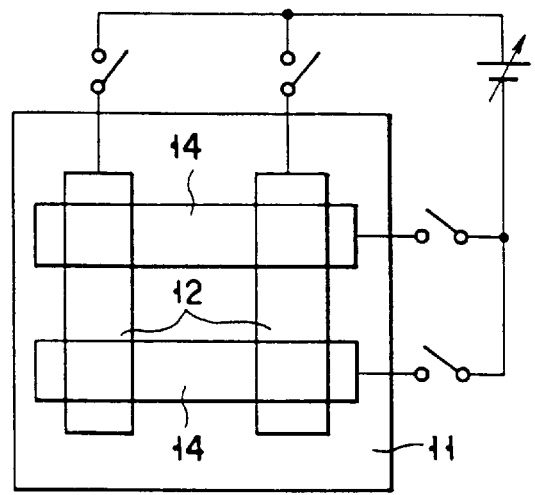

As shown in FIG. 11A, an ITO electrode as a hole injection electrode 12 is formed on a glass substrate 11, which is patterned in the form of two parallel stripes. This glass substrate/ITO electrode is charged in boiling isopropyl alcohol and subjected to ultrasonic cleaning for one minute. Then, a THF solution of polysilane (E7) is coated on this glass substrate/ITO electrode in the thickness of 100 nm. Then, as shown in FIG. 11B, ultraviolet light is irradiated on the regions of B, C and D among four corners of the glass composite film from a low-pressure mercury lamp through a mask having a predetermined pattern at a dose of 10, 50 or 250 mJ/cm$^2$ (no ultraviolet light is irradiated on the part corresponding to the region A). Thereafter, polysilane (E7) is gelled by heating at 12° C. for 500 seconds to form a glass composite film as a luminescent layer 13. Furthermore, as shown in FIG. 11C, a Mg—Al alloy is vacuum-deposited on this glass composite film in the thickness of 700 nm. This is patterned in the form of two parallel stripes which are perpendicular to the above pattern of the ITO electrode to form an electron injection electrode 14. As described above, an EL device is made.

Furthermore, a dc voltage (10 V) is applied to the respective regions A to D of this EL device to evaluate the EL characteristics. As a result, a blue light emission, a green light emission and a red light emission are observed in the regions A, B and C, respectively, but no emission is observed in the region D. Accordingly, the light emission in the regions A to C can be controlled, simultaneously or independently, by appropriately selecting each electrode.

Example 25 (EL device)

In this Example, polysilane (E16), polygermane (E16'), polystannane (E16"), polysilane (E7, recited again), polygermane (E7') or polystannane (E7") represented by the following formulas is used as polysilanes and Alq$_3$ represented by the following chemical formula is optionally used to make a fluorescent device shown in FIG. 1 or FIG. 2.

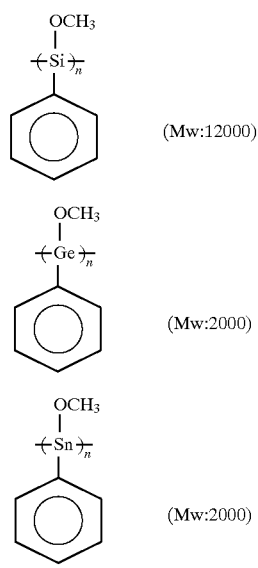

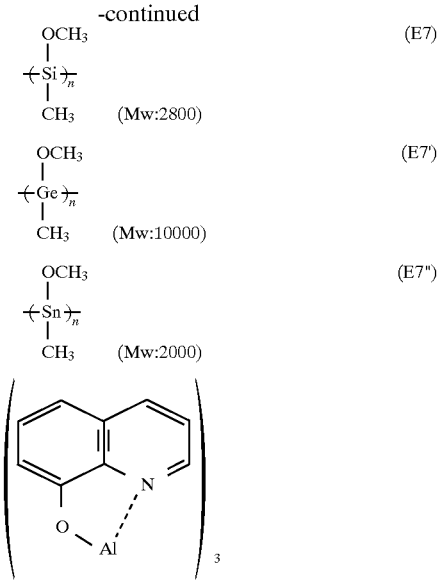

(Example 25-1)

An ITO electrode as a hole injection electrode 12 is formed on a glass substrate 11, which is charged in boiling isopropyl alcohol and subjected to ultrasonic cleaning for one minute. Then, a THF solution of polysilane (E16) is coated on this glass substrate/ITO electrode in the thickness of 100 nm and polysilane (E16) is gelled by heating at 120° C. for 500 seconds under a nitrogen atmosphere to form a glass composite film. This glass composite film acts as a luminescent layer 13 and also acts as a hole transport layer and an electron transport layer. A Mg—Al alloy having an atomic ratio of Mg:Al (10:1) is vacuum-deposited on this glass composite film in the thickness of 700 nm to form an electron injection electrode 14. As described above, an electroluminescent device (EL device) shown in FIG. 1 is made.

As is apparent from the reaction rate of the alkoxyl group of the precursor polymer calculated from NMR, IR and TG, the number of the crosslinking point on the polymer chain is not less than 3. The amount of Si atoms of which four valences form a Si—Si bond is determined by XPS. As a result, it has been found that the atomic ratio of such Si atoms is not more than 0.2%.

(Examples 25-2 to 25-6)

According to the same manner as that described in Example 25-1 except for using polygermane (E16'), polystannane (E16"), polysilane (E7), polygermane (E7') or polystannane (E7") in place of polysilane (E16), an EL device shown in FIG. 1 is made.

(Example 25-7)

An ITO electrode as a hole injection electrode 22 is formed on a glass substrate 21, which is charged in boiling isopropyl alcohol and subjected to ultrasonic cleaning for one minute. Then, a THF solution of polysilane (E16) is coated on this glass substrate/ITO electrode in the thickness of 100 nm and polysilane (E16) is gelled by heating at 160° C. for 10 minutes under a nitrogen atmosphere to form a glass composite film. This glass composite film acts as a hole transport layer 23. Alq$_3$ is vacuum-deposited on this glass composite film in the thickness of 50 nm at a deposition rate of 0.1 nm/second under vacuum of $7 \times 10^{-7}$ torr. This $Alq_3$ layer acts as a luminescent layer 24 and also acts as an electron transport layer. Then, a Mg—Al alloy having an atomic ratio of Mg:Al (10:1) is vacuum-deposited on this $Alq_3$ layer in the thickness of 700 nm to form an electron injection electrode 25. As described above, an EL device shown in FIG. 2 is made.

As is apparent from the reaction rate of the alkoxyl group of the precursor polymer calculated from NMR, IR and TG, the number of the crosslinking point on the polymer chain is not less than 3.

(Examples 25-8 to 25-12)

According to the same manner as that described in Example 25-7 except for using polygermane (E16'), polystannane (E16"), polysilane (E7), polygermane (E7') or polystannane (E7") in place of polysilane (E16), an EL device shown in FIG. 2 is made.

(Example 25-13)

An ITO electrode as a hole injection electrode 12 is formed on a glass substrate 11, which is charged in boiling isopropyl alcohol and subjected to ultrasonic cleaning for one minute. Then, a solution of 1% by weight of polysilane (E16), 0.7% by weight of $Alq_3$ and 98.3% by weight of dibutyl ether is coated on this glass substrate/ITO electrode in the thickness of 100 nm and polysilane (E16) is gelled by heating at 160° C. for 10 minutes under a nitrogen atmosphere to form a glass composite film containing $Alq_3$. This $Alq_3$-containing glass composite film acts as a luminescent layer 13 and also acts as a hole transport layer and an electron transport layer. Furthermore, a Mg—Al alloy having an atomic ratio of Mg:Al (10:1) is vacuum-deposited on this glass composite film in the thickness of 700 nm to form an electron injection electrode 14. As described above, an EL device shown in FIG. 1 is made.

(Examples 25-14 to 25-18)

According to the same manner as that described in Example 25-13 except for using polygermane (E16'), polystannane (E16"), polysilane (E7), polygermane (E7') or polystannane (E7") in place of polysilane (E16), an EL device shown in FIG. 1 is made.

A dc voltage is applied to the respective EL devices thus obtained so that the ITO electrode becomes +10 V to evaluate their EL characteristics. Concretely, the initial luminance and luminance on 100 hours after are measured. The construction and EL characteristics of the respective Examples are shown in Table 2, below.

As is apparent from Table 2, the EL devices using $Alq_3$ in combination with polysilanes of Examples 25-7 to 25-18 are improved in luminance, and the EL devices having a $Alq_3$-containing glass composite film of Examples 25-13 to 25-18 are superior in durability.

TABLE 2

|  | Polymer | $Alq_3$ | Luminance cd/m² Initial | 100 hrs |
|---|---|---|---|---|
| Example 25-1 | E16 | — | 50 | 40 |
| Example 25-2 | E16' | — | 45 | 41 |
| Example 25-3 | E16" | — | 40 | 37 |
| Example 25-4 | E7 | — | 40 | 35 |

TABLE 2-continued

|  | Polymer | $Alq_3$ | Luminance cd/m² Initial | 100 hrs |
|---|---|---|---|---|
| Example 25-5 | E7' | — | 36 | 31 |
| Example 25-6 | E7" | — | 30 | 26 |
| Example 25-7 | E16 | Stacked | 180 | 160 |
| Example 25-8 | E16' | Stacked | 170 | 150 |
| Example 25-9 | E16" | Stacked | 150 | 120 |
| Example 25-10 | E7 | Stacked | 160 | 120 |
| Example 25-11 | E7' | Stacked | 130 | 100 |
| Example 25-12 | E7" | Stacked | 100 | 80 |
| Example 25-13 | E16 | Mixed | 150 | 148 |
| Example 25-14 | E16' | Mixed | 140 | 136 |
| Example 25-15 | E16" | Mixed | 120 | 110 |
| Example 25-16 | E7 | Mixed | 120 | 115 |
| Example 25-17 | E7' | Mixed | 110 | 107 |
| Example 25-18 | E7" | Mixed | 100 | 90 |

Example 26 (photosensitive element for electrophotography)

In this Example, polysilane (E16), polygermane (E16'), polystannane (E16"), polysilane (E7), polygermane (E7') or polystannane (E7") used in Example 25 is used as polysilanes and zinc phthalocyanine (ZnPc) or dibromoanthanthrone (DBAA) represented by the following formula as the charge generation material to make an photosensitive element for electrophotography shown in FIG. 3 or FIG. 4.

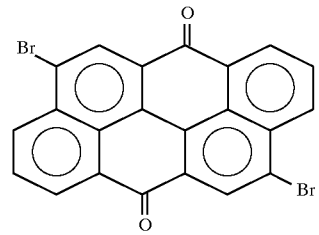

(Example 26-1)

An aluminum substrate 31 is prepared. On the other hand, 10 parts by weight of zinc phthalocyanine (ZnPc) as the charge generation material, 5 parts by weight of polyvinyl butyral and 85 parts by weight of methyl ethyl ketone are mixed and the mixture is sufficiently dispersed using a sand mill to prepare a composition to be used for a charge generation layer. This composition is coated on the aluminum substrate 31 using a bar coater, followed by drying with heating to form a charge generation layer 32 having a film thickness of 0.3 μm. Furthermore, a solution is prepared by dissolving 20 parts by weight of polysilane (E16) in 80 parts by weight of diethyl ether. This solution is coated on the above charge generation layer using a bar coater, followed by gelling with heating at 160° C. for 15 minutes to form a charge transport layer 33 of a glass composite film having a film thickness of 12 μm.

As is apparent from the reaction rate of the alkoxyl group of the precursor polymer calculated from NMR, IR and TG, the number of the crosslinking point on the polymer chain is not less than 3.

(Examples 26-2 to 26-6)

According to the same manner as that described in Example 26-1 except for using polygermane (E16'), polystannane (E16"), polysilane (E7'), polygermane (E7') or polystannane (E7") in place of polysilane (E16), an photosensitive element for electrophotography shown in FIG. 3 is made.

(Example 26-7)

An aluminum substrate 41 is prepared. On the other hand, a solution is prepared by dissolving 20 parts by weight of polysilane (E16) in 80 parts by weight of diethyl ether. This solution is coated on the aluminum substrate 41 using a bar coater, followed by gelling with heating at 160° C. for 15 minutes to form a charge transport layer 42 of a glass composite film having a film thickness of 12 $\mu$m. Furthermore, 5 parts by weight of dibromoanthanthrone (DBAA) as the charge generation material, 10 parts by weight of polysilane and 85 parts by weight of diethyl ether are mixed and the mixture is sufficiently dispersed using a ball mill to prepare a composition to be used for a charge generation layer. This composition is coated on the above charge transport layer 42 using a bar coater, followed by curing with heating at 160° C. for 10 minutes to form a charge generation layer 43 having a film thickness of 0.3 $\mu$m. As described above, an photosensitive element for electrophotography shown in FIG. 4 is made.

The characteristics of the resulting photosensitive element for electrophotography are evaluated as follows. That is, the photosensitive element is subjected to corona charging by a static system using an electrostatic copying paper testing apparatus (Model SP-428, manufactured by Kawaguchi Denki Co., Ltd.) and, after standing for one second in a dark place, it is exposed to light at an illuminance of 2.5 lux. Incidentally, the applied voltage at the time of corona charging is –5 kV in Examples 26-1 to 26-6 and +5 kV in Example 26-7, respectively. In this test, the surface potential ($V_0$) and exposure ($E_{1/2}$) which is required for the surface potential ($V_1$) after subjecting to dark decay for one second to be reduced to half are measured as the charging characteristics. The photosensitive element is subjected to strong exposure at an illuminance of 20 lux second to measure a residual potential ($V_r$). Furthermore, the photosensitive element is mounted to a cylinder for photosensitive drum of a PPC copying machine (Leodry 9240, manufactured by Toshiba Co., Ltd.) to print 1500 copies, and then the residual potential ($V_r'$) is measured using the above electrostatic copying paper testing machine. These results are shown in Table 3, below.

TABLE 3

| | Polymer | Charge generation material | $E_{1/2}$ lx · s | $V_r$ V | $V_r'$ V |
|---|---|---|---|---|---|
| Example 26-1 | E16 | ZnPc | 1.2 | −1 | −5 |
| Example 26-2 | E16' | ZnPc | 1.2 | −1 | −6 |
| Example 26-3 | E16" | ZnPc | 1.1 | −1 | −4 |
| Example 26-4 | E7 | ZnPc | 1.3 | −1 | −5 |
| Example 26-5 | E7' | ZnPc | 1.2 | −1 | −5 |
| Example 26-6 | E7" | ZnPc | 1.2 | 0 | −4 |
| Example 26-7 | E16 | DBAA | 4.3 | +1 | +10 |

Example 27 (non-linear optical device)

While stirring 3.3 ml of an ethanol solution of polysilane (E1) (80 mg) used in Example 1 and tetraethoxysilane (TEOS) (80 mg) at 30° C., a mixed solution of 30% aqueous ammonia (0.5 ml) and ethanol (5 ml) is added, and then the mixture is stirred at room temperature for 12 hours. This solution is charged in a quartz cell (1 cm×1 cm×3 cm) followed by heating at 120° C. for 30 minutes to give a glass composite material.

As is apparent from the reaction rate of the functional group of the precursor polymer calculated from NMR, IR and TG, the number of the crosslinking point on the polymer chain is not less than 3. The peak due to Si crystallite is not observed by a X-ray diffraction.

The resulting glass composite material in the quartz glass cell is placed on the position where a phase conjugate wave is generated, and a third harmonic (wavelength: 355 nm) of a Q switch YAG laser is irradiated at a peak power of 500 kW/cm$^2$ a repeating frequency of 10 Hz, and a half-width of 10 nsec to measure a third non-linear optical constant. As a result, the following value is obtained. $\chi^{(3)}=3\times10^{-9}$ (esu). The absorption coefficient and $\chi^{(3)}$ decreased by only 2% even after 200 hours have passed. The deterioration degree is less than 40th of that in case of using polydihexylsilane as a non-linear optical material.

Example 28 (non-linear optical device)

A film is formed by pressing polysilane (E4) containing a tertiarybutoxy group as the substituent, which is used in Example 6. This film is enclosed in a desiccator, together with a 6N aqueous hydrochloric acid solution charged in an open container, and exposed to hydrochloric acid vapor by standing at room temperature for 2 days. Furthermore, the film is heated under a hydrochloric acid vapor atmosphere at 150° C. for 4 hours. The infrared spectrum of this film is measured. As a result, an increase in absorption at about 1020 cm$^{-1}$ is observed. Therefore, it has been confirmed that a Si—O—Si bond is formed, additionally. On the other hand, the absorption due to the t-butyl group disappeared. Furthermore, hardening of the film quality is confirmed. As is apparent from these results, it is considered that the t-butyl group of polysilane (E4) is decomposed by heating in the presence of the acid catalyst and the resulting silanol groups are condensed each other to form the same silicate glass-stimulated structure.

As is apparent from the reaction rate of the functional group of the precursor polymer calculated from NMR, IR and TG, the number of the crosslinking point on the polymer chain is not less than 3. The peak due to Si crystallite is not observed by a X-ray diffraction. The absorption of Si—Si is observed by a far infrared IR spectrum and the absorption due to Si—O—Si is observed by an IR spectrum.

The resulting glass composite material in the quartz glass cell is placed on the position where a phase conjugate wave is generated, and a third harmonic (wavelength: 355 nm) of a Q switch YAG laser is irradiated at a peak power of 500 kW/cm$^2$ to measure a third non-linear optical constant. As a result, the following value is obtained. $\chi^{(3)}=3\times10^{-9}$ (esu). The absorption coefficient and $\chi^{(3)}$ decreased by only 2% even after oscillating 20000 times. The deterioration degree is less than 40th of that in case of using polydihexylsilane as a non-linear optical material.

Example 29 (non-linear optical device)

According to the same manner as that described in Example 27 except for using polygermane (E17) represented by the following formula in place of polysilane (E1), a glass composite material is obtained.

As is apparent from the reaction rate of the functional group of the precursor polymer calculated from NMR, IR and TG, the number of the crosslinking point on the polymer chain is not less than 3. The peak due to Ge crystallite is not observed by a X-ray diffraction.

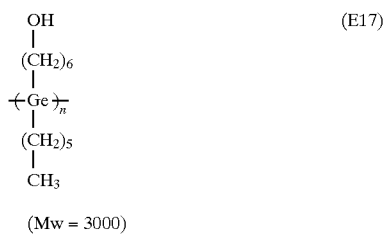

(Mw = 3000)

The resulting glass composite material in the quartz glass cell is placed on the position where a phase conjugate wave is generated, and a third harmonic (wavelength: 355 nm) of a Q switch YAG laser is irradiated at a peak power of 500 kW/cm² to measure a third non-linear optical constant. As a result, the following value is obtained. $\chi^{(3)}=3\times10^{-9}$ (esu). Furthermore, the absorption coefficient and $\chi^{(3)}$ decreased by only 2% even after oscillating 20000 times. The deterioration degree is less than 40th of that of a polygermane which is not subjected to a crosslinking treatment.

Example 30 (non-linear optical device)

According to the same manner as that described in Example 27 except for using polygermane (E18) represented by the following formula in place of polysilane (E1), a glass composite material is obtained.

As is apparent from the reaction rate of the functional group of the precursor polymer calculated from NMR, IR and TG, the number of the crosslinking point on the polymer chain is not less than 3. The peak due to Si crystallite is not observed by a X-ray diffraction.

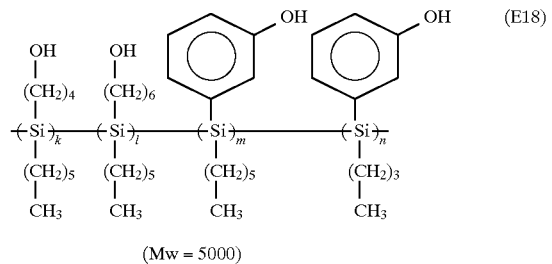

(Mw = 5000)

A second harmonic (wavelength: 400 nm) of mode-lock Ti: sapphire laser is irradiated on the resulting glass composite material at a pulse width of 100 femtoseconds (100× 10–15 seconds) and at a repeating frequency of 82 MHz to conduct a photon-echo test. As a result, it has been found that a memory time of the photon-echo is 800 picoseconds (800×10⁻¹² seconds).

Example 31 (non-linear optical device)

While stirring 3.3 ml of an ethanol solution of polysilane (E1) (80 mg) and tetraethoxysilane (TEOS) (80 mg), a mixed solution of 30% aqueous ammonia (0.5 ml) and ethanol (5 ml) is added and the mixture is stirred at room temperature for 12 hours. This solution is concentrated, and then spin-coated on a glass substrate, which is gelled by drying followed by heating at 100° C. for 40 minutes to obtain a transparent film.

As is apparent from the reaction rate of the functional group of the precursor polymer calculated from NMR, IR and TG, the number of the crosslinking point on the polymer chain is not less than 3. The peak due to Si crystallite is not observed by a X-ray diffraction.

Figure 5:
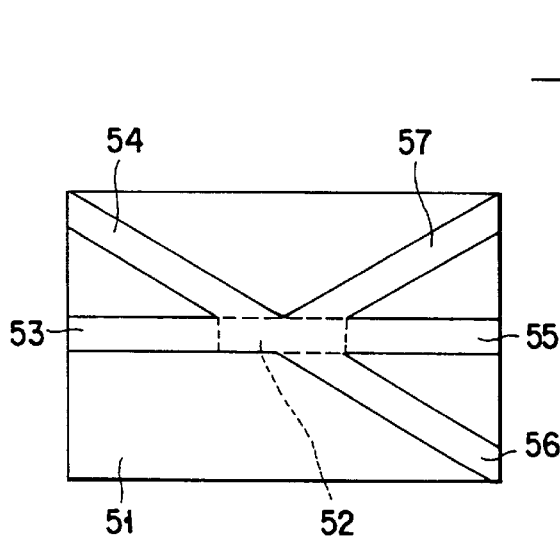
FIG. 5 is a sectional view illustrating one embodiment of a non-linear optical device according to the present invention.

This film is etched with an 4% aqueous hydrofluoric acid using a resist as the mask to prepare a waveguide type light switching device having a shape as shown in FIG. 5. Incidentally, the width of the waveguide path is 100 μm.

A photodiode is deposited at the exterior of a waveguide 57 and the following test is conducted while monitoring an output from the waveguide 57. Firstly, when a third harmonic (wavelength: 355 nm) of a Q switch YAG laser enters at a peak power of 500 kW/cm² from the waveguide path 57, no output from the waveguide path 57 can be observed. Then, a third harmonic (wavelength: 355 nm) of a Q switch YAG laser enters at a peak power of 500 kW/cm² from waveguides 53, 54, simultaneously, diffracted light can be observed from the waveguide 57 because the diffraction has arose at the third non-linear optical phenomenon generating part 52.

Example 32 (laser device)

While stirring 3.3 ml of an ethanol solution of a polysilane copolymer (E19) (80 mg) represented by the following chemical formula and tetraethoxysilane (TEOS) (80 mg) at 30° C., a mixed solution of 30% aqueous ammonia (0.5 ml) and ethanol (5 ml) and the mixture is stirred at room temperature for 12 hours. This solution is charged in a quartz cell (1 cm×1 cm×3 cm) and the solvent is removed by drying under vacuum to give a glass composite material. Regarding to the glass composite material, the absorption peak wavelength is 331 nm, the half-width thereof being about 40 nm, and the emission peak wavelength is 373 nm, the half-width thereof being about 40 nm.

As is apparent from the reaction rate of the functional group of the precursor polymer calculated from NMR, IR and TG, the number of the crosslinking point on the polymer chain is not less than 3. The peak due to Si crystallite is not observed by a X-ray diffraction.

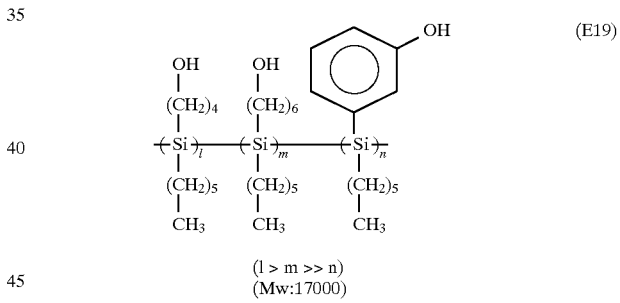

(l > m >> n)
(Mw:17000)

Figure 12:
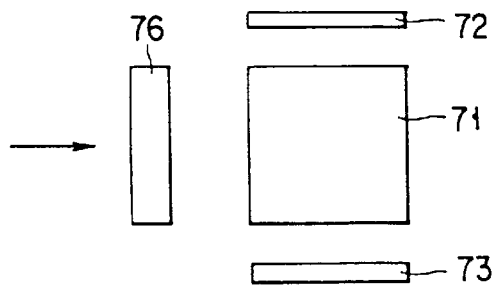
FIG. 12 is a schematic view illustrating the laser device in Example 32 of the present invention.

As shown in FIG. 12, the resulting glass composite material in the quarts glass cell is used as a laser medium 71, which is disposed in an oscillator comprising a mirror 72 (reflectance: 100%) and a mirror 73 (reflectance: 40%) and a pair of electrodes (not shown) are disposed so that they are perpendicular to these mirrors 72, 73. A fourth harmonic (wave-length: 266 nm) of Q switch Nd³⁺: YAG laser is converged through a cylindrical lens 76, and then irradiated on this laser medium 71. The peak power, repeating frequency and pulse width of this excitation laser light is 1 kW/cm², 5 kHz and 200 nsec, respectively. As a result, oscillation of laser beam having a wavelength of 358 nm is observed. The oscillation of laser beam is confirmed by the directivity of light and non-linear relation between excitation strength and oscillation strength. The peak power of the oscillated laser beam is 5 W/cm². The peak power decreased by only 5% even after oscillating 20000 times. The deterioration degree is less than 18th of that in case of using polydihexylsilane as the laser medium.

Figure 13:
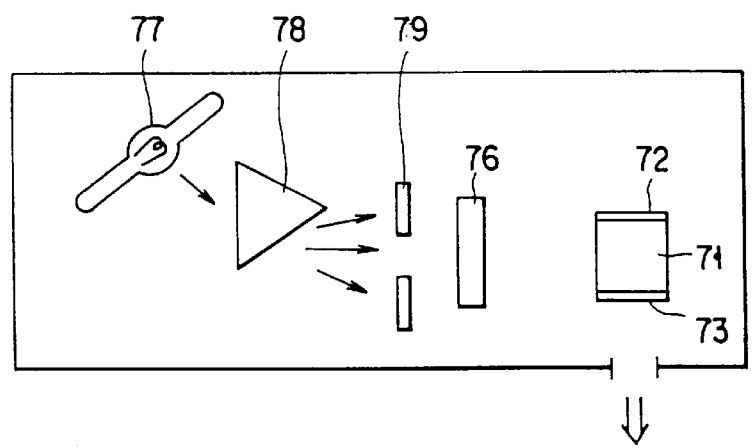
FIG. 13 is a schematic view illustrating another laser device in Example 32 of the present invention.

Next, a portable laser as shown in FIG. 13 is made as follows. Firstly, the above quarts cell is broken to take out a glass composite material as the laser medium. Then, gold, which can be mirrors 72, 73 respectively constituting an oscillator, is vacuum-deposited on opposite two surfaces. At this point, it is adjusted so that the reflectance of one mirror 72 becomes 95% and that of another mirror 73 becomes 60%. A pair of electrodes (not shown) are provided to this laser medium with mirrors, which is packaged together with a 1200 W high-pressure xenon lamp 77 as an excitation light source, a prism 78, a space filter 79 and a cylindrical lens 76. These optical systems are arranged so that excitation light (peak wavelength: 250 nm) of which wavelength component of 350 nm or more is cut can be irradiated on the laser medium 71 by passing light from a light source through the prism 78 and space filter 79. The size of this package is 20 cm×8 cm×5 cm. There can be obtained laser beam having a wavelength of 358 nm and a power of 30 mW using such a portable laser.

Example 33 (laser device)

A film is formed by pressing polysilane (E4) containing a tertiarybutoxy group as the substituent, which is used in Example 6. This film is enclosed in a desiccator, together with a 6N aqueous hydrochloric acid solution charged in an open container, and exposed to hydrochloric acid vapor by standing at room temperature for 2 days. Furthermore, the film is heated under a hydrochloric acid vapor atmosphere at 150° C. for 4 hours. The infrared spectrum of this film is measured. As a result, an increase in absorption at about 1020 cm$^{-1}$ is observed. Therefore, it has been confirmed that a Si-O-Si bond is formed, additionally. On the other hand, the absorption due to the t-butyl group disappears. In addition, hardening of the film quality is confirmed. As is apparent from these results, it is considered that the t-butyl group of polysilane (E4) is decomposed by heating in the presence of the acid catalyst and the resulting silanol groups are condensed each other to form a structure like silicate glass. Regarding to the glass composite material, the absorption peak wavelength is near 315 nm, the half-width thereof being about 100 nm, and the emission peak wavelength is near 360 nm, the half-width thereof being about 40 nm.

As is apparent from the reaction rate of the functional group of the precursor polymer calculated from NMR, IR and TG, the number of the crosslinking point on the polymer chain is not less than 3. The peak due to Si crystallite is not observed by a X-ray diffraction. The absorption of Si—Si is observed by a far infrared IR spectrum and the absorption due to Si—O—Si is observed by an IR spectrum.

A trial of laser oscillation is made, using the resulting glass composite material as the laser medium and arrangement as shown in FIG. 12. A fourth harmonic (wavelength: 266 nm) of a Ti: sapphire laser is used as excitation light. The peak power, repeating frequency and pulse width of this excitation laser light are 50 kW/cm$^2$, 80 kHz and 100 fsec, respectively. The oscillation of laser beam is confirmed by the directivity of light and non-linear relation between excitation strength and oscillation strength. The peak power of the oscillated laser beam is 100 W/cm$^2$. The peak power decreases by only 7% even after oscillating for 20 hours. The deterioration degree is less than 12th of that in case of using polydihexylsilane as the laser medium.

Example 34 (laser device)

According to the same manner as that described in Example 32, polygermane (E20) represented by the following chemical formula is used to make a glass composite material. Regarding to the glass composite material, the absorption peak wavelength is 334 nm, the half-width thereof being about 90 nm, and the emission peak wavelength is 375 nm, the half-width thereof being about 40 nm.

As is apparent from the reaction rate of the functional group of the precursor polymer calculated from NMR, IR and TG, the number of the crosslinking point on the polymer chain is not less than 3. The peak due to Ge crystallite is not observed by a X-ray diffraction.

A trial of laser oscillation is made, using the resulting glass composite material as the laser medium and arrangement as shown in FIG. 12. A third harmonic (wavelength: 355 nm) of a Nd$^{3+}$: YAG laser is used as excitation light. The peak power, repeating frequency and pulse width of this excitation laser beam are 5 kW/cm$^2$, 5 kHz and 200 nsec, respectively. The peak power of the oscillated laser light is 30 W/cm$^2$. The peak power decreased by only 15% even after oscillating 20000 times. The deterioration degree is less than 6th of that in case of using non-crosslinked polygermane as the laser medium.

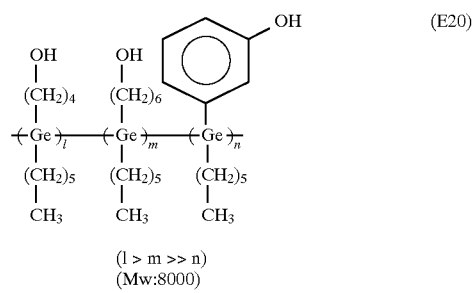

(l > m >> n)
(Mw:8000)

Example 35 (laser device)

A toluene solution of a polysilane copolymer (E19) is charged in a quartz glass cell (1 cm×1 cm×5 cm) and dried under vacuum. This quartz glass cell is put in a desiccator, together with an 37% aqueous formalin solution an a 6N aqueous hydrochloric acid solution, and then allowed to stand for 2 weeks. Then, polysilane is crosslinked by drying under vacuum for 24 hours, again. In addition, tetraethoxysilane (1 g), ethanol (1.5 g), water (2 g) and hydrochloric acid (0.1 g) are mixed and stirred at room temperature for 15 hours, and then water (3 g) and acetonitrile (0.5 g) are added to the mixture and stirred to obtain a solution. The quartz glass cell containing the crosslinked polysilane is immersed in the solution for 10 minutes. Thereafter, the quartz glass cell is slightly washed with water and dried with heating at 100° C. for 40 minutes.

As is apparent from the reaction rate of the functional group of the precursor polymer calculated from NMR, IR and TG, the number of the crosslinking point on the polymer chain is not less than 3. The peak due to Si crystallite is not observed by a X-ray diffraction.

A trial of laser oscillation is made, using the resulting glass composite material as a laser medium and arrangement as shown in FIG. 12. A fourth harmonic (wavelength: 266 nm) of a Nd$^{3+}$: YAG laser is used as excitation light. The peak power, repeating frequency and pulse width of this excitation laser beam are 1 kW/cm$^2$, 5 kHz and 200 nsec, respectively. As a result, oscillation of laser beam having a wavelength of 358 nm is observed. The oscillation of laser beam is confirmed by the directivity of light and non-linear relation between excitation strength and oscillation strength. The peak power of the oscillated laser beam is 5 W/cm$^2$. The peak power decreases by only 40% even after oscillating 20000 times. The deterioration degree is less than half of that in case of using polydihexylsilane as the laser medium.

Example 36

In this Example, graphite to be used as an electrode of various electric devices such as EL device, and solar battery is used as a substrate. Functional groups such as hydroxyl group, and carboxyl group are normally present on the graphite substrate. A tetrahydrofuran solution of polysilane (E7) used in Example 8 is spin-coated on the graphite substrate, followed by curing with heating at 160° C. for 30 minutes under a nitrogen gas flow to form a polysilane film having a thickness of 3 μm. The surface hardness of the resulting polysilane film shows a pencil hardness H. This film is subjected to a checkers test. As a result, no peeling is observed. Therefore, it has been confirmed that adhesion properties with the graphite substrate is good. This is because the surface of the graphite substrate is chemically bonded to the polysilane main chain through an oxygen atom which is bonded directly to the polysilane main chain.

For comparison, a toluene solution of poly (dicyclohexylsilane) having a weight-average molecular weight of 4000 is spin-coated on the graphite substrate to form a polysilane film having a thickness of 3 μm. The surface hardness of the resulting polysilane film shows a pencil hardness 2B. This film is subjected to a checkers test. As a result, 24% of peeling is observed. Therefore, this film is inferior to that of Example 36 in adhesion properties between the graphite substrate and polysilane film.

Example 37

A glass substrate on which an ITO electrode is formed is subjected to a heat treatment at 250° C. under vacuum for one hour. This glass substrate with the ITO electrode is enclosed in a desiccator, together with a 6N aqueous hydrochloric acid solution charged in an open container, and exposed to hydrochloric acid vapor for one hour. A hydroxyl group is formed on the surface of the ITO electrode by subjecting to this treatment using hydrochloric acid. A tetrahydrofuran solution of polysilane (E7) is spin-coated on this ITO electrode, followed by curing with heating at 160° C. for 30 minutes under a nitrogen gas flow to form a polysilane film having a thickness of 3 μm. The surface hardness of the resulting polysilane film shows a pencil hardness H. This film is subjected to a checkers test. As a result, no peeling is observed. Therefore, it has been confirmed that adhesion properties with the ITO electrode is good. Then, the polysilane film is ground to the vicinity of an interface with the ITO electrode, and then analyzed by FT-IR. As a result, the absorption due to a Si—O—Si bond and absorption due to an In—O—Si bond are observed. Therefore, it has been confirmed that the surface of the ITO electrode is chemically bonded to the polymer main chain of polysilane through an oxygen atom.

On the other hand, the glass substrate on which the ITO electrode is formed is subjected to a heat treatment at 250° C. under vacuum for one hour. A tetrahydrofuran solution of polysilane (E7) is spincoated on the graphite substrate which is not subjected to any treatment, followed by curing with heating at 160° C. for 30 minutes under a nitrogen gas flow to give a polysilane film having a thickness of 3 μm. The resulting film is also subjected to a checkers test. As a result, 11% of peeling is observed. Therefore, it has been confirmed that this film is inferior to that of Example 37 in adhesion properties between the ITO electrode and polysilane film. Then, the polysilane film is ground to the vicinity of an interface with the ITO electrode, and then analyzed by FT-IR. As a result, the absorption due to an In—O—Si bond is not observed.

Example 38

In this Example, an EL device having the structure shown in FIG. 2 is made. Firstly, a glass substrate 21 on which an ITO electrode is formed as a hole injection electrode 22 is subjected to a heat treatment at 250° C. under vacuum for one hour. This glass substrate/ITO electrode is enclosed in a desiccator, together with a 6N aqueous hydrochloric acid solution charged in an open container, and exposed to hydrochloric acid vapor for one hour. A hydroxyl group is formed on the surface of the ITO electrode by subjecting to this treatment using hydrochloric acid. Thereafter, the glass substrate is dried at room temperature under vacuum for 10 hours. A tetrahydrofuran solution of polysilane (E7) is spin-coated on this ITO electrode, followed by curing with heating at 160° C. for 30 minutes under a nitrogen flow to form a glass composite film having a thickness of 50 nm. This glass composite film acts as a hole transport layer 23. An $Alq_3$ layer having a thickness of 50 nm was vacuum-deposited on this glass composite film. This $Alq_3$ layer acts as a luminescent layer 24 and also acts as an electron transport layer. Furthermore, aluminum is vacuum-deposited on this $Alq_3$ layer in a thickness of 500 nm to form an electron injection electrode 25, thereby making an EL device.

A voltage of 10 V is applied to this EL device to examine a luminance. As a result, the initial luminance was 200 $cd/cm^2$ and luminance after 100 hours was 195 $cd/cm^2$. It has been found that the EL device has a high luminance and is also superior in durability.

For comparison, an EL device is made according to the same manner as that described in Example 38 except that the surface of the ITO electrode is not subjected to a hydrochloric acid treatment. A voltage of 10 V is applied to this EL device to examine a luminance. As a result, the initial luminance was 180 $cd/cm^2$ and luminance after 100 hours was 160 $cd/cm^2$. The EL device is inferior to that of Example 38 in luminance and durability.

Example 39

A KBr substrate is placed on a sample holder of a plasma CVD reaction chamber and the substrate temperature is maintained at −100° C. A hydrogen gas containing a 2% silane gas is allowed to pass through this reaction chamber and the total gas pressure is set at 0.3 torr. Then, a plasma is generated at a RF powder density of 0.2 $W/cm^2$ to deposit a thin film having a film thickness of 0.5 μm on the substrate. The IR spectrum of this thin film is measured. As a result, the absorption due to a Si—Si bond is observed at about 2160 $cm^{-2}$. Therefore, it has been confirmed that this thin film is made of polysilane. The glass composite film has a pencil hardness of 1H.

Other measurement results are as follows. The volume resistivity (according to JIS-C2151) is not more than $3 \times 10^6$ Ωcm. The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

According to the same manner as that described above, a polysilane film is formed on a KBr substrate and an argon gas containing 1% oxygen is allowed to pass through a reaction chamber for 30 minutes, followed by heating to 60° C. The IR spectrum is measured. As a result, the absorption due to a Si—O—Si bond is observed at about 1100 $cm^{-2}$. Therefore, it has been confirmed that an oxygen-crosslinked polysilane composite material is formed on the KBr substrate.

Then, according to the same manner as that described above, formation of a polysilane thin film having a film thickness of 0.1 μm by plasma CVD, substitution of a hydroxyl group due to an oxygen diluted gas and crosslinking with heating are repeatedly conducted on a quartz substrate to form a thin film having a film thickness of 2 μm of a polysilane composite material. Regarding this polysilane composite material, the peak of the absorption spectrum is observed at 360 nm and peak of the emission spectrum is observed at 370 nm. The luminous efficiency at room temperature is sufficiently high, such as 19%.

The light resistance of this polysilane composite material is evaluated. As a result, the amount of the light emission decreases only by 3% after a third harmonic of a Q switch YAG laser (wavelength: 355 nm, average power density: 1 W/cm$^2$, repeating frequency: 1 kHz, peak power: 3.3 kHz, half-width: 300 nsec) is irradiated for 5 hours.

Example 40

Figure 14:
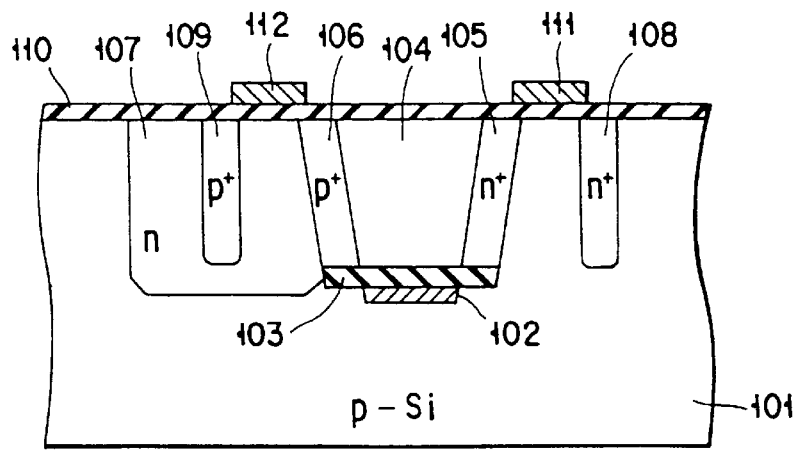
FIG. 14 is a sectional view illustrating the integrated circuit of an electroluminescent device and MOS transistors in Example 40 of the present invention.

An integrated circuit comprising a electroluminescent device and a transistor, as shown in FIG. 14, is made. This device has a structure that a diffusion layer of a MOS transistor which can be an electrode is connected with both ends of a polysilane composite material as a luminescent material.

Firstly, a region, where a luminescent part will be formed, of a p-type silicon substrate 101 is selectively etched to form a trench. On the bottom of this trench, an Al layer 102 acting as a mirror is formed by spattering. An oxide film 103 is deposited on this Al layer 102. Then, according to the same manner as that described in Example 39, formation of a polysilane thin film by plasma CVD, substitution of a hydroxyl group due to an oxygen diluted gas and crosslinking with heating are conducted on this oxide film 103 to form an oxygen-crosslinked polysilane composite film 104 having a film thickness of 500 nm, as a luminescent layer.

Then, the region where one electrode is formed is selectively etched to form a trench, and an oxide film 103 is deposited on the bottom thereof. Polysilicon is deposited in the trench, and then converted into a single crystal by annealing. An arsenic ion is implanted in this polysilicon, which is further converted into a single crystal by annealing to form an n$^+$-type diffusion layer 105. Likewise, the region where another electrode is formed is selectively etched to form a trench, and an oxide film 103 is deposited on the bottom thereof. Polysilicon is deposited in the trench, and then converted into a single crystal by annealing. An boron ion is inplante in this polysilicon, which is further converted into a single crystal by annealing to form a p$^+$-type diffusion layer 106. These two electrodes are not formed in parallel so that no oscillator is formed.

Furthermore, an n-type well region 107, an n$^+$-type diffusion layer 108, a p$^+$-type diffusion layer 109, a gate insulator 110 and gate electrodes 111, 112 are formed in order to make a device.

A voltage is applied to the n$^+$-type diffusion layer 105 and p$^+$-type diffusion layer 106, +12 V and −12 V, respectively, by switching on two transistors. As a result, light of 370 nm is emitted from the electroluminescent device.

Example 41

Trifluolomethanesulfonic acid (0.5 ml) is added to 20 ml of a methylene chloride solution of poly(phenylhexylsilylene) (1 g, weight-average molecular weight Mw: 1,000,000) in an argon atmosphere, followed by stirring at room temperature for one hour. To this solution, a mixed solution of ethanol (5 ml) and triethylamine (1.5 ml) is added and the mixture is stirred at room temperature for additional one hour. Then, the solvent was removed, followed by drying under vacuum for 30 minutes. The residue is dissolved in diethyl ether, and this ether solution is washed with water and dried over anhydrous sodium sulfate. Then, the solvent is removed and dried under vacuum to give polysilane having a repeating unit represented by the above formula (E2) as a pale yellow oily substance (yield: 0.5 g, weight-average molecular weight Mw: 4000), the ratio of phenyl group to ethoxy group=2:8.

According to the same manner as that described above except for using poly(phenylmethylsilylene) (weight-average molecular weight Mw: 20000) as polysilane and using methanol in place of ethanol, polysilane having a repeating unit represented by the above formula (E7) is obtained as a pale yellow oily substance (yield: 0.4 g, weight-average molecular weight Mw: 2700), the ratio of phenyl group to methoxy group=2:8.

Then, 10 ml of an N-methylpyrrolidinone (NMP) solution of an aniline resin (AR) (0.3 g) having a repeating unit represented by the following chemical formula is mixed with 10 ml of an NMP solution of polysilane (E2, 1 g) synthesized above and, after stirring rapidly at room temperature, the resulting solution is coated on a substrate which is dried under vacuum to remove the solvent. Furthermore, the substrate is dried with heating at 120° C. under an argon gas flow for one hour to form a yellow transparent film.

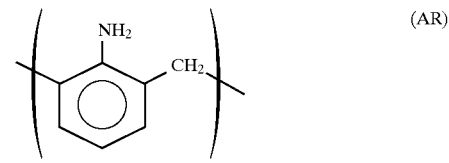

The visible-ultraviolet absorption spectrum of the resulting film is measured. As a result, the absorption due to a polysilane main chain is observed at about 320 nm. The infrared absorption spectrum of this film is measured. As a result, the absorption due to a nitrogen-silicon bond and a siloxane bond is observed at about 900 to 1100 cm$^{-2}$. The presence of the nitrogen-silicon bond is confirmed by the measurement of $^{29}$Si solid NMR of this film. As is apparent from these results, the resulting film is a polysilane composite film in which the Si main chain of polysilane is crosslinked with an aniline resin as an organic matrix through a nitrogen atom.

The hardness of this film is evaluated by a pencil scratching test (JIS-K5400). As a result, it shows a hardness B.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

In order to evaluate the light resistance of this film, ultraviolet light having a wavelength of 320 nm is irradiated from a low-pressure mercury lamp as a light source to measure a time required to reduce the absorption to half (half life). For comparison, the same measurement was conducted as to poly(phenylhexylsilylene) having a weight-average molecular weight Mw of 10000 as a normal polysilane. As a result, the half life of the film obtained in this Example is not less than 10 times larger as that of poly (phenylhexylsilylene) and this polysilane composite film is superior in light resistance.

The same results are obtained when using polysilane (E7) in place of polysilane (E2).

Example 42

According to the same manner as that described in Example 41 except that an NMP solution of aluminum isopropoxide (0.1 g) is further added to an NMP solution of an aniline resin (AR) and an NMP solution of polysilane (E2), a polysilane composite film is made.

The visible-ultraviolet absorption spectrum of the resulting film is measured. As a result, the absorption due to a polysilane main chain is observed at about 320 nm. The infrared absorption spectrum of this film is measured. As a result, the absorption due to a nitrogen-silicon bond and a siloxane bond is observed at about 900 to 1100 cm$^{-2}$. The presence of the nitrogen-silicon bond is confirmed by the measurement of $^{29}$Si solid NMR of this film. As is apparent from these results, the resulting film is a polysilane composite film in which the Si main chain of polysilane is crosslinked with an aniline resin as an organic matrix through a nitrogen atom.

The hardness of this film is evaluated by a pencil scratching test (JIS-K5400). As a result, it shows a hardness H. The reason why the hardness is improved in comparison with the film of Example 41 attributes to the effect due to the addition of aluminum isopropoxide as a metal alkoxide. Incidentally, such an effect is observed, similarly, when using titanium isopropoxide or indium isopropoxide.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

In order to evaluate the light resistance of this film, ultraviolet light having a wavelength of 320 nm is irradiated from a low-pressure mercury lamp as a light source to measure a time required to reduce the absorption to half (half life). As a result, the half life of the film obtained in this Example is not less than 10 times larger as that of poly (phenylhexyl-silylene) and this polysilane composite film is superior in light resistance.

The same results are obtained when using polysilane (E7) in place of polysilane (E2).

Example 43

According to the same manner as that described in Example 41 except for using polyaniline (PAn, weight-average molecular weight Mw: 12000) having a repeating unit represented by the following chemical formula in place of an aniline resin (AR), a polysilane composite film is made.

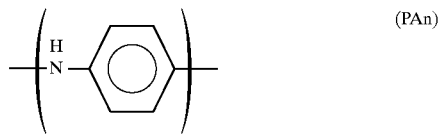
(PAn)

The visible-ultraviolet absorption spectrum of the resulting film is measured. As a result, the absorption due to a polysilane main chain is observed at about 320 nm. The infrared absorption spectrum of this film is measured. As a result, the absorption due to a nitrogen-silicon bond and a siloxane bond is observed at about 900 to 1100 cm$^{-2}$. The presence of the nitrogen-silicon bond is confirmed by the measurement of $^{29}$Si solid NMR of this film. As is apparent from these results, the resulting film is a polysilane composite film in which the Si main chain of polysilane is crosslinked with polyaniline as an organic matrix through a nitrogen atom.

The hardness of this film is evaluated by a pencil scratching test (JIS-K5400). As a result, it shows a hardness B.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

In order to evaluate the light resistance of this film, ultraviolet light having a wavelength of 320 nm is irradiated from a low-pressure mercury lamp as a light source to measure a time required to reduce the absorption to half (half life). As a result, the half life of the film obtained in this Example is not less than 10 times larger as that of poly (phenylhexyl-silylene) and this polysilane composite film is superior in light resistance.

The same results are obtained when using polysilane (E7) in place of polysilane (E2).

Example 44

According to the same manner as that described in Example 43 except that an NMP solution of aluminum isopropoxide (0.1 g) is further added to an NMP solution of polyaniline (PAn) and an NMP solution of polysilane (E2), a polysilane composite film is made.

The visible-ultraviolet absorption spectrum of the resulting film is measured. As a result, the absorption due to a polysilane main chain is observed at about 320 nm. The infrared absorption spectrum of this film is measured. As a result, the absorption due to a nitrogen-silicon bond and a siloxane bond is observed at about 900 to 1100 cm$^{-2}$. The presence of the nitrogen-silicon bond is confirmed by the measurement of $^{29}$Si solid NMR of this film. As is apparent from these results, the resulting film is a polysilane composite film in which the Si main chain of polysilane is crosslinked with polyaniline as an organic matrix through a nitrogen atom.

The hardness of this film is evaluated by a pencil scratching test (JIS-K5400). As a result, it shows a hardness H. The reason why the hardness is improved in comparison with the film of Example 43 attributes to the effect due to the addition of aluminum isopropoxide as a metal alkoxide. Incidentally, such an effect is observed, similarly, when using titanium isopropoxide or indium isopropoxide.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

In order to evaluate the light resistance of this film, ultraviolet light having a wavelength of 320 nm is irradiated from a low-pressure mercury lamp as a light source to measure a time required to reduce the absorption to half (half life). As a result, the half life of the film obtained in this Example is not less than 10 times larger as that of poly (phenylhexyl-silylene) and this polysilane composite film is superior in light resistance.

The same results are obtained when using polysilane (E7) in place of polysilane (E2).

Example 45

According to the same manner as that described in Example 41 except for using polypyrrole (PPr, weight-average molecular weight Mw: 2000) having a repeating unit represented by the following chemical formula in place of an aniline resin (AR), a polysilane composite film is made.

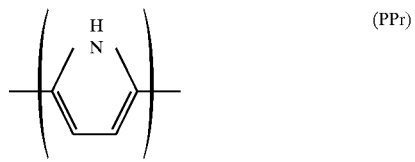

The visible-ultraviolet absorption spectrum of the resulting film is measured. As a result, the absorption due to a polysilane main chain is observed at about 320 nm. The infrared absorption spectrum of this film is measured. As a result, the absorption due to a nitrogen-silicon bond and a siloxane bond is observed at about 900 to 1100 cm$^{-2}$. The presence of the nitrogen-silicon bond is confirmed by the measurement of $^{29}$Si solid NMR of this film. As is apparent from these results, the resulting film is a polysilane composite film in which the Si main chain of polysilane is crosslinked with polypyrrole as an organic matrix through a nitrogen atom.

The hardness of this film is evaluated by a pencil scratching test (JIS-K5400). As a result, it shows a hardness B.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

In order to evaluate the light resistance of this film, ultraviolet light having a wavelength of 320 nm is irradiated from a low-pressure mercury lamp as a light source to measure a time required to reduce the absorption to half (half life). As a result, the half life of the film obtained in this Example is not less than 10 times larger as that of poly (phenylhexyl-silylene) and this polysilane composite film is superior in light resistance.

The same results are obtained when using polysilane (E7) in place of polysilane (E2).

Example 46

According to the same manner as that described in Example 41 except that an NMP solution of a polysilazane sol, which is synthesized according to the above-described process of W. S. Coblenz et al. and then is subjected to solvent substitution, is used in place of an aniline resin (AR) and the heating is conducted at 150° C. for 2 hours, a polysilane composite film is made.

The visible-ultraviolet absorption spectrum of the resulting film is measured. As a result, the absorption due to a polysilane main chain is observed at about 320 nm. The infrared absorption spectrum of this film is measured. As a result, the absorption due to a nitrogen-silicon bond and a nitrogen-siloxane bond is observed at about 900 to 1100 cm$^{-2}$. The presence of the nitrogen-silicon bond is confirmed by the measurement of $^{29}$Si solid NMR of this film. As is apparent from these results, the resulting film is a polysilane composite film in which the Si main chain of polysilane is crosslinked with a polysilazane gel or silicon nitride as an inorganic matrix through a nitrogen atom.

The hardness of this film is evaluated by a pencil scratching test (JIS-K5400). As a result, it shows a hardness 5H.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

In order to evaluate the light resistance of this film, ultraviolet light having a wavelength of 320 nm is irradiated from a low-pressure mercury lamp as a light source to measure a time required to reduce the absorption to half (half life). As a result, the half life of the film obtained in this Example is not less than 10 times larger as that of poly (phenylhexyl-silylene) and this polysilane composite film is superior in light resistance.

The volume resistivity (according to JIS-C2151) of this film is not more than 6×10$^{-6}$ Ωcm.

The same results are obtained when using polysilane (E7) in place of polysilane (E2).

Example 47

While stirring 100 ml of a diethyl ether solution of polysilane (E2, 1 g) in an argon atmosphere at a temperature of a dry ice-ethanol bath, 1 g of dry ammonia is bubbled. After stirring for 30 minutes, the temperature is raised to room temperature while leaking an excess gas, followed by stirring for additional 30 minutes. Then, the solvent is removed and dried under vacuum. The residue is coated on a substrate, which is dried with heating at 120° C. in an argon gas flow for 2 hours.

The visible-ultraviolet absorption spectrum of the resulting film is measured. As a result, the absorption due to a polysilane main chain is observed at about 330 nm. The infrared absorption spectrum of this film is measured. As a result, the absorption due to a nitrogen-silicon bond and a siloxane bond is observed at about 900 to 1100 cm$^{-2}$. The presence of the nitrogen-silicon bond is confirmed by the measurement of $^{29}$Si solid NMR of this film. As is apparent from these results, the resulting film is a polysilane composite film in which the Si main chains of polysilane are crosslinked each other through a nitrogen atom.

The hardness of this film is evaluated by a pencil scratching test (JIS-K5400). As a result, it shows a hardness 5H.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

In order to evaluate the light resistance of this film, ultraviolet light having a wavelength of 320 nm is irradiated from a low-pressure mercury lamp as a light source to measure a time required to reduce the absorption to half (half life). As a result, the half life of the film obtained in this Example is not less than 10 times larger as that of poly (phenylhexyl-silylene) and this polysilane composite film is superior in light resistance.

The volume resistivity (according to JIS-C2151) of this film is not more than 6×10$^5$ Ωcm.

The same results are obtained when using polysilane (E7) in place of polysilane (E2).

Example 48

While stirring 50 ml of a tetrahydrofuran (THF) solution of polysilane (E2, 1 g) in an argon atmosphere, 50 ml of a THF solution of butylamine (0.5 g) is added. After stirring rapidly, the reaction solution is coated on a substrate and, after standing at room temperature under an argon flow for 30 minutes, the substrate is dried with heating at 120° C. for 2 hours.

The visible-ultraviolet absorption spectrum of the resulting film is measured. As a result, the absorption due to a polysilane main chain is observed at about 330 nm. The infrared absorption spectrum of this film is measured. As a result, the absorption due to a nitrogen-silicon bond and a siloxane bond is observed at about 900 to 1100 $cm^{-2}$. The presence of the nitrogen-silicon bond is confirmed by the measurement of $^{29}Si$ solid NMR of this film. As is apparent from these results, the resulting film is a polysilane composite film in which the Si main chains of polysilane are crosslinked each other through a nitrogen atom.

The hardness of this film is evaluated by a pencil scratching test (JIS-K5400). As a result, it shows a hardness 4H.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

In order to evaluate the light resistance of this film, ultraviolet light having a wavelength of 320 nm is irradiated from a low-pressure mercury lamp as a light source to measure a time required to reduce the absorption to half (half life). As a result, the half life of the film obtained in this Example is not less than 10 times larger as that of poly (phenylhexyl-silylene) and this polysilane composite film is superior in light resistance.

The volume resistivity (according to JIS-C2151) of this film is not more than $6 \times 10^5$ Ωcm.

The same results are obtained when using polysilane (E7) in place of polysilane (E2). Also, the same results are obtained when using ehylamine or 2-aminoethanol in place of butylamine.

Example 49

According to the same manner as that described in Example 48 except for using octamethoxytetracyclosilane represented by the above-described chemical formula (E13) in place of polysilane (E2), a polysilane film is obtained.

The presence of the silicon—silicon bond and nitrogen-silicon bond is confirmed by the measurement of $^{29}Si$ solid NMR of this film. As is apparent from these results, the resulting film is a polysilane composite film in which the Si main chains are crosslinked each other through a nitrogen atom.

The hardness of this film is evaluated by a pencil scratching test (JIS-K5400). As a result, it shows a hardness 4H.

The haze rate at 300 to 800 nm is not more than 5%. The peak due to Si crystallite is not observed by a X-ray diffraction. As is apparent from the reaction rate of the functional group of the precursor polymer calculated from NMR, IR and TG, the number of the crosslinking point on the polymer chain is not less than 3.

Example 50

According to the same manner as that described in Example 48 except for using polygermane (weight-average molecular weight Mw: 4100) having a repeating unit represented by the above-described chemical formula (E9) in place of polysilane (E2), a polygermane composite film is obtained.

The presence of the Ge—Ge bond and nitrogen-Ge bond is confirmed by the measurement of NMR of the resulting film. As is apparent from these results, the resulting film is a polygermane composite film in which the Ge main chains of polygermane are crosslinked each other through a nitrogen atom.

The hardness of this film is evaluated by a pencil scratching test (JIS-K5400). As a result, it shows a hardness 2H.

The haze rate at 300 to 800 nm is not more than 5%. The peak due to Ge crystallite is not observed by a X-ray diffraction. As is apparent from the reaction rate of the functional group of the precursor polymer calculated from NMR, IR and TG, the number of the crosslinking point on the polymer chain is not less than 3.

Example 51

According to the same manner as that described in Example 48 except for using polystannane (weight-average molecular weight Mw: 2000) having a repeating unit represented by the above-described chemical formula (E10) in place of polysilane (E2), a polystannane composite film is obtained.

The presence of the Sn—Sn bond and nitrogen-Sn bond is confirmed by the measurement of NMR of the resulting film. As is apparent from these results, the resulting film is a polystannane composite film in which the Sn main chains of polystannane are crosslinked each other through a nitrogen atom.

The hardness of this film is evaluated by a pencil scratching test (JIS-K5400). As a result, it shows a hardness 3H.

The haze rate at 300 to 800 nm is not more than 5%. The peak due to Sn crystallite is not observed by a X-ray diffraction. As is apparent from the reaction rate of the functional group of the precursor polymer calculated from NMR, IR and TG, the number of the crosslinking point on the polymer chain is not less than 3.

What is claimed is:

1. An optical device having an optical functional material as a constitutional element, wherein the optical functional material comprising a polymer chain selected from the group consisting of polysilane, polygermane, polystannane and a copolymer thereof, and a network structure of a metal oxide consisting of a metal atom bonded to another metal atom through an oxygen atom; wherein the polymer chain is chemically crosslinked with a glass matrix of the network structure of the metal oxide at three or more positions directly or indirectly, resulting in a cured state; and an area of signals due to a silicon, germanium or stannum crystal observed within a range of 20 to 60 degrees of 2 θ is not more than 1% of the total area of the all signals according to a X-ray diffraction using a Cu tubular bulb as a X-ray source.

2. The optical device according to claim 1, wherein an atomic ratio of M atoms, M being at least one element selected from Si, Ge and Sn, of which all four valences form a M—M bond is less than 10% by atomic ratio of all M atoms contained in the optical functional material.

3. The optical device according to claim 1, wherein the optical functional material contains 0.1% by atomic ratio or more of C atom.

4. The optical device according to claim 1, wherein the optical functional material constitutes a luminescent layer in an electroluminescent device comprising a pair of electrodes and a luminescent layer interposed therebetween or a charge transport layer in an electroluminescent device comprising a pair of electrodes and a luminescent layer and a charge transport layer interposed therebetween.

5. The optical device according to claim 1, wherein the optical functional material constitutes a non-linear optical phenomenon generating part of a non-linear optical device comprising a non-linear optical phenomenon generating part and a light waveguide part.

6. The optical device according to claim 1, wherein the optical functional material constitutes a laser medium in a laser device comprising a laser medium, an oscillator of a pair of mirrors provided oppositely through the laser medium and an excitation means for exciting the laser medium.

* * * * *